Jan. 11, 1949.  E. F. ANDREWS  2,458,496
AUTOMATIC PHONOGRAPH
Filed May 4, 1942  17 Sheets-Sheet 2

Inventor
Edward F. Andrews
By Williams, Bradbury & Hinkle
Attys

Jan. 11, 1949.  E. F. ANDREWS  2,458,496
AUTOMATIC PHONOGRAPH
Filed May 4, 1942  17 Sheets-Sheet 3

Inventor:
Edward F. Andrews
By
Williams, Bradbury & Hinkle
Attys.

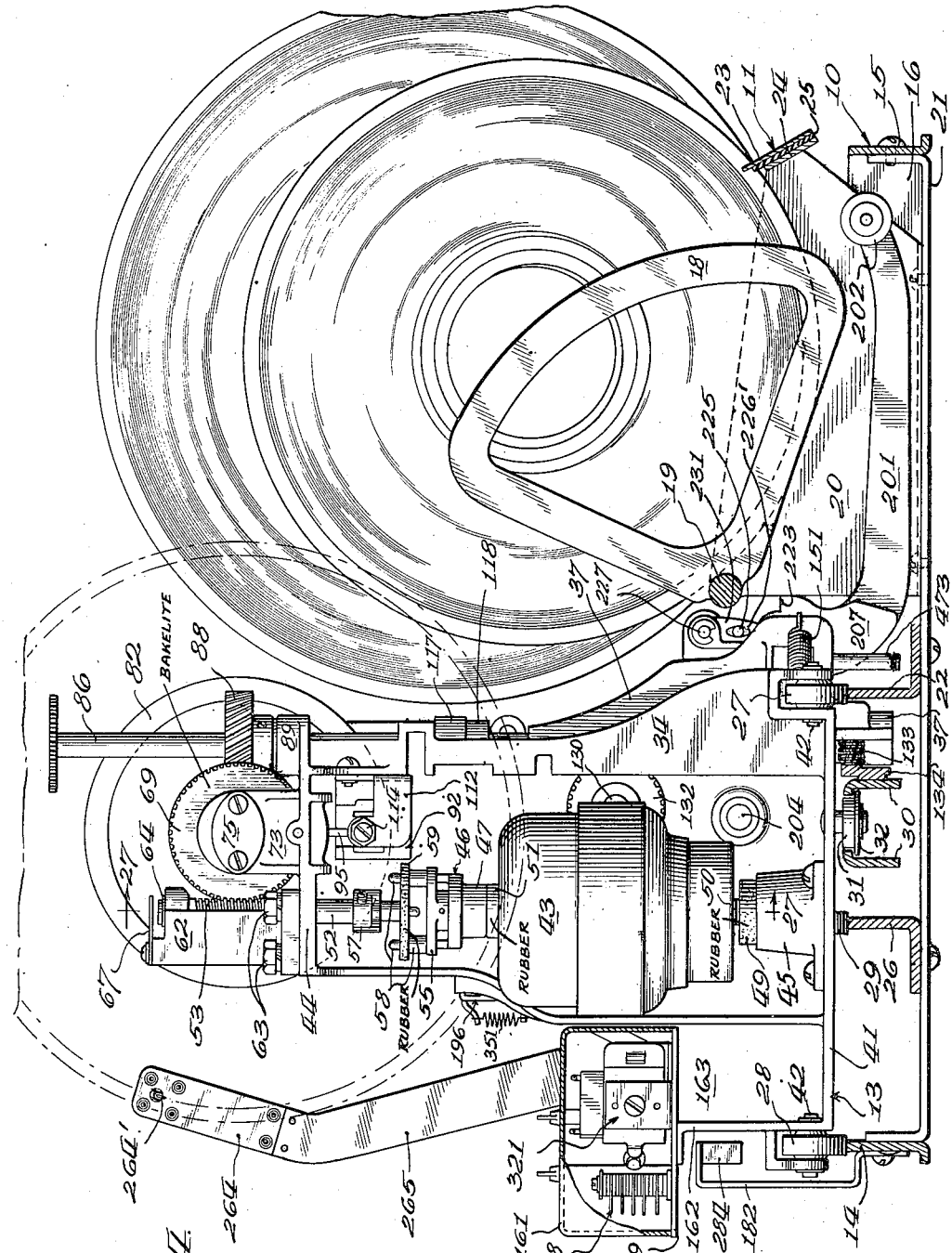

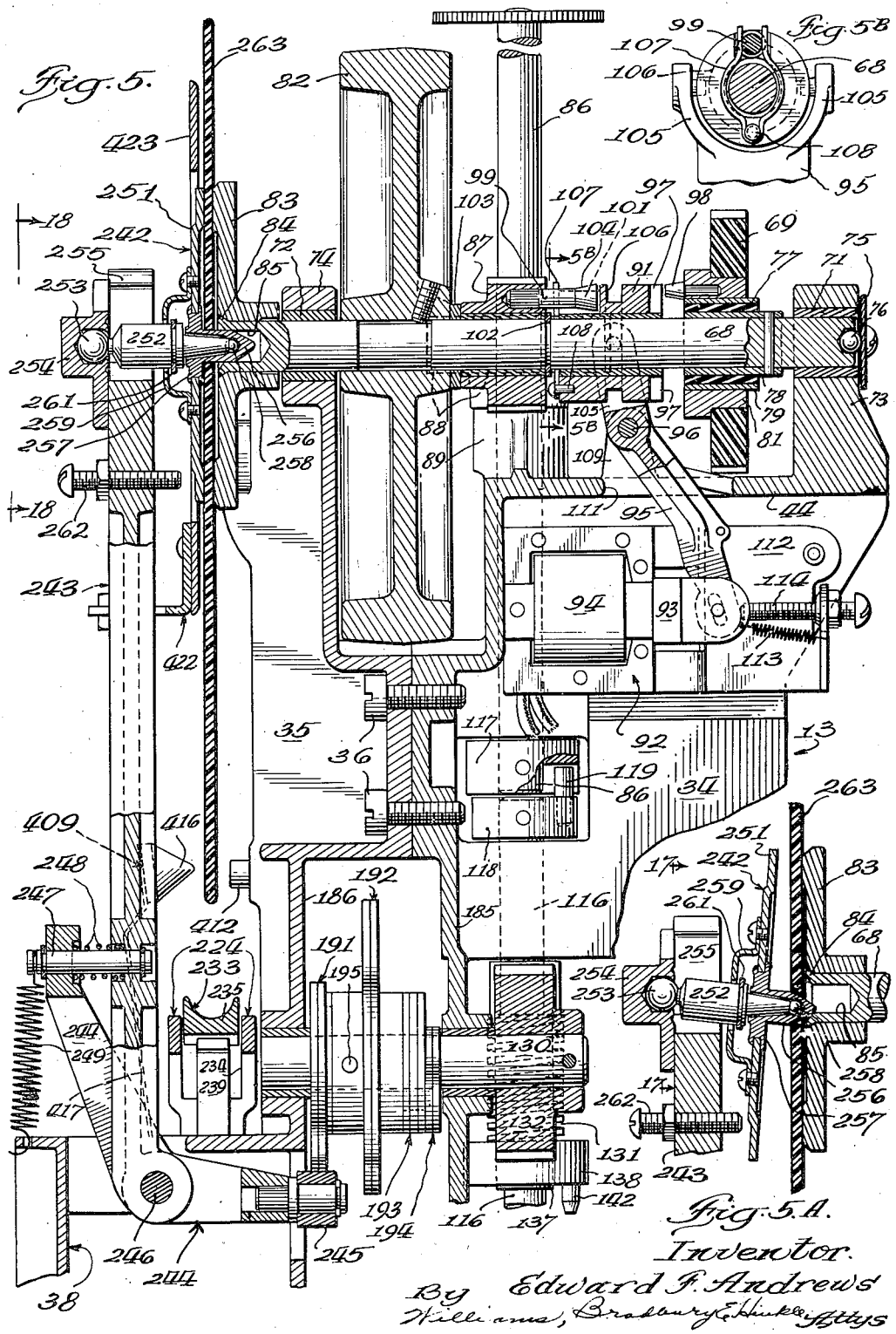

Jan. 11, 1949.  E. F. ANDREWS  2,458,496
AUTOMATIC PHONOGRAPH
Filed May 4, 1942  17 Sheets-Sheet 6
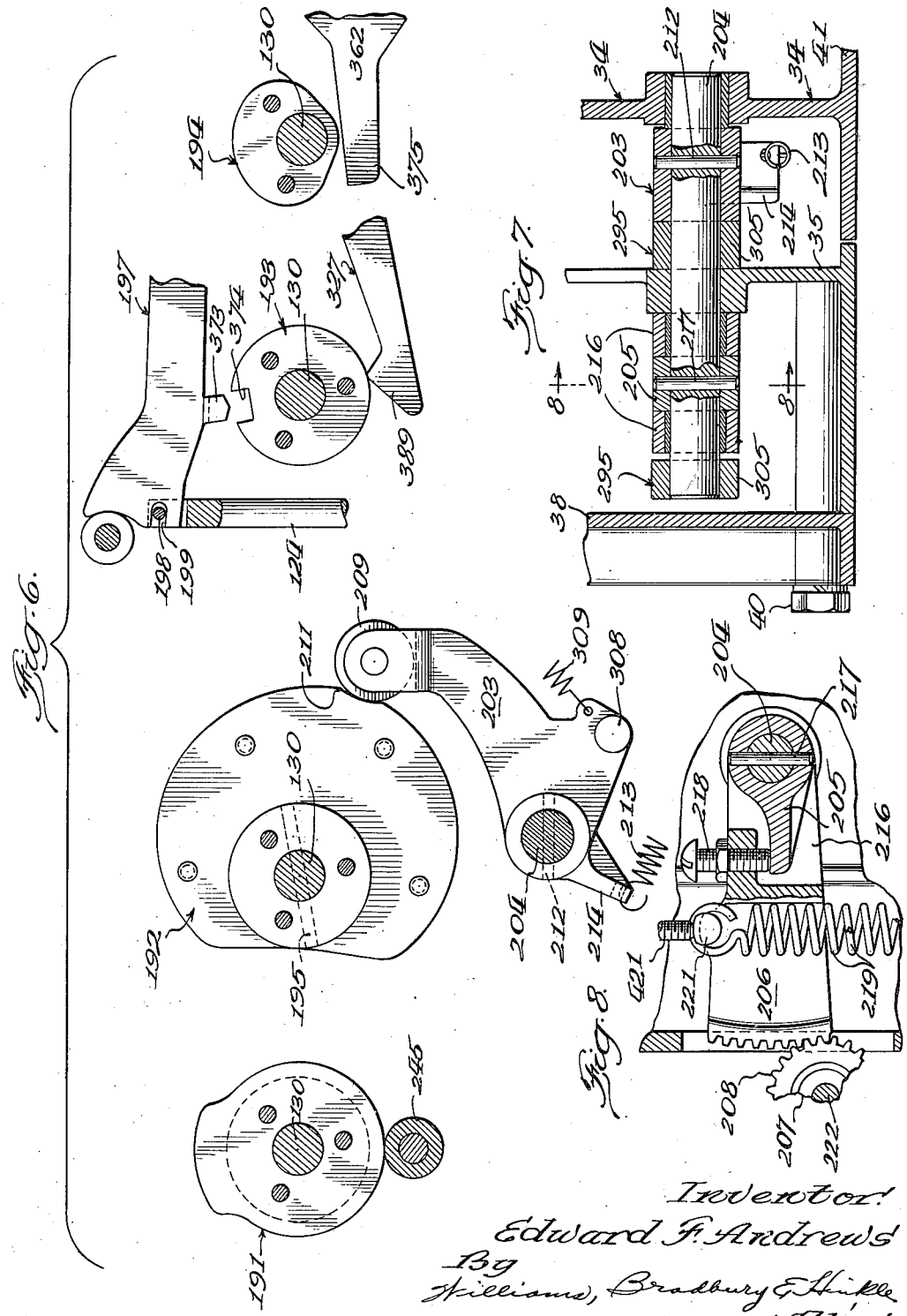

Jan. 11, 1949.  E. F. ANDREWS  2,458,496
AUTOMATIC PHONOGRAPH
Filed May 4, 1942  17 Sheets-Sheet 7
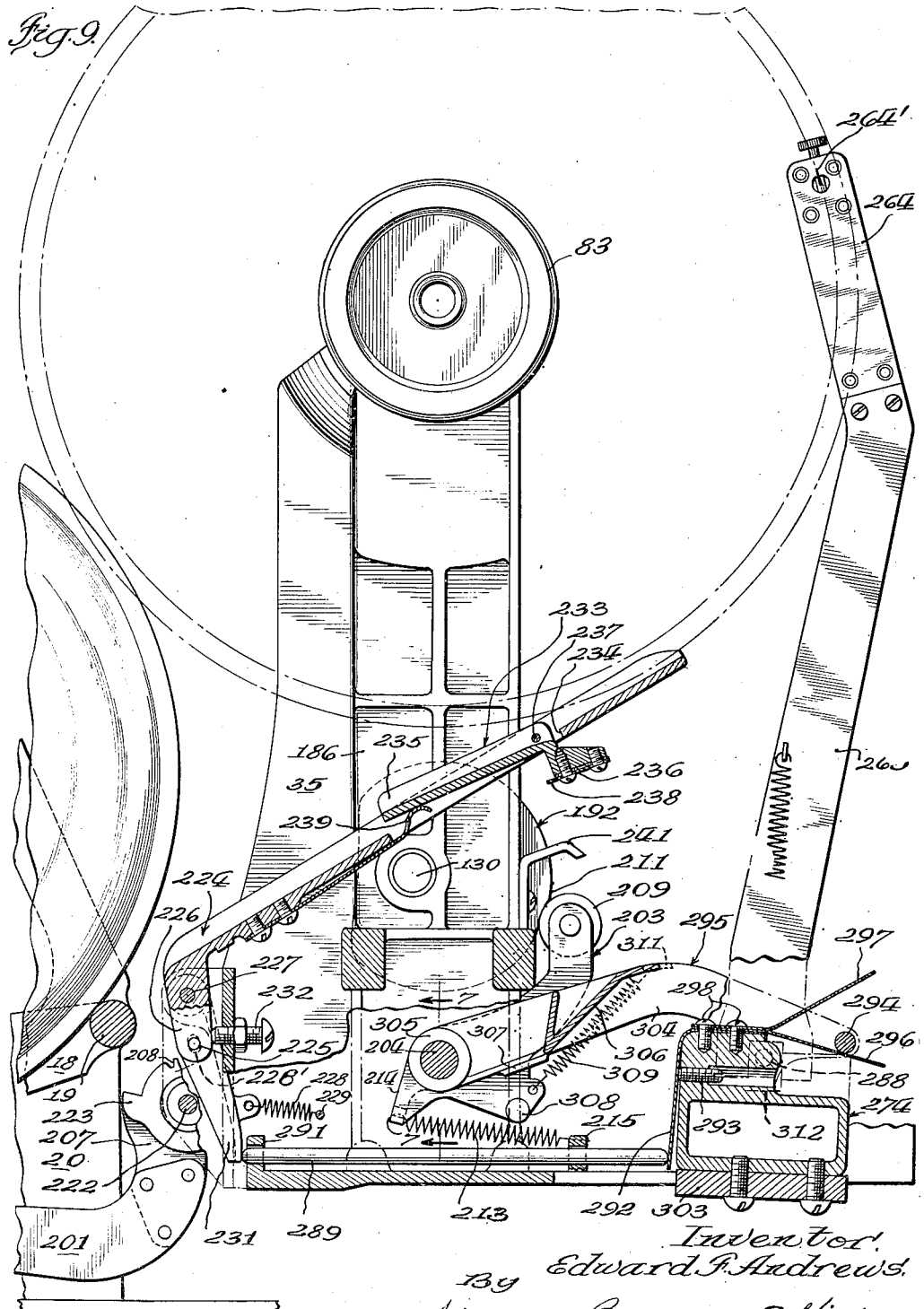
Inventor
Edward F. Andrews
By Williams, Bradbury & Hinkle
Attys.

Jan. 11, 1949.  E. F. ANDREWS  2,458,496
AUTOMATIC PHONOGRAPH

Filed May 4, 1942  17 Sheets-Sheet 8

Inventor:
Edward F. Andrews
By
Williams, Bradbury & Hinkle
Attys.

Jan. 11, 1949.  E. F. ANDREWS  2,458,496
AUTOMATIC PHONOGRAPH
Filed May 4, 1942  17 Sheets-Sheet 9
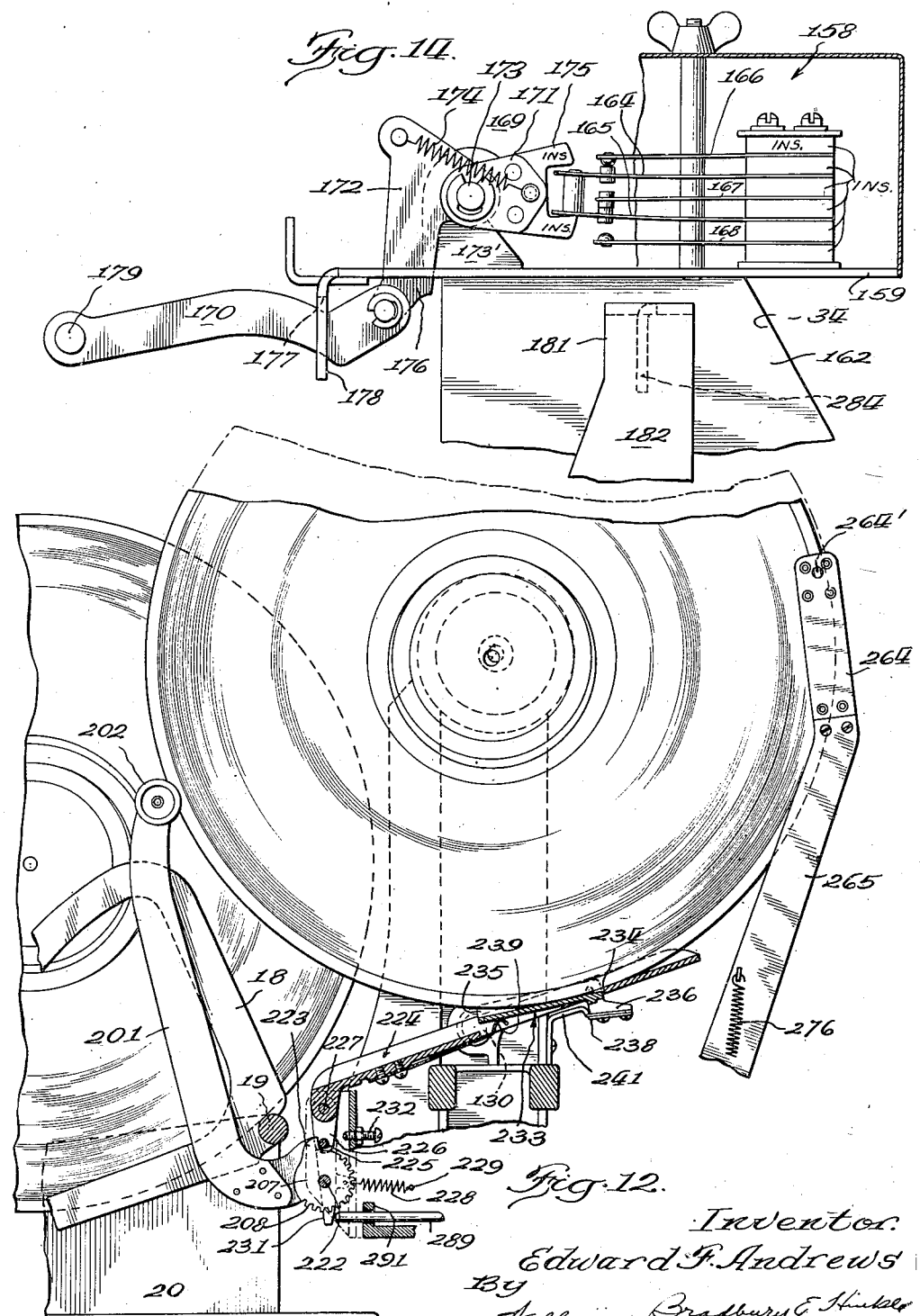

Jan. 11, 1949.  E. F. ANDREWS  2,458,496
AUTOMATIC PHONOGRAPH
Filed May 4, 1942   17 Sheets-Sheet 10
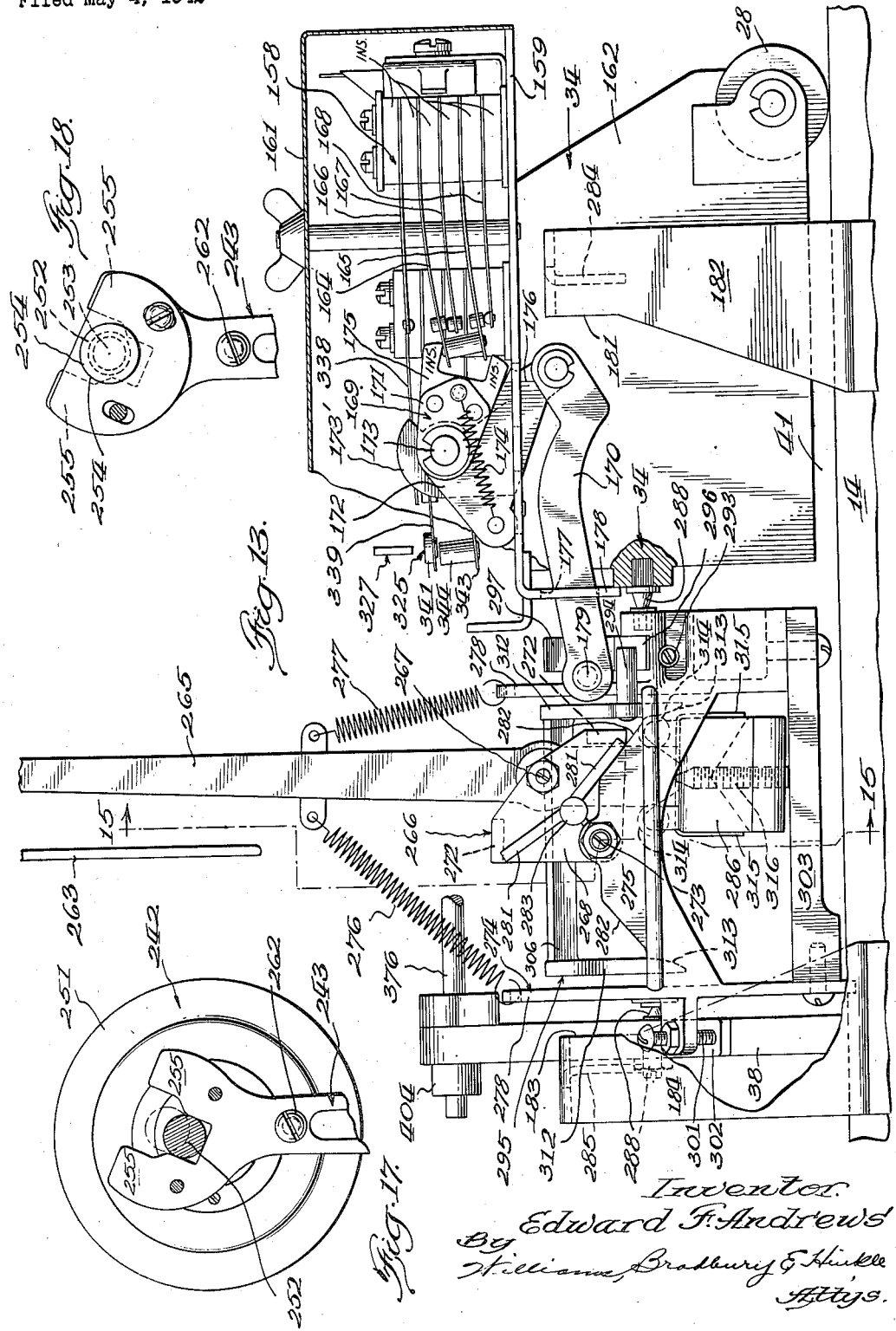
Inventor.
Edward F. Andrews
By
Williams, Bradbury & Hinkle
Attys.

Jan. 11, 1949.　　　　E. F. ANDREWS　　　　2,458,496
AUTOMATIC PHONOGRAPH
Filed May 4, 1942　　　　　　　　　　　　　　　17 Sheets-Sheet 11

Inventor:
Edward F. Andrews
By Williams, Bradbury & Hinkle
Attys.

Jan. 11, 1949.    E. F. ANDREWS    2,458,496
AUTOMATIC PHONOGRAPH
Filed May 4, 1942    17 Sheets-Sheet 12

Inventor:
Edward F. Andrews
By Williams, Bradbury & Hinkle
Attys

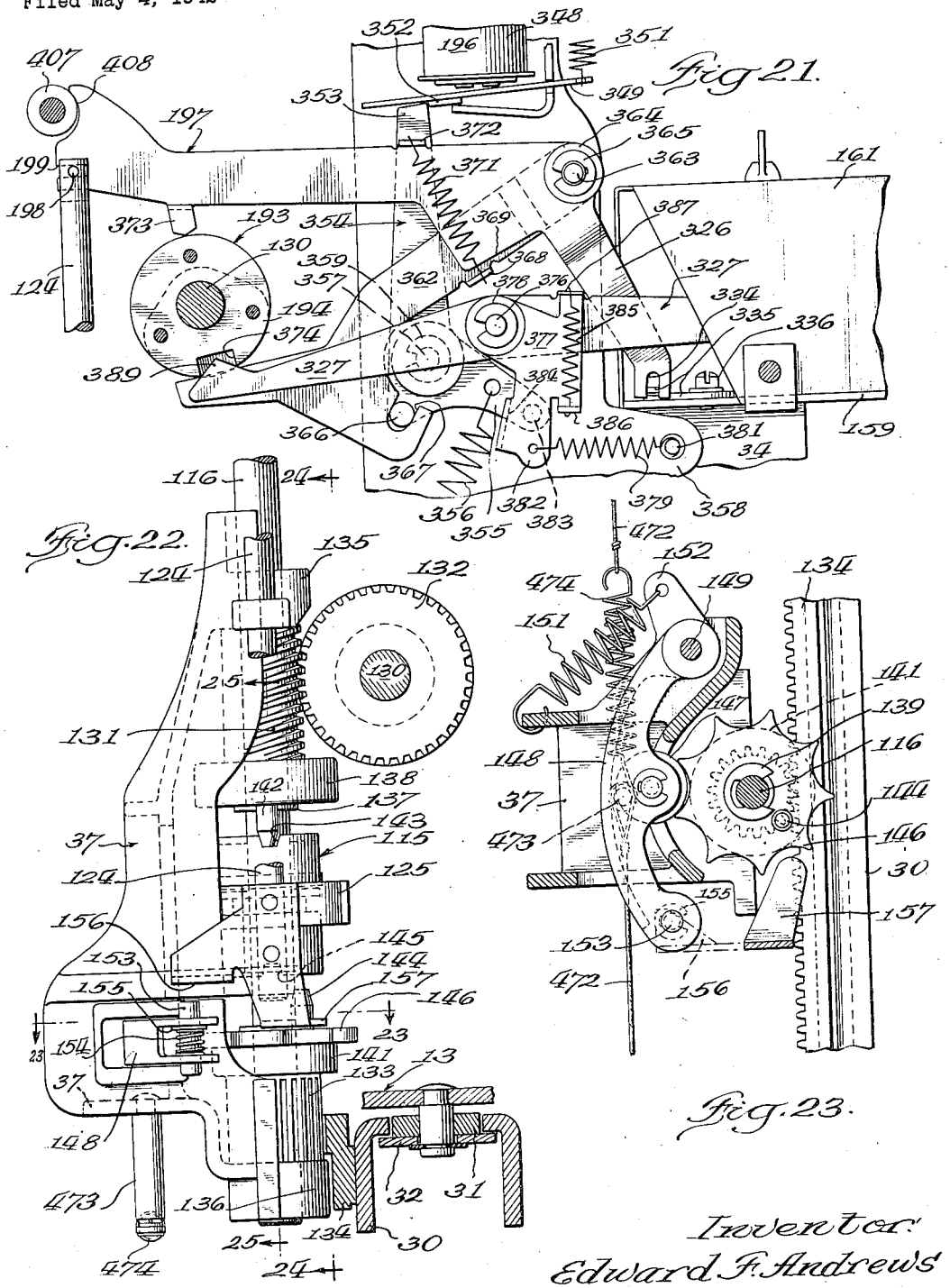

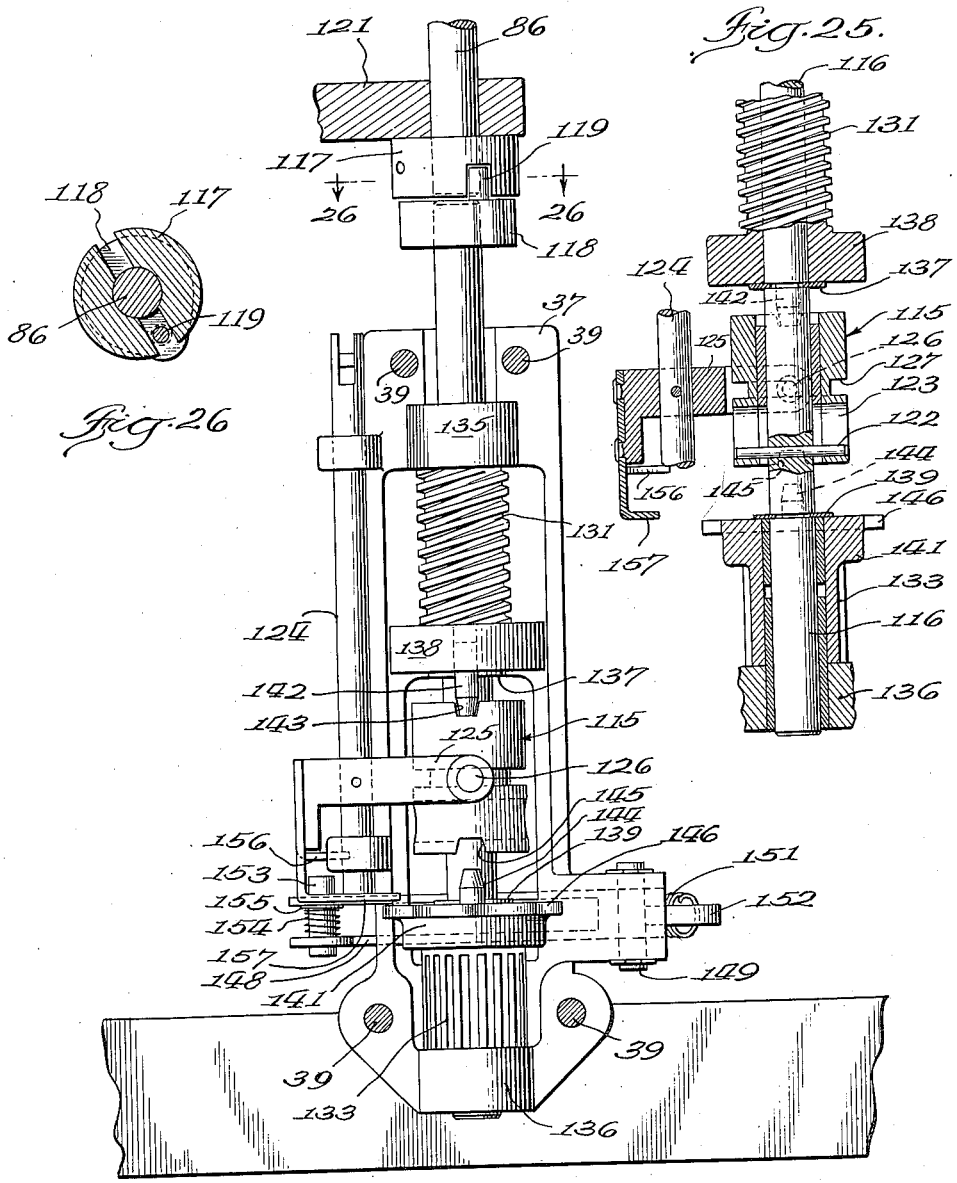

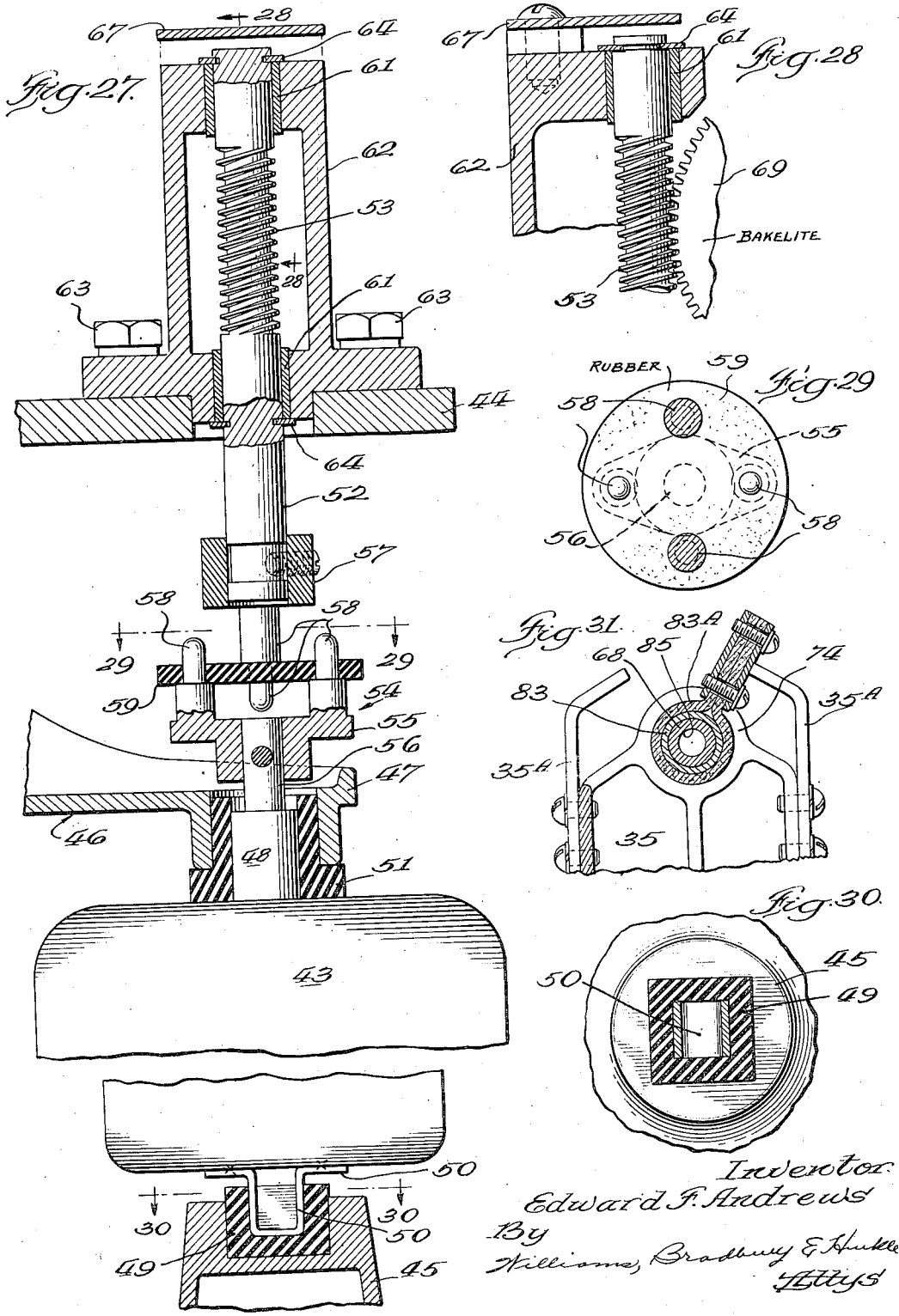

Jan. 11, 1949.  E. F. ANDREWS  2,458,496
AUTOMATIC PHONOGRAPH
Filed May 4, 1942  17 Sheets-Sheet 16
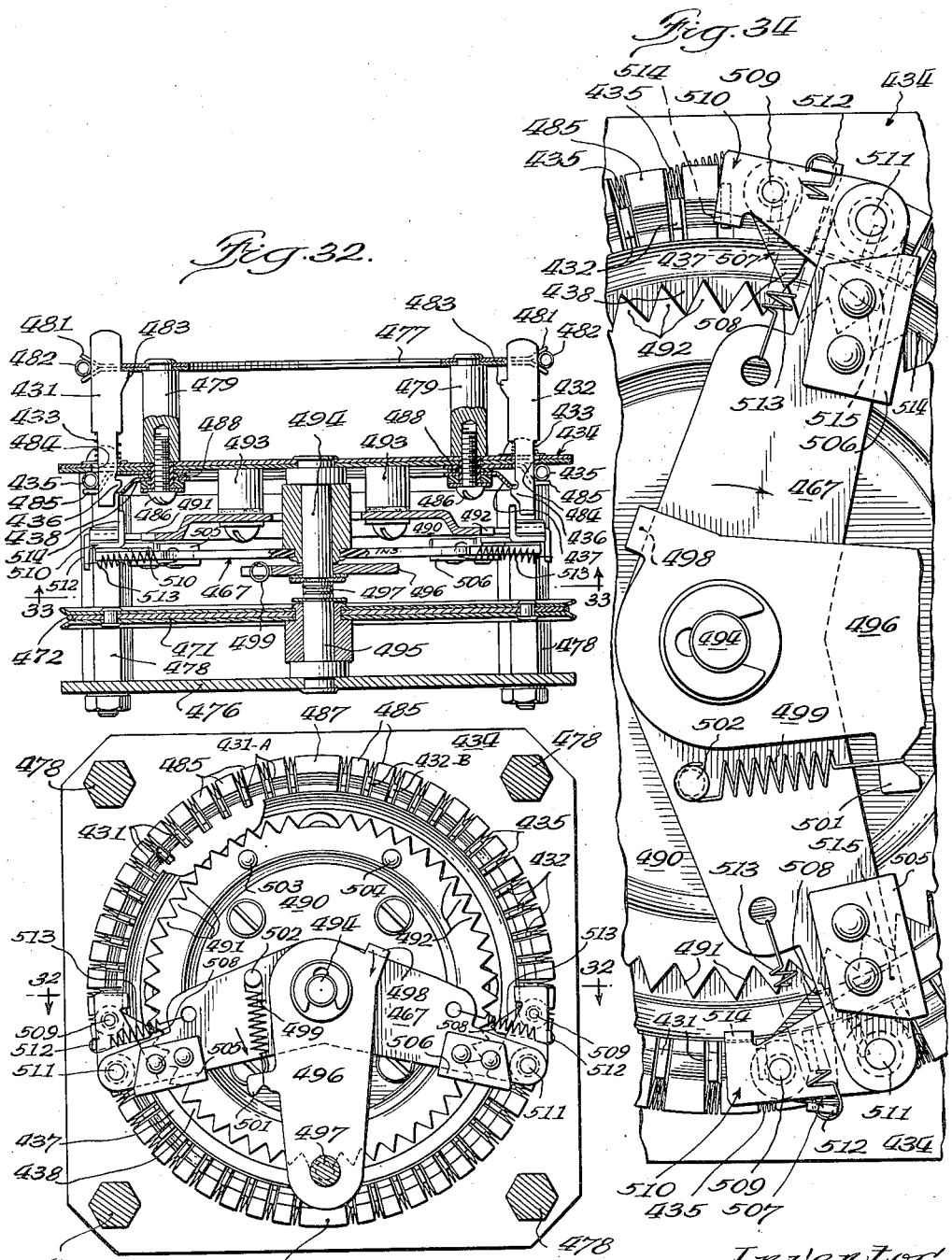
Inventor:
Edward F. Andrews
By Williams, Bradbury & Hinkle
Attys.

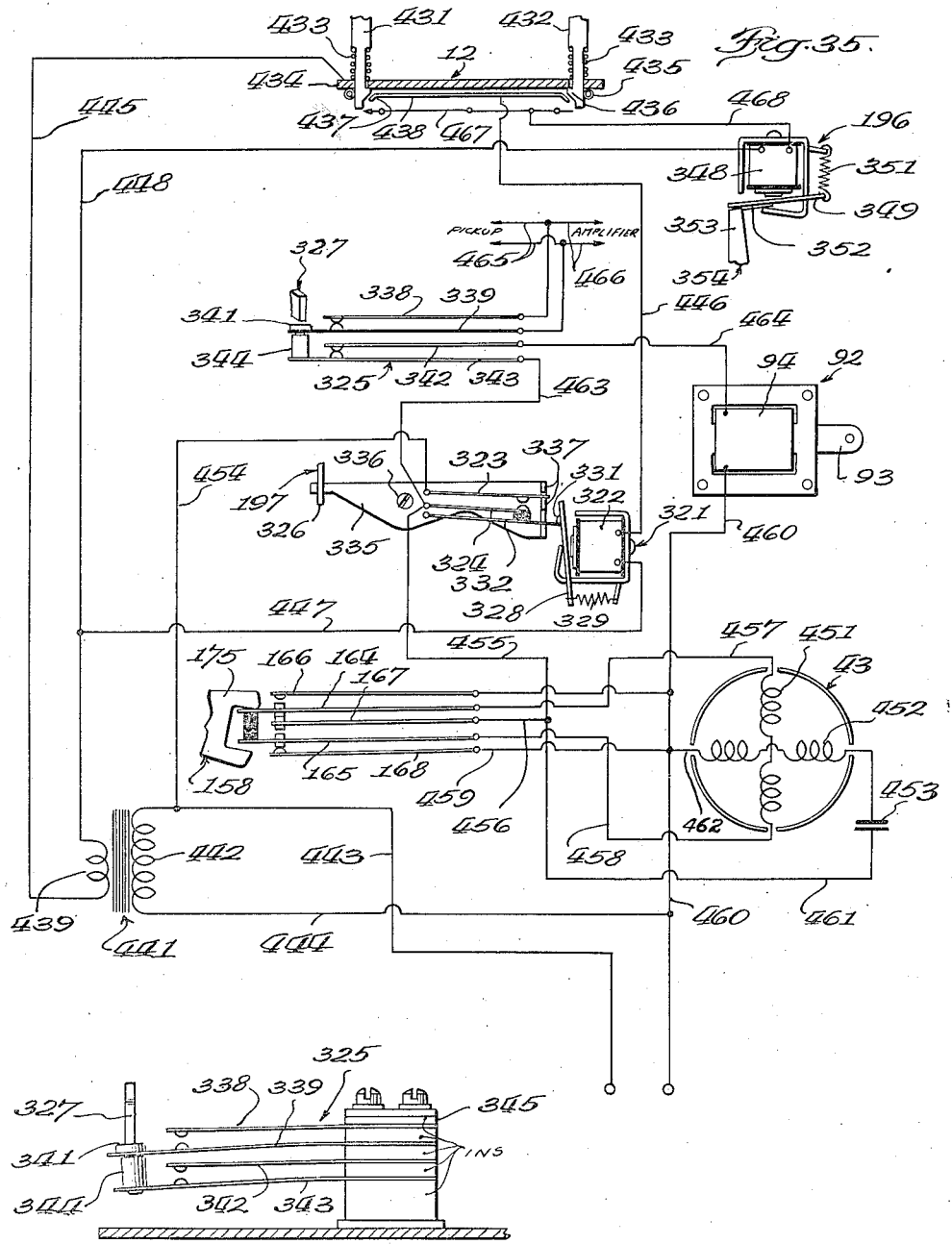

Patented Jan. 11, 1949

2,458,496

UNITED STATES PATENT OFFICE 2,458,496

AUTOMATIC PHONOGRAPH

Edward F. Andrews, Chicago, Ill., assignor, by mesne assignments, to N. Marshall Seeburg, Chicago, Ill.

Application May 4, 1942, Serial No. 441,625

28 Claims. (Cl. 274—10)

This invention relates to automatic phonographs and more particularly to phonographs of the same general type as those described and claimed in my copending applications Serial No. 180,752, filed December 20, 1937 (Patent No. 2,281,547, granted May 5, 1942), Serial No. 214,310, filed June 17, 1938 (Patent No. 2,281,548, granted May 5, 1942), and Serial No. 346,105, filed July 18, 1940 (Patent No. 2,323,365, granted July 6, 1943).

This general type of phonograph can be readily adapted for playing any desired number of records and even when a very large number of records are to be played only very few and simple additional parts are required for additional records.

In the phonograph of the present invention, a stationary record magazine is adapted to support different sized double faced disc records vertically in spaced apart relation. A carriage is mounted for bodily translatory movement adjacent to the magazine. This carriage has mounted on it a record transfer mechanism, means for supporting and rotating a transferred record in a playing position and player arm means for playing either side of a record in the playing position. A construction of this general nature, wherein the magazine is stationary and the carriage with its various component parts is movable relative to the magazine, is decidedly advantageous when the magazine is of considerable length to support a large number of records. The reason for this is that the overall length of the machine is determined by the length of the magazine along which the carriage moves back and forth.

As already indicated, the type of phonograph to which the present invention pertains includes three main elements. The first of these is the stationary magazine, the second is the movable carriage supporting most of the operating and control mechanisms of the phonograph, and the third is a selector mechanism for selecting the record or records to be played. All three of these elements may be, and preferably are, supported on a suitable chassis or base.

The movable carriage supports first of all power means, specifically a reversible electric motor supplying motive power to drive the carriage in opposite directions on the base and to operate various operating and control mechanisms. A record rotating and supporting means or turntable defining a record playing position, and a record transfer mechanism are also mounted upon and move with the carriage. The carriage also supports a single player arm having needle means projecting in opposite directions therefrom and shiftable at the limits of movement of the carriage from one side of the playing position to the other, whereby opposite sides of records are played as the carriage moves in opposite directions. Mechanical and electrical controls for effecting operation of the carriage to selected record positions and for playing the selected side of the record are also mounted upon the movable carriage.

The primary object of the present invention is to provide a new and improved automatic phonograph.

One of the objects of the present invention is the provision of a new and improved player arm mounting and assembly whereby the player arm may be readily shifted from one side of the record position to the other at the limits of movement of the carriage.

Another object of the present invention is the provision of an automatic phonograph with a safety mechanism which prevents relative movement of the carriage and magazine in the event a record is not properly returned from the playing position to the magazine and which, further, repeats the transfer operation until the record is properly returned to the magazine.

A further object of the present invention resides in the provision of a new and improved clutch arrangement through which the motor is operable to operate the carriage through a record selecting cycle or to operate other mechanisms through a record transfer and playing cycle.

A further object of the present invention resides in the provision of a new and improved record stripping mechanism whereby the record is positively stripped from record clamping means after the playing of the record, better to insure proper return of the record to the magazine.

Another object of the invention is to provide a new and improved drive for a turntable rotatable about a horizontal axis whereby unbalanced records are prevented from causing appreciable speed variations.

Another object of the invention is the provision of a new and improved turntable drive wherein the drive is preloaded to minimize speed variations.

A further object of this invention resides in the provision of a new and improved turntable drive including means for preventing the transmission of motor created disturbances to the turntable.

Other objects and advantages of the present invention will become apparent from the ensuing description, in the course of which reference is had to the accompanying drawings, in which:

Fig. 4 is a view similar to Fig. 3, the view being taken on the other side of the machine along the line 4—4 of Fig. 1;

Fig. 5 is an enlarged vertical transverse cross-sectional view through the moving carriage, the view being taken along the line 5—5 of Fig. 1 and illustrating a record clamped in playing position;

Fig. 5A is a similar but fragmentary cross-sectional view illustrating details of the record clamping and rotating means with these means in an intermediate position wherein the record has not been fully clamped and centered in playing position;

Fig. 5B is a similar but fragmentary cross-sectional view taken along the line 5B—5B of Fig. 5 illustrating details of a clutch, hereinafter termed a cycling clutch;

Fig. 6 is an enlarged exploded view of the various cams mounted on a cam shaft and their associated cam followers. In this view, the cams and followers are indicated in positions occupied by them at the time that the rotation of the cam shaft is started after the carriage has been stopped in alignment with a selected record;

Fig. 7 is an enlarged cross-sectional detail of an auxiliary shaft assembly supporting parts of the record transfer mechanism and player arm positioning mechanism, the view being taken along the line 7—7 of Fig. 9;

Fig. 8 is a cross-sectional detail of a portion of the record transfer mechanism, the view being taken generally along line 8—8 of Fig. 7;

Figure 2:
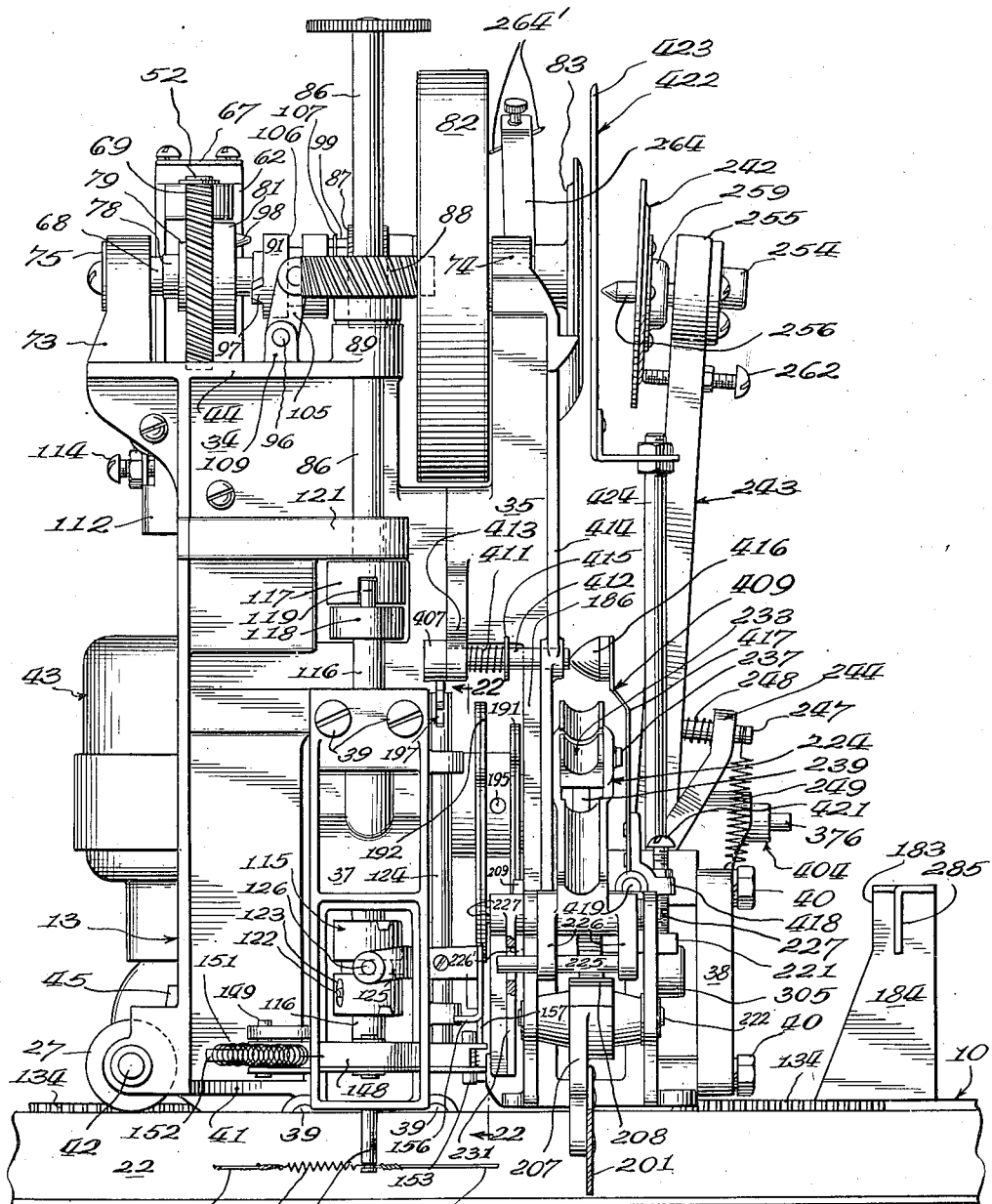
Fig. 2 is a rear elevational view, on an enlarged scale, of the movable carriage and various parts mounted thereon, the view being taken along the line 2—2 of Fig. 1.
Figures 10, 11:
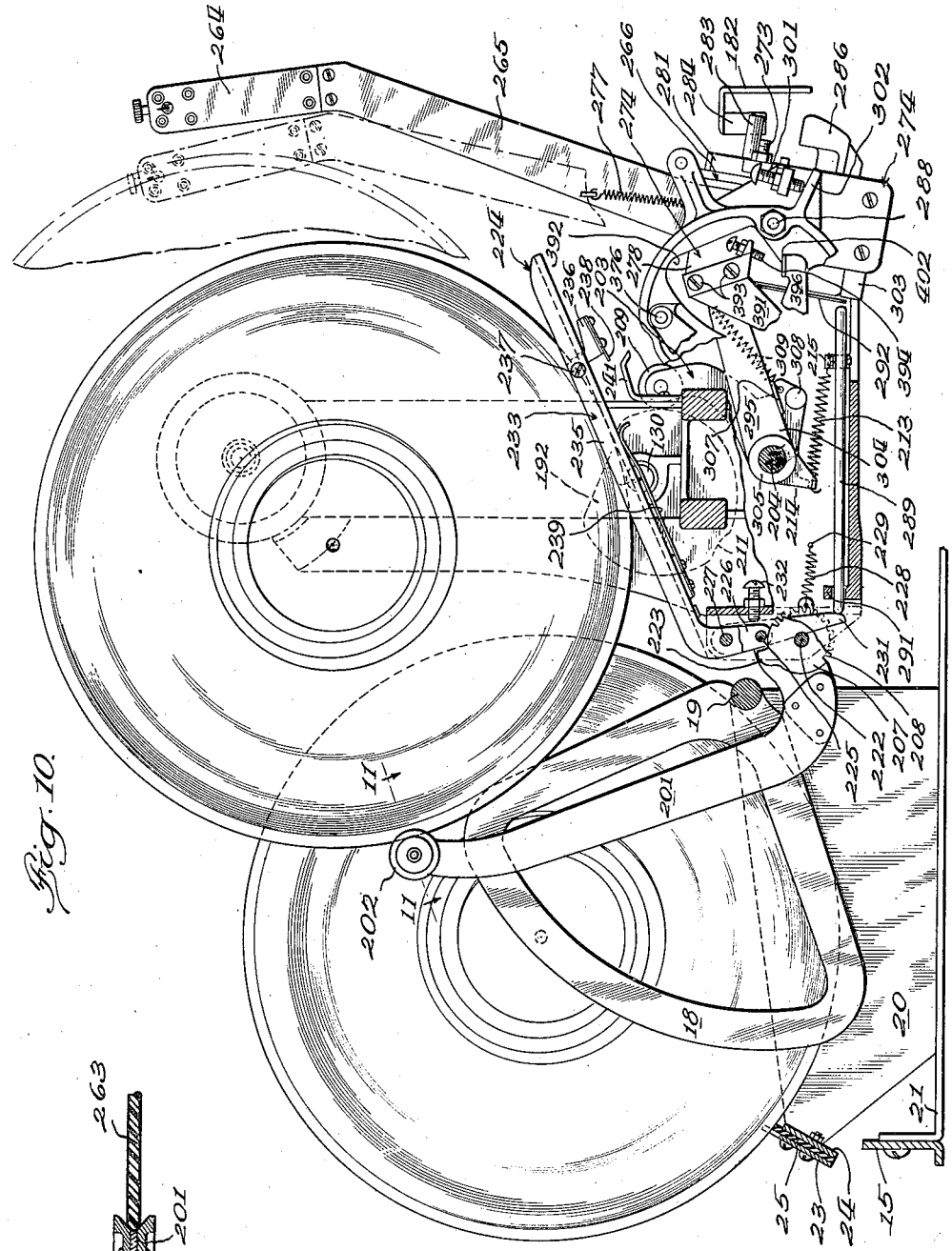
Figure 16:
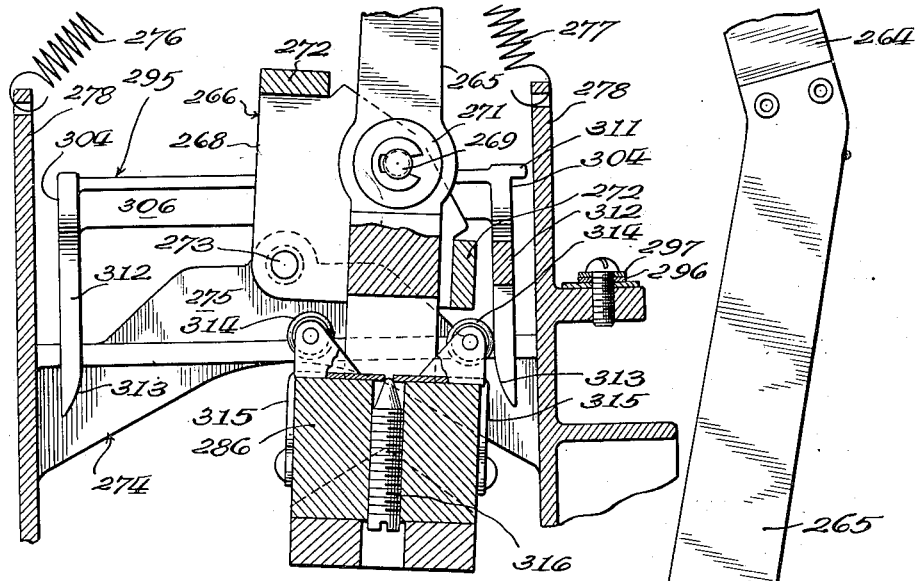
Figure 15:
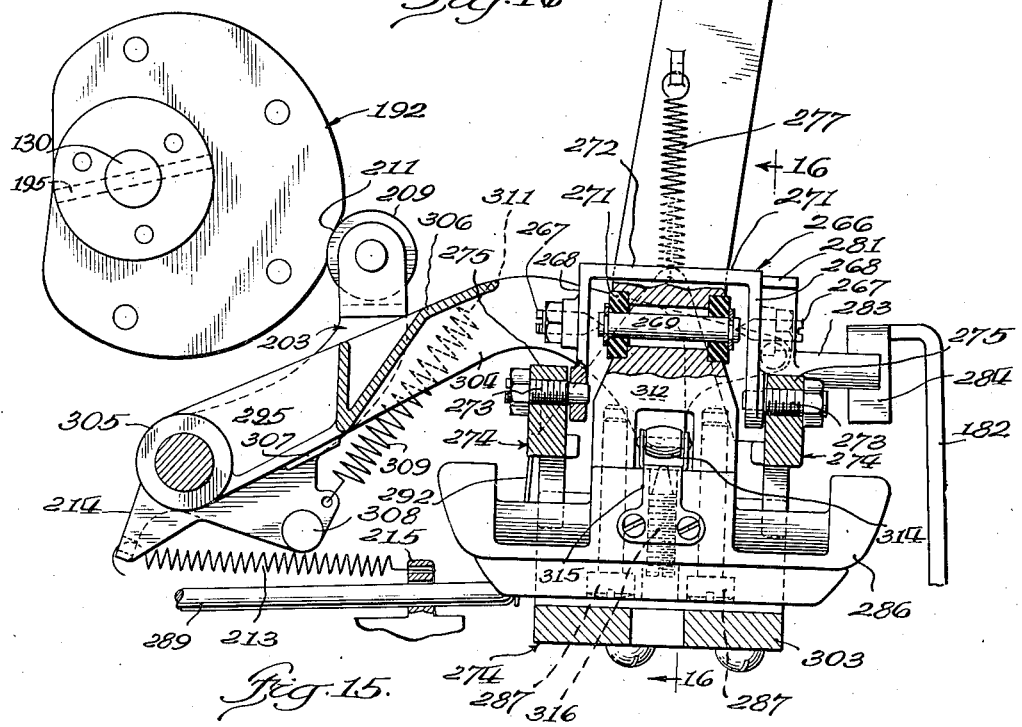
Figure 19:
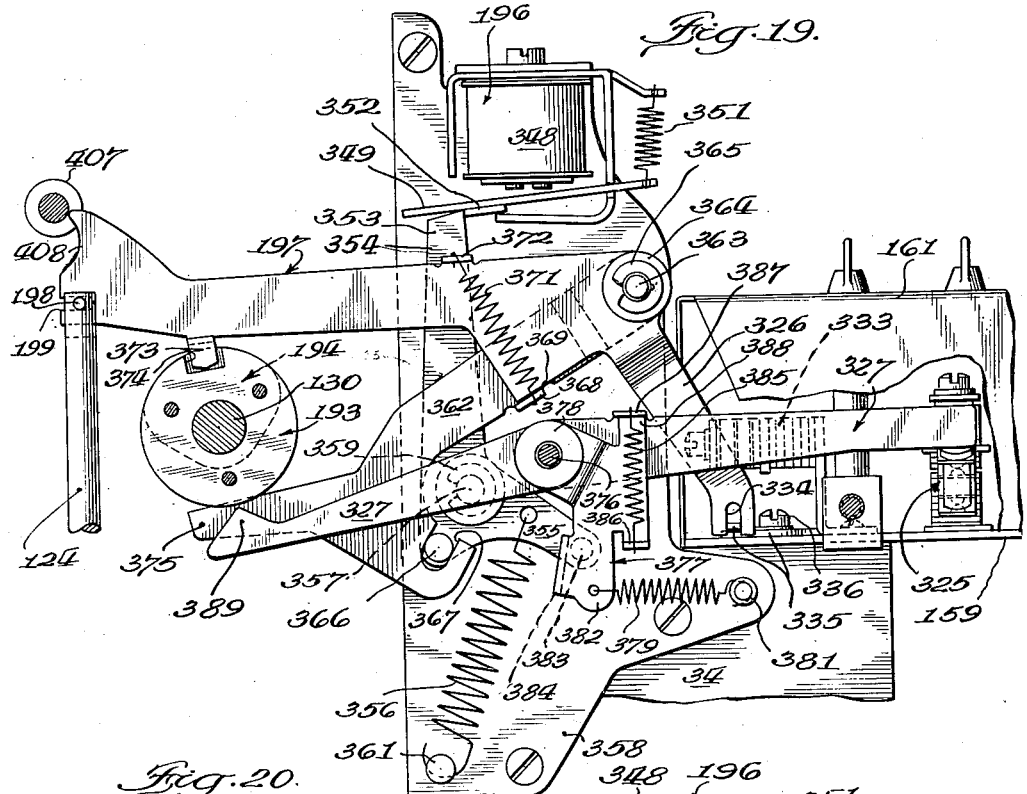
Figure 20:
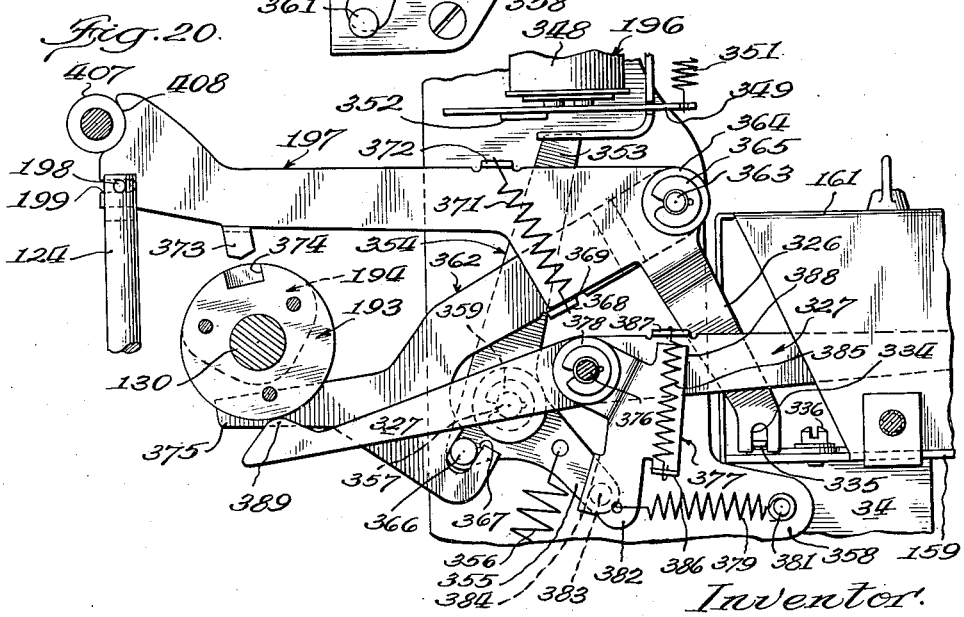

Fig. 9 is an enlarged fragmentary cross-sectional detail illustrating further details of the record transfer and player arm positioning mechanisms. It shows these mechanisms in positions occupied thereby when the apparatus is conditioned for carriage movement. The view also shows in phantom a ten inch record in playing position;

Fig. 10 is a fragmentary elevational view, partly in section, showing a ten inch record before it has been moved into playing position. The phantom lines in this view correspond to the record and player arm positions of Fig. 9;

Fig. 11 is an enlarged fragmentary cross-sectional view of the end of the record transfer arm, the view being taken along the line 11—11 of Fig. 10;

Fig. 12 is a view similar to Fig. 9 but upon a smaller scale showing a twelve inch record prior to the time that it is fully clamped and centered in playing position;

Fig. 13 is an enlarged fragmentary front elevational detail of the player arm assembly and motor reversing switch mechanism;

Fig. 14 is a fragmentary front elevational view illustrating the motor reversing switch mechanism in the other of its two positions;

Fig. 15 is a cross-sectional view of the player arm assembly, the view being taken along the line 15—15 of Fig. 13;

Fig. 16 is an enlarged cross-sectional view of the player arm assembly and mounting, the view being taken along the line 16—16 of Fig. 15;

Figs. 17 and 18 are fragmentary details of the record clamping and centering means, the former being taken along the line 17—17 of Fig. 5A and the latter along the line 18—18 of Fig. 5;

Fig. 19 is an enlarged fragmentary elevational view more particularly of the record selector trip mechanism and a portion of the player arm trip mechanism. In this view, the various parts are indicated in the positions occupied thereby when the phonograph is not in operation, that is, when there has been no selection of any record to be played and the carriage is conditioned to be moved;

Fig. 20 is a view similar to Fig. 19 illustrating the parts in the positions occupied thereby when the carriage has been stopped in alignment with a selected record in the magazine and the cam shaft is conditioned to be operated to effect transfer and playing of the record. The view shows the cam shaft and certain of the cam follower arms in the same positions occupied thereby in Fig. 6;

Fig. 21 is another view illustrating the parts in the positions occupied thereby during the playing of a record;

Fig. 22 is an enlarged side elevational view, partly broken away, of the drive and clutch assembly for selectively driving the carriage through a record selecting cycle and the cam shaft through a record transfer and playing cycle, the view being taken along the line 22—22 of Fig. 2;

Fig. 23 is a horizontal cross-sectional view of the apparatus shown in Fig. 22, the view being taken along the line 23—23 of this figure and illustrating details of mechanism for positively insuring proper alignment of the carriage with a selected record;

Fig. 24 is a view similar to Fig. 22, the view being taken along the line 24—24 of Fig. 22;

Fig. 25 is a cross-sectional detail of the drive and clutch arrangement, the view being taken along the line 25—25 of Fig. 22;

Fig. 26 is a transverse cross-sectional view of a coupling, the view being taken along the line 26—26 of Fig. 24;

Fig. 27 is an enlarged fragmentary cross-sectional view showing the motor and its mounting and the connection of the motor to a shaft driven thereby, the view being taken along the line 27—27 of Fig. 4;

Fig. 28 as a fragmentary cross-sectional detail along the line 28—28 of Fig. 27;

Fig. 29 is a cross-sectional detail through the coupling between the motor and shaft, the view being taken along the line 29—29 of Fig. 27;

Fig. 30 is a cross-sectional view of the lower motor mounting, the view being taken along the line 30—30 of Fig. 27;

Fig. 31 is an enlarged fragmentary cross-sectional view of a motor preloading arrangement which may be utilized in the phonograph to provide more uniform speed of record rotation;

Fig. 32 is a vertical cross-sectional view through the record selector mechanism, the view being taken along the line 32—32 of Fig. 33;

Fig. 33 is a horizontal cross-sectional view of the selector mechanism, the view being taken along the line 33—33 of Fig. 32;

Fig. 34 is an enlarged fragmentary detail of a portion of the selector mechanism illustrated in Figs. 32 and 33, this portion illustrating particularly a double arm record selector that is rotated by movement of the carriage;

Fig. 35 is a diagrammatic illustration of the electrical circuits and control embodied in the phonograph; and Fig. 36 is an enlarged side elevational view of a switch controlling the cycling clutch operating solenoid and the muting of the reproduction apparatus.

Before describing in detail the phonograph illustrated in the drawings and embodying the present invention, it may be well to mention that certain of the features of the phonograph are disclosed and claimed in the contemporaneously filed application of Olgierd Gierwiatowsky Serial No. 441,624 and briefly to describe the sequence of the main operations that takes place in the selection and playing of selected records. The phonograph may be controlled either at the phonograph or from some remote point through a suitable remote control (not shown). In either event, all that is necessary to select a record and side of a record to be played is to operate a record selector button from what may be termed a normal to a displaced position. Immediately upon displacement of the button, the motor which is mounted on the movable carriage is energized by a motor circuit controlling relay. The motor is directly connected to the record rotating means and thus immediately rotates the latter. Simultaneously with the energization of the motor, a clutch, hereinafter called a cycling clutch, is operated by a solenoid to connect the motor to a power shaft having associated therewith a double clutch selectively operable to connect the power shaft to the carriage driving means to effect operation of the carriage through what is termed a record selecting cycle, or to a cam shaft controlling the operation of the various parts of the phonograph including the record transfer means, the record clamping means, and the player arm positioning means through what may be termed a record transfer and playing cycle. Under the above described conditions the double clutch is in carriage driving position.

Thus, upon displacement of a record selector button, the motor is energized and the cycling clutch operated to connect the motor to the power shaft. As a result, the carriage is moved from whatever position it may be in in the direction in which it was last operated. If the selected record and side are playable by the continued movement of the carriage in this direction, then the carriage is stopped with the record transfer means in alignment with the selected record. If not, the carriage moves to the limit of its travel whereat the player arm is shifted from one side of the playing position to the other and the motor reversed to drive the moving carriage in the opposite direction. Then when the selected record position has been reached, a further circuit is closed by the record selecting means to energize a third solenoid which may be termed a record selector trip solenoid. This further circuit is closed for but a brief interval as the selector is so constructed that the circuit is closed through the displaced selector button and the button is returned to normal position immediately thereafter. The return of the selector button also deenergizes the motor starting relay provided no other buttons are displaced, but this does not result in the deenergization of the motor or cycling clutch solenoid. Immediately upon energization of the record selector trip solenoid, the double clutch is operated from its carriage driving position to its cam shaft driving position, thereby to disconnect the power shaft from the carriage driving means and to connect it to the cam shaft.

When the cam shaft is rotated by the motor, the selected record is transferred by the transfer means to the carriage where it is clamped and properly centered in playing position. The player arm is brought into engagement with the outer ungrooved periphery of a record and resiliently forced into engagement with the outer periphery of the record grooves. The cycling clutch is then deenergized by control means operated by the cam shaft and as a result, the motor drives only the record rotating means. During the playing of a record, the player arm moves inwardly toward the center of a record and when it reaches a predetermined position or is operated in the reverse direction, as by an eccentric groove in the record, a player arm trip mechanism is operated to energize again the cycling clutch solenoid with the result that the motor again drives the cam shaft, and the various mechanisms controlled by the cam shaft are operated to remove the player arm out of engagement with the record, return it to initial playing position, unclamp the record, and transfer the record back to the magazine rack.

It may be well to point out that the provision is made for playing either ten or twelve inch records, the transfer mechanism and player arm being so controlled as properly to transfer either size of record and to effect movement of the player arm to properly engage and play either size of record.

When the played record is returned to the magazine, the motor continues to drive the cam shaft and effects operation of the double clutch into the carriage driving position. In the event no other record selector buttons have been operated to displaced position, the movement of the double clutch member results also in the opening of the motor and cycling clutch solenoid circuits to stop the machine, which will remain at rest until another selector button is moved into displaced position. However, if another selector button is in displaced position at the time the played record is returned to the magazine and the double clutch moves into carriage driving position, the motor and cycling clutch solenoid circuit controlling switch will be operated in a direction to open the circuits thereto as in the case no selector button was in displaced position, but since the motor circuit controlling relay is energized by a displaced selector button, the result will be the continued energization of the motor and cycling clutch solenoid to effect a further record selected operation as described above.

Referring now more particularly to Figs. 1 to 4, inclusive, it may be noted that the phonograph of the present invention includes a generally rectangular base or chassis 10 at the rear of which are mounted a stationary record magazine 11 and record selector mechanism 12 and at the front of which is mounted a movable carriage 13.

Figure 1:
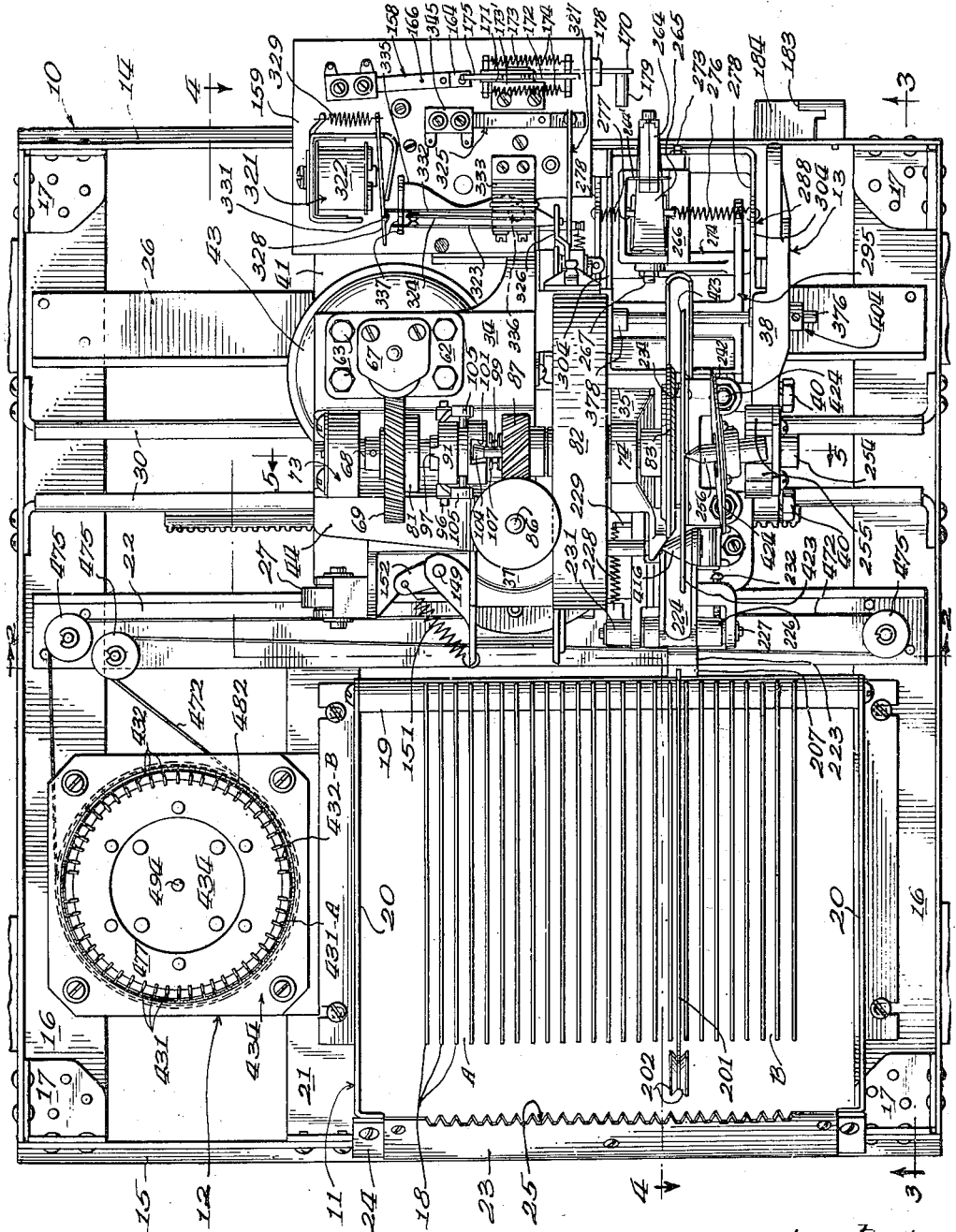
Fig. 1 is a top plan view of the phonograph of the present invention. This view does not illustrate any cabinet but it should be understood that the phonograh may be mounted in a cabinet of any suitable construction.

The base consists primarily of flanged front and rear members 14 and 15 and a pair of side members 16 of generally right angular cross section. These four members are held together by suitable means such as the four corner pieces 17, as best illustrated in Fig. 1. The base 10 may be mounted within any suitable cabinet, although none has been illustrated, in order that the construction of the phonograph itself may be observed more readily.

The record magazine is adapted to hold both ten and twelve inch records in vertical spaced apart relation, the records being mounted between vertically disposed generally segment shaped spacers 18 provided with a suitable soft covering. These spacers are mounted at their front ends on a crosspiece 19 secured at its ends to spaced apart end plates 20 having horizontal flanges, the flange of one plate being secured to one of the side members 16, and that of the other to a supporting bar 21 secured at its rear end to the rear base member 15 and at its front end to a carriage supporting rail 22 having a right angular cross section. The records are further positioned by a toothed bar 23 secured to a crosspiece 24 connecting the rear ends of the magazine end plates 20. If desired, a strip of cushioning material 25 may be held between the crosspiece and toothed bar so that the edges of the records rest on the strip. Before passing from the description of the magazine, it should be observed that the outer ends of the record spacers 18 are spaced a short distance from the rear end of the magazine. This construction provides an arrangement whereby a record transfer arm may move between the two in a convenient manner and may be constructed of a width more readily to engage the edge of a selected record as will be described hereinafter.

The carriage is mounted for movement in front of the record magazine on the previously mentioned rail 22, a second rail 26, similar to rail 22, and the front base member 14, the upper edges of the vertical portions of these three members constituting rails for three rollers 27, 28, and 29 secured to the movable carriage. The rollers 27 and 28 which run on the outer rails 22 and 14 are located at the right end of the carriage as viewed from the front, and the single roller 29 riding on rail 26 is located at the opposite end.

Figure 3:
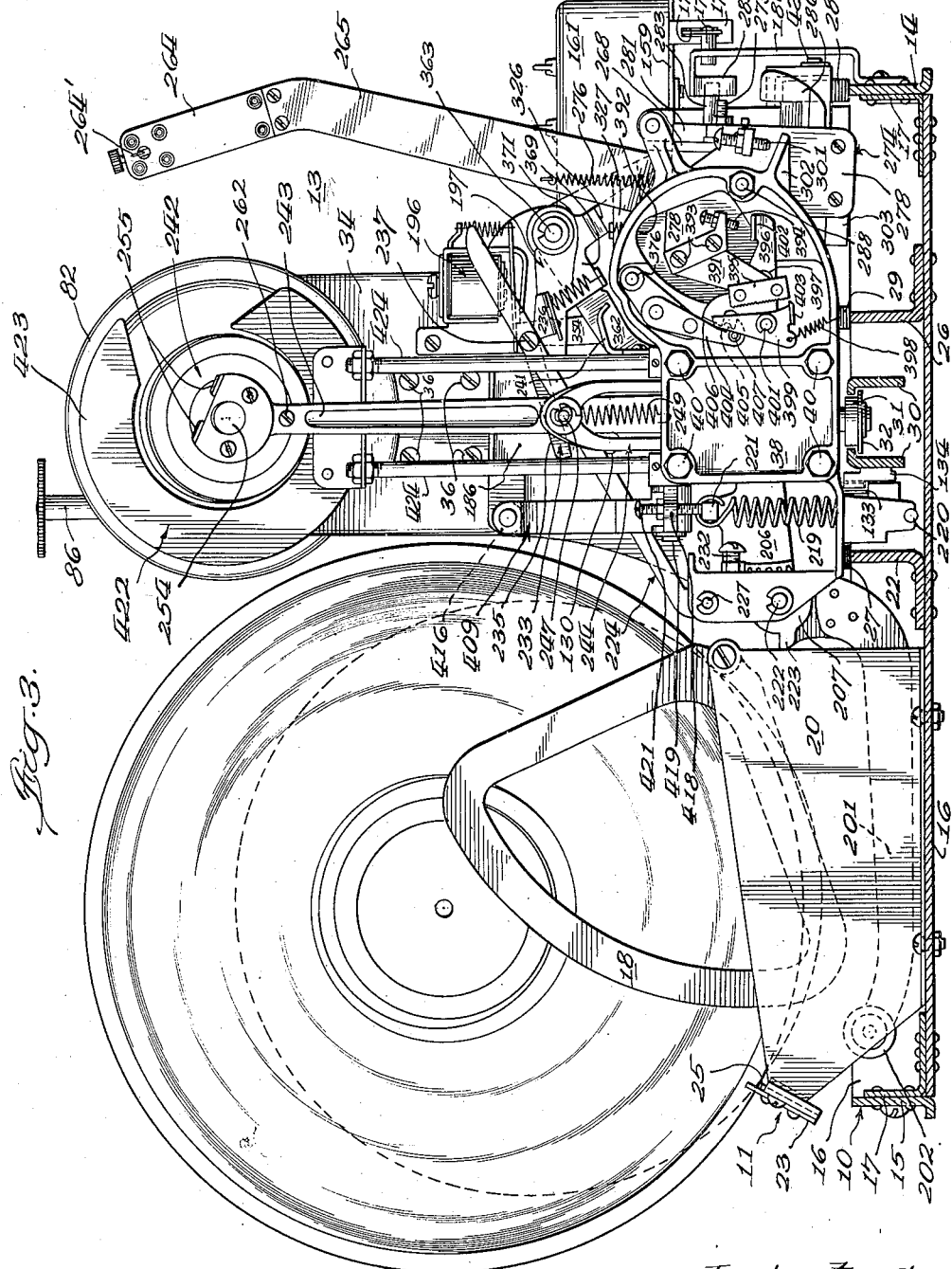
Fig. 3 is an enlarged side elevational view of the phonograph, the view being taken along the line 3—3 of Fig. 1.

The carriage is movably secured above the rails by a pair of guiding strips 30 secured to the base side members 16 and having inwardly extending flanged portions at their upper ends to receive a pair of spaced apart rollers 31, each of which has below it a washer 32 extending underneath the flanged portions, as best illustrated in Figs. 3 and 4. The rollers 31 are located near the opposite ends of the carriage and the arrangement is such, therefore, that the carriage is positively guided for movement along the rails, and, furtheremore, such that the carriage cannot be lifted bodily while positioned on the rails.

The carriage is constituted primarily by two die castings 34 and 35 (see particularly Figs. 2 and 5) secured together in suitable manner as by screws 36 near the upper ends of the castings and by other screws (not shown) near the bottoms of the castings. It includes also two subcastings 37 and 38, the former of which is secured to the rear of casting 34 (as best illustrated in Fig. 2) and serves as a mounting for a subassembly including a double clutch, to which reference will be had hereinafter, utilized selectively to connect the motor to the carriage drive or the cam shaft, and the latter of which is secured to the left side of casting 35 (as best illustrated in Figs. 1 and 3) and serves as a support for a player arm trip mechanism also to be described hereinafter. Casting 37 is secured to casting 34 by four bolts 39 and casting 38 is secured to casting 35 by four bolts 40.

The two carriage supporting rollers 27 and 28 are suitably secured to the casting 34 in such manner as to support the base 41 of the casting above the rails (as best indicated in Fig. 4). The rollers are mounted on pins 42 secured to vertical portions of the casting. The roller 29 is secured in somewhat similar fashion to casting 38.

The carriage is adapted to be driven in opposite directions by a reversible synchronous electric motor 43 of the capacitor type mounted upon and movable with the carriage. This motor also supplies power to the cam shaft, to be referred to hereinafter, controlling the various operations of other apparatus mounted on the moving carriage. It is also directly connected to the record rotating turntable to prevent speed variations.

Referring now more particularly to Figs. 4 and 27 to 30, inclusive, it may be noted that the motor is mounted in vertical position on the casting 34 between a base portion 41 of the casting and an upper platform portion 44. The motor is secured to the base portion by an inverted cuplike support 45 and to the vertical portion of the casting by a bracket 46 having its end 47 apertured to receive the shaft housing 48 of the motor (as best shown in Fig. 27).

The motor is resiliently mounted in the lower support 45 and in the bracket 46. The resilient support at the lower end of the motor is provided by a cup-like rubber bushing 49 adapted to receive a generally U-shaped bracket 50 welded to the lower end of the motor housing. The mounting of the motor at the upper end is provided by a torque resilient rubber bushing 51 spacing the motor from the supporting bracket 46.

The motor drives a vertical power transmitting shaft 52 having worm gear 53 formed thereon, the drive being through a resilient coupling, indicated generally by reference character 54, the lower coupling member 55 of which is suitably secured to the upper end of the motor shaft 56 and the upper coupling member 57 to the lower end of shaft 52. The coupling members have oppositely extending diametrically oppositely located projections or fingers 58 each of which extends through a rubber diaphragm 59. The rubber diaphragm is of a thickness substantially to resist any tendency thereof to buckle when the motor is energized, i. e., it provides a substantially direct drive between the two shafts. The diaphragm also serves, as will be described hereinafter, to impede transmission of high frequency disturbances generally known as "flutter" from the motor to records supported on the turntable means.

The power transmitting shaft 52 is journaled in a pair of spaced apart sleeve bearings 61 mounted in a shaft housing 62 above the platform portion 44 of the casting 34 by a plurality of bolts 63. The shaft is prevented from moving axially in the bearings 61 by a pair of C-washers 64 inserted into grooves formed in the shaft at the ends of the shaft housing. The top of the shaft and shaft housing is covered by a plate 67 secured to the top of the housing.

The motor drives a record rotating shaft whenever it is energized and, as heretofore indicated, it is adapted under certain conditions selectively also to drive either the carriage or a cam shaft.

The record rotating shaft which is indicated by reference character 68 (referring now more particularly to Figs. 1, 2, 4, and 5, particularly the latter), is operatively connected to the power transmitting shaft 52 by a Bakelite gear 69 mounted on shaft 68 to mesh with the worm 53 on shaft 52. Shaft 68 is journaled for rotation about a horizontal axis in a pair of spaced apart sleeve bearings 71 and 72, the former of which is mounted in a boss 73 formed integrally with the platform 44 of casting 34 and the latter of which is mounted in the reduced upper portion 74 of casting 35. Movement of the shaft 68 to the right, as viewed in Fig. 5, is opposed by an end plate 75 against which a ball 76 mounted in a bore at the end of the shaft is adapted to abut. The gear 69 is preferably mounted on a hub structure including a rubber bushing 77 located between a pair of sleeves 78 and 79, the former of which is pinned directly to shaft 68 and the latter of which is secured as by a press fit to the gear hub 81. The bushing 77 serves, as will be described in greater detail shortly, to filter gear noise and to impede transmission of the previously mentioned "flutter" to the turntable means.

When records are played in vertical position, records which are considerably unbalanced relative to their center holes may cause a sine wave type of speed variation of the turntable. The turntable tends to slow down when the heavy side of the unbalanced record is rising and to speed up when the heavy side is descending. This speed variation produces pitch changes in reproduced sound of the same character as those resulting from eccentricity of the record or playing grooves relative to the center hole and is not apparent in the reproduced sound except when present to a relatively great extent. However, by utilizing a synchronous motor in accordance with my invention, this effect of unbalanced records can be reduced to a negligible amount. It is preferable to use a two pole synchronous motor, which has the highest speed for any given frequency of current supply, and to connect it to the turntable means through a drive that is stiff and highly resistant to displacement at frequencies of the order of the rotational speed of the turntable, i. e., at frequencies of about 78 per minute (the turntable being usually driven at a speed of 78 R. P. M.). The coupling diaphragm 59 and rubber bushing 77, which are provided, in accordance with another feature of my invention, for the purpose of impeding transfer of higher frequency disturbances to the turntable are substantially unyielding in response to low frequencies of the order of 78 per minute. Consequently, the drive is stiff and highly resistanct to displacement at this low frequency, much the same as if the drive was effected through a direct metallic or other rigid driving connection.

Thus the speed of the turntable is controlled by the speed of the motor, which runs at a uniform speed determined by the frequency of the current which is usually quite constant. Within the synchronous torque of the motor, the rotor can be displaced but slightly relative to the rotating field.

As just indicated, the coupling diaphragm and bushing serve to impede the transfer of higher frequency disturbances to the turntable means. These disturbances are created at the motor by rotor unbalance and by variations of motor torque, be the motor of a synchronous or non-synchronous type, and are commonly known as "flutter." If transmitted to the turntable and a record thereon, they are transmitted to the sound reproducing apparatus. The bushing also serves to prevent transmission of at least a portion of disturbances that may be caused by the meshing of gears to the turntable.

The coupling diaphragm and bushing, which are substantially unyielding in response to disturbances of frequencies in the neighborhood of 78 per minute, are however, made yieldable to the higher frequency "flutter" disturbances, which have frequencies as low as about 30 or 60 per second, corresponding to two pole and four pole motors operated on 60 cycle alternating current, respectively.

In accordance with another of the features of the present invention, the motor is preloaded as by providing means to resist rotation of the turntable shaft, whereby record unbalance is made to be a smaller percentage of the total motor loading and the speed more uniform. As a result, speed fluctuations resulting from successive downward and upward movement of the heavier part of the unbalanced record, will have less effect on the motor and record speed. The preloading may be provided, as illustrated in Fig. 31, by surrounding the hub of a record clamping member 83 fixedly secured to the end of shaft 68 with a friction band 83A made of oiled leather or the like which has somewhat the nature of a viscous friction, i. e., a friction the coefficient of friction of which increases with speed. It is preferable that the hub be made of hard metal and be highly polished. Chromium plating provides these characteristics. The ends of the band are secured together and serve to prevent rotation of the band with the hub when they strike one or the other of spaced stops 35A secured to casting portion 35.

Preloading the motor aids in overcoming speed variations, be the driving motor of the synchronous or other type, as an induction motor. In the case of the synchronous motor, the preloading causes the rotor to lag somewhat relative to the revolving field so that unbalance of the record has less effect on the instantaneous position of the rotor relative to the field. In the case of non-synchronous motors, the friction means provides a drag on the motor so that record unbalance is made to be a lesser portion of the total force involved.

If desired, the record rotating shaft may be provided with a flywheel 82 fitting into a recess defined by the upper adjoining portions of castings 34 and 35 (as best illustrated in Fig. 5).

The record clamping member 83 is fixedly secured to the end of shaft 68 projecting through the casting 74. This clamping member cooperates with a movable clamping member (to be described hereinafter) to support and rotate a record about a horizontal axis with the recording grooves exposed on both sides of the record. The clamping member is conveniently secured to the shaft by peening the bored left end 84 of the shaft. The axial bore 85 in the shaft is adapted to receive a record centering pin on the movable clamping member, as will be described hereinafter, and it is preferred, that the peened end 84 define a generally bell-shaped opening so that the record can be lifted from the record transfer means as it is clamped in playing position.

As heretofore indicated, the motor not only drives the record rotating shaft, but also selectively drives either the carriage moving mechanism or the cam shaft. When either of the two last-mentioned means is to be driven, the gear 89, which is continuously rotated whenever the motor is energized, is connected to a vertically disposed power shaft 86 by a clutch controlled by a solenoid, hereinafter termed a cycling clutch and a cycling clutch solenoid, respectively. When the solenoid is energized, the clutch is operated to connect the gear 69 with a gear 87 loosely mounted on shaft 68 and meshing with a gear 88 secured to the shaft 86 immediately above a boss 89 also formed integrally with the platform portion 44 of casting 34 (see Fig. 4).

The cycling clutch, indicated generally by reference character 91, is adapted to be moved axially along shaft 68 toward the right (as viewed in Fig. 5) whenever the cycling clutch solenoid, indicated generally by reference character 92, is energized. It is energized during the record selecting cycle and during the record transfer and playing cycle, except during the actual reproduction of the record. In Fig. 5, the apparatus is illustrated in the positions obtaining during the playing of a record at which time the shaft 68 only is being rotated, the solenoid 92 being de-energized. When the solenoid is energized, the solenoid plunger 93 is moved toward the solenoid winding 94 with the result that the clutch operating arm 95 is moved clockwise about its pivot pin 96 to move the clutch member 91 to connect gears 69 and 87. This connection extends between diametrically opposite tapered radial projections 97 at one end of the clutch which extend axially and one of which engages a tapered pin 98 fixedly secured to the hub portion 81 of gear 69. When the clutch is thus connected to the gear 69, the clutch member rotates gear 87 through a pin and slot connection constituted by a pin 99 fixedly secured to the gear and a slot 101 formed at the adjacent end of the clutch.

In order to prevent undue axial movement of the gear 87, the latter is restrained from movement in one direction by a C-washer 102 mounted in a groove formed in the shaft. If desired, a spacing washer 103 may be mounted on the shaft between the gear and the fly-wheel 82.

To facilitate axial movement of the clutch under load, the pin 99 on the gear is provided with a flared end 104 to cooperate with the slot 101 in the clutch which is provided with tapered side walls, as best indicated in Fig. 1.

The clutch is operatively connected to the solenoid operated arm 95 by a yoke 105 formed integrally with the arm and having diametrically oppositely located pins adapted to enter a circular recess 106 formed substantially centrally of the clutch member. The gear driving pin 99 may be located centrally within the slot 101 by a spring 107 secured to the clutch member as by a pin 108 and configured to have its opposite ends relatively closely embrace the pin at a point between the clutch member and the gear. This spring centers the pin in the slot when the clutch is not rotated.

The clutch operating arm is pivotally mounted on the pin 96 which is supported upon bosses 109 formed integrally with the platform portion 44 of the casting 34 at opposite sides of an aperture 111 formed in the platform. The lower end of arm 95 extends below the platform where the clutch operating solenoid 92 is preferably secured as by a bracket 112.

The solenoid plunger 93 and the cycling clutch operating arm are normally biased to move the clutch into the position indicated in Fig. 5, i. e., a position wherein the clutch is disengaged from gear 69, by a spring 113 secured to the end of the plunger and to the bracket. The movement in this direction is determined by an adjusting screw 114 also mounted in the bracket and adapted to abut against the lower end of arm 95.

When the cycling clutch 91 is operated upon energization of solenoid 92, the power shaft 86 is operable selectively to drive either the carriage or the cam shaft through a double clutch member 115, best illustrated together with its associated parts in Figs. 2 and 22 to 25, inclusive, to which reference will now be had. Preparatory to doing this, it is thought best to explain briefly that, when the phonograph is in inoperative position, i. e., when no record selector buttons have been displaced, the double clutch member is in a position (its lowermost) to connect the power shaft to the carriage drive. It also occupies this position in the event a record has been returned to the magazine after having been played and another record is to be played thereby to condition the carriage for movement to select the unplayed record or records.

Returning now to a consideration of the various figures referred to, it may be well first of all to note that the clutch is a part of a subassembly unit mounted in the casting 37 which, it may be recalled, is secured to the back of casting 34 by bolts 39. The subassembly includes not only the clutch member 115, but also an extension 116 of the power shaft 86 connected to the power shaft by a detachable coupling comprising a slotted coupling member 117 secured to the power shaft and a coupling member 118 secured to the upper end of the extension. Coupling member 118 is provided with a pin 119 adapted to enter the slot in coupling member 117 when the parts are assembled as shown. The power shaft is rotatably mounted in casting 34 and more particularly in the boss 89 in the platform portion 44 and in a lower boss 121, it being restrained against axial movement by the hub of the gear 88 and the coupling member 117.

The double clutch member is axially movable relative to shaft 116 but is constrained for rotation therewith by a pin and slot connection, best illustrated in Fig. 25. This connection includes a pin 122 extending through the shaft and having its projecting ends in diametrically opposite axial slots 123 formed in the clutch member. The clutch member is moved in a manner, hereinafter to be described more fully, by a clutch shifting rod 124 having fixedly pinned thereto a yoke 125 having pins 126 extending inwardly into an annular groove 127 formed substantially centrally of the clutch member.

When the double clutch member is in its uppermost position, in which it is illustrated in the various figures, the power shaft 86 and its extension 116 are operatively connected to the cam shaft 130 (see Fig. 22) through a worm 131 loosely mounted on shaft 116 and a worm gear 132 affixed to the cam shaft. When the double clutch member is in its lowermost position, the power shaft is connected to drive the carriage, this connection being through a spur gear 133 loosely mounted on shaft 116 near the bottom thereof and in mesh with a rack 134 secured to the outer side of one of the guiding strips 30, as best illustrated in Figs. 3, 4, and 22.

The power shaft extension 116 is journaled in upper and lower bearing bosses 135 and 136 formed integrally with the casting 37. The cam shaft driving gear 131 is loosely mounted on shaft 116 between the upper bearing boss 135 and a C-washer 137 located immediately below an enlarged integral portion 138 of the gear. Gear 133 is similarly loosely mounted on the shaft 116 between the lower bearing boss 136 and a C-washer 139 located immediately above an enlarged portion 141 formed integrally with the gear.

The driving connection between the double clutch member and the cam shaft driving gear 131 is through a pin and slot connection, the flange 138 of the gear being provided with a downwardly extending tapered pin 142 adapted to enter into tapered slots 143 in the upper end of the clutch member. The driving connection between the clutch member and the carriage driving gear 133 is through a similar arrangement including a tapered pin 144 secured to the flange 141 of the gear and slots 145 at the lower end of the double clutch arrangement.

The double clutch member is so constructed and arranged relative to the two gears driven by it that only one or the other of the gears can be driven at any one time, the clutch member being of a length slightly less than the distance between the ends of the pins 142 and 144. This construction makes it certain that both the cam shaft and carriage cannot be moved at the same time.

In order to position accurately the carriage relative to a selected record, the carriage driving gear 133 is provided with a detent wheel 146 formed integrally therewith and located above the gear flange 141 (see particularly Figs. 22, 23, and 24.). This detent wheel is so correlated to gear 133 and rack 134 that each of the spaces between adjacent teeth corresponds to a selected record. The detent wheel has cooperatively associated therewith a positioning roller 147 adapted to enter the spaces between the teeth (as particularly indicated in Fig. 23) to position the carriage with its transfer arm properly located to engage and effect the transfer of a record from the magazine to the playing position and back again. The positioning roller is mounted on a generally arcuate arm 148 pivotally secured as by a pin 149 to the casting 37. The arm and roller are resiliently biased toward the detent wheel by a spring 151 connected at one end to the casting and at the other end to an arm 152 formed integrally with the arcuate arm 148. The spring 151 is sufficiently strong properly to position the detent wheel and consequently the carriage when the roller 147 moves toward the detent wheel.

In order to prevent undue noise that would be caused by the positioning roller riding over successive teeth during travel of the carriage, the roller is kept out of substantial engagement with the wheel during such travel. This is done by a pin 153 slidably mounted at the free end of arm 148 and biased upwardly by a spring 154 held between one forked end portion of the arm and a collar 155 on the pin. When the double clutch member 115 is shifted downwardly (looking at Fig. 22) preparatory to movement of the carriage, a horizontally projecting arm 156 secured to the double clutch operating yoke 125 moves the pin 153 downwardly. Then, as the gear 133 and detent wheel 146 are rotated, the detent wheel forces the roller 147 and arm 148 away from the detent wheel with the result that the pin 153 is moved beyond the horizontally projecting arm 156. Once beyond the arm, the spring 154 forces the pin upwardly so that the upper end thereof abuts against the side of arm 156 to prevent the roller and arm 148 from following the detent wheel inward, whereby undue noise and jerking are eliminated.

The double clutch member is prevented from being moved upwardly from carriage driving position to the cam shaft driving position unless the carriage is properly positioned by a finger-like element 157 (see Figs. 22 and 23) extending toward the detent wheel and formed as a part of the member defining the arm 156 utilized to prevent the roller 147 from contacting the detent wheel as the latter rotates. Looking particularly at Fig. 23, it may be noted that unless the detent wheel is properly positioned, the double clutch member cannot be moved upwardly into the position in which it is indicated in Fig. 22, since the finger 157 is below the detent wheel during the carriage driving operation. Thus the carriage is driven until the finger 157 is clear of the points on the detent wheel, after which the double clutch member is free to move upwardly to bring finger 157 above the detent wheel by reason of its location in one of the toothed spaces on the detent wheel, as illustrated in Fig. 23.

When the double clutch 115 is in its lowermost position and the motor is energized to perform a record selecting cycle, the gear 133 is rotated through the cycling clutch and the double clutch in its lowermost position. The gear 133, it may be remembered, is in mesh with the rack 134 fixed to the base so that as the gear is rotated in one direction, the carriage moves in one direction, and as the gear is rotated in the opposite direction, the carriage is moved in the opposite direction.

The direction of rotation of the motor 43 is reversed at the two limits of travel of the carriage, which are somewhat farther apart than the end records in the magazine, by a reversing switch indicated generally by reference character 158. This switch is mounted on a base plate 159 (see particularly Figs. 1 and 13) and is covered by a detachable cover plate 161 (as shown in Figs. 3 and 13). The base plate is secured to the casting 34 and defines with the front wall 162 of the casting a compartment 163 (see Fig. 4) for a capacitor (not shown) for the motor 43.

The motor reversing switch 158 is illustrated as being of the leaf type but may be of any suitable construction as long as it is capable of being operated into two positions for producing rotation of the motor 43 in opposite directions. In the instant embodiment, the motor 43 is a single phase, capacitor type, alternating current synchronous motor and the switch has thus been illustrated as comprising a pair of inter-connected but electrically insulated movable switch blades 164 and 165 and three relatively fixed switch blades 166, 167, and 168.

The movable switch blades 164 and 165 are operated with snap action at the limits of movement of the carriage by an overcenter toggle mechanism indicated generally by reference character 169 operable by a generally horizontally movable arm 170. The overcenter toggle mechanism includes a pair of levers 171 and 172 connected together by a pair of overcenter springs 174 and pivotally movable about a pin 173 secured to a bracket 173' mounted on top of the base plate 159. The lever 171 is provided with a forked switch blade operating element 175 made of insulating material and the lever 172 is provided with a projection 176 extending below the base plate 159 and pivotally connected to the right end (as viewed in Fig. 13) of the actuating arm 172. The free end of the arm 170 projects through an aperture 177 formed in a downwardly extending tongue-like projection 178 formed integrally with the base plate 159.

When the toggle mechanism actuating arm 170 and associated mechanism and switch are in the positions illustrated in Fig. 13, the motor is rotated in such a direction as to drive the carriage to the right. When the carriage approaches its limit of movement in this direction, a pin 179 secured to the free end of the switch actuating arm 170 comes into contact with a stop defining face 181 on a bracket 182 secured to the front base member 14 with the result that the arm remains stationary while the carriage continues to move. When the arm is restrained from movement, the overcenter toggle lever 172 is turned in a clockwise direction about pivot 173 until springs 174 pass overcenter and the switch is quickly moved from the position in which it is indicated in Fig. 13 to its opposite position (wherein it is indicated in Fig. 14) thereby to reverse the direction of rotation of the motor. It might be mentioned at this point that when the switch is reversed, the player arm is also shifted from one side of the playing position to the other as will be described hereinafter. When the switch and operating arm have been shifted as described and the carriage moves in the opposite direction (to the left as viewed in Figs. 13 and 14), then when the carriage reaches the limit of its movement, the pin 179 strikes the stop defining face 183 of a bracket 184, also secured to the base member 14. The operating arm 170 is thus again restrained from movement while the carriage moves and it shifts the overcenter toggle lever 172 in a counterclockwise direction until the springs 174 again pass overcenter when the switch is quickly operated into the position in which it is shown in Fig. 13. It might be noted that in Fig. 14 the movable carriage is shown after it has moved some distance toward the left from its right limit.

The cam shaft 130 has fixedly secured to it a number of cams for operating the record transfer means, the player arm positioning means, and the record clamping and centering means. It also has fixedly secured to it other cams for controlling the double clutch member, the motor and cycling clutch solenoid circuits, and two trip mechanisms, these being the record selector and the player arm trip mechanism. The cam shaft, referring now more particularly to Figs. 5 and 6, is rotatably mounted in a pair of spaced apart sleeve bearings mounted in downwardly extending portions 185 and 186 of castings 34 and 35, respectively, as shown in Fig. 5. The previously referred to cam shaft driving gear 132 is located to one side of casting portion 185 and the cams are secured to the shaft between the casting portions 185 and 186 whereby any substantial axial movement of the cam shaft is prevented.

The cam shaft supports four spaced apart cams indicated generally by reference characters 191, 192, 193, and 194. The cams are preferably constructed of plates secured together and suitably spaced apart by spacers to which they are also secured by axially extending pins extending through the cam assembly. The cam assembly is secured to the cam shaft by a radial pin 195 passing through one of the spacers.

The cams are constructed in effectively symmetrical fashion in order that the functions performed by them are the same irrespective of the direction of rotation of the cam shaft. This enables the cam shaft to be driven by the reversible motor 43 utilized to move the carriage to its various record selecting positions.

Before proceeding with detailed consideration of the various mechanisms operated by the cams, it might be well briefly to state that the record clamping and centering mechanism is operated by the cam 191; the record transfer mechanism is operated and the positioning of the player arm relative to the recording surfaces is effected by cam 192; that the double clutch member, and the motor and cycling clutch solenoid circuits are controlled by cam 193; and that the record selector trip and player arm trip mechanisms are conditioned for operation by the cam 194. When the phonograph is at rest after having played the last selected record or when the carriage is being moved into alignment with a selected record, the cam shaft occupies what may be termed a normal position wherein the cams occupy the positions in which they are indicated in Fig. 6. (This figure, it should be noted, shows the cam followers in positions occupied by them after the carriage has been stopped and the double clutch member 115 moved upward, but before the cams have been rotated from their normal position.) When the carriage has moved so as to align the transfer mechanism with a selected record, the double clutch member 115 is operated from its down into its up position by the energization of a record selector trip relay 196 (see Figs. 2 and 19, particularly the latter) which has associated with it a clutch operating lever 197 connected to the upper end of the clutch shifting rod 124 by a pin and slot connection including a pin 198 secured to the upper end of the rod and a slot 199 at the left end of the lever, as viewed in Fig. 19. The construction and operation of the mechanism for shifting the double clutch between its two operative positions will be described in greater detail hereinafter.

The record transfer mechanism is operated by the cam 192 as indicated above and it, as will be described hereinafter, is also utilized to position the player arm relative to the recording surfaces of the records. The record transfer mechanism is so constructed and arranged that either 10 or 12 inch records may be transferred and played by the phonograph.

The transfer of selected records is effected by a transfer arm 201 which is movable with the carriage longitudinally underneath the records in the magazine and which is also mounted on the carriage for pivotal movement from a position underneath the records, wherein it is shown in Fig. 3, upwardly to contact the edge of a record and to roll the latter from the magazine onto a pivotally mounted record trough toward playing position, the final positioning of the record being effected by record clamping and centering means to be described hereinafter. In the transfer of ten inch records, the transfer arm moves somewhat beyond the position in which it is indicated in Fig. 10, and in the transfer of twelve inch records, it moves to the position in which it is shown in Fig. 12.

The record transfer arm 201 consists of a thin curved plate having a relatively wide record edge engaging outer end. This outer end consists of a pair of generally conical members 202 riveted to the arm, as best illustrated in Fig. 11. The arm 201 itself is quite thin in order that it may be readily moved between the record spacers 18.

The record transfer cam 192 is operatively connected to the record transfer arm through a cam follower arm, indicated generally by the reference character 203 (see particularly Figs. 6 to 9, inclusive), a rotatably mounted shaft 204 to which the follower arm is fixedly secured, a short gear segment operating arm 205 also fixedly secured to the shaft, a gear segment 206 rotatably mounted on the shaft 204, and a transfer arm supporting member 207 having a gear 208 formed integral therewith and in mesh with a segment gear 206.

The cam follower arm 203 carries at one end a roller 209 engaging the cam. Under normal conditions, that is, when the cam shaft has not been rotated from its normal position, as indicated in Fig. 6, this roller rests in a slightly arcuate cutaway portion 211 in cam 192, thereby giving the cam assembly a positively determined stopping position. The cam follower arm, as already indicated, is fixedly secured to the shaft 204 as by a pin 212 and the arm, as well as the shaft 204, are biased toward the cam by a spring 213 secured at one end to a projection 214 formed integrally with the follower arm and at its other end to an upstanding lug 215 formed integrally with casting portion 35, as indicated in Figs. 9 and 10. The shaft is rotatably mounted near the lower ends of downwardly extending portions 185 and 186 of the two main castings 34 and 35, the cam follower arm 203 being located between these sections to engage the cam 192, which, it may be recalled, is also located between these downwardly extending portions.

The gear segment operating arm 205 and likewise the bifurcated end of the segment gear 206 (the ends being indicated by reference characters 216) are located on the portion of the shaft 204 projecting through casting 35 toward the casting 38. The operating arm 205 is preferably secured to the shaft 204 between the bifurcated ends 216 of the segment gear as by a pin 217.

The transfer arm operating segment gear 206 is loosely connected to the segment gear operating arm 205 by an adjustable connection (see Fig. 8) including an adjusting screw 218 threaded through a portion of the gear and adapted to bear against the operating arm 205 against which it is resiliently biased by a pair of relatively heavy springs 219 secured at their lower ends to a pin 220 (see Fig. 3) secured to the base portion of casting 35 and at their upper ends to an arm 221 formed integrally with the gear and extending transversely thereof. This construction enables the cam follower and gear segment operating arm 205 to be moved some distance after the transfer arm and gear segment are stopped, as they are under certain conditions to be explained hereinafter.

The transfer arm carrying member 207 is rotatably supported by a shaft 222 (see Figs. 2 and 3) supported by spaced apart projections cast integral with casting 35. The carrying member is also provided with an integral projection 223 whereby the operation of the transfer arm is correlated with the previously mentioned record supporting trough indicated generally by reference character 224 in a manner now to be described.

The record trough 224 is utilized selectively to determine the extent of movement of the record transfer arm 201 dependent upon whether ten or twelve inch records are to be played. In the event a ten inch record is to be played, the transfer arm moves a greater distance than it moves when a twelve inch record is to be played, thereby to bring the center holes of both sizes of records into a position wherein the record clamping and centering means is adapted to enter the center holes.

In the transfer of ten inch records, the transfer arm is moved under the control of cam 192 and associated mechanism described above from the position in which it is shown in Fig. 3, past the intermediate position in which it is shown in Fig. 10, to a position wherein the center hole of record is slightly below and to the left (as viewed in Fig. 10) of the center of the record rotating shaft 68. When the transfer arm 201 moves somewhat beyond the position shown in Fig. 10, the abutment 223 thereon strikes a pin 225 secured to the downwardly extending bifurcated end of the trough, the ends being indicated by reference character 226, so that continued movement of the transfer arm rotates the trough in a counterclockwise direction. The result is a combined lifting and movement of the record toward the ultimate playing position.

The trough is mounted for pivotal movement about a shaft 227 mounted, like shaft 222, on the two spaced apart projections formed integrally with casting 35.

The trough is biased toward what may be termed its uppermost position (illustrated in Fig. 9) by a spring 228 secured at one end to a pin 229 affixed to the casting 35 and at its other end to a downwardly extending arm 231 supported at its upper end on shaft 227 and connected for simultaneous movement with the trough by a pin and slot connection constituted by the pin 225 and a slot 226' formed in the arm as best indicated in Figs. 2 and 4. The extent of upward movement of the trough is determined by an adjusting screw 232 (see particularly Fig. 9), threaded through a portion of casting 35, against which one of the bifurcated ends 226 of the trough strikes. This adjusting screw also determines the extent of upward movement of the trough by the transfer arm, as well as the extent of movement of the transfer arm for the transfer of ten inch records. It may perhaps be noted at this point that although the extent of movement of the transfer arm is thus determined by the adjusting screw 232, the transfer operating arm 205 secured to the shaft is capable of further movement by reason of the loose connection between the latter and the segment gear. This further movement is utilized to perform other functions as will be described hereinafter.

In the transfer of twelve inch records, the transfer arm is moved through a lesser distance, the extent of movement being indicated in Fig. 12. In the transfer of these larger records, the movement of the transfer arm is limited by the trough 224 but not by the adjusting screw 232, the trough being provided with a latching arrangement whereby the trough is latched in a predetermined position. This latching arrangement is so constructed and arranged that the position and weight of the twelve inch record effect latching of the trough in a predetermined position. The latching arrangement does not, however, come into play during the transfer of ten inch records.

Referring now more particularly to Figs. 9 and 12, it may be noted that when the transfer arm 201 is moved upwardly to effect the transfer of a twelve inch record from the magazine to the carriage, the record is rolled from the magazine on to the trough. As the record rolls up the trough, it strikes a latch member, indicated generally by reference character 233, pivotally secured centrally of and near the free end of the trough which is apertured, as indicated by reference character 234, to receive the latch member. The latch member comprises a portion 235 extending longitudinally of the trough and a latch finger defining portion 236 extending below the trough. The latch is pivotally secured to the trough as by a pin 237 extending through the latch at the junction of the portions 235 and 236. The latch finger itself is constituted by a thin metal plate 238, one end of which projects in the same general direction as portion 235 and is spaced downwardly from the latter. The latch member is slightly biased in a clockwise direction to the position in which it is shown in Fig. 9 by a leaf spring 239 secured to the underside of the trough and having a hooked portion extending upwardly through the aperture 234 and engaging the bottom of portion 235 of the latch. As the record is rolled up along the trough, the weight of the record moves the trough downwardly (that is in the clockwise direction) against the bias of the spring 228. As the record is rolled further up the trough, its leading edge strikes the portion 235 of the latch and forces it downwardly against the spring 239 so as to cause the latch to form, in effect, a continuation of the trough. Further movement of the record by the transfer arm moves the record out farther from the pivot point of the trough with the result that the trough is moved downwardly until it strikes a fixed rest and cooperating latch member 241 secured to casting 35. Thereafter the record is rolled further into the vicinity of the pin 237 about which the latch pivots and, as a result, the spring 239 moves the latch in a clockwise direction causing the end of the latch finger 238 to project underneath the end of the cooperating latch member 241. Continued movement of the record transfer arm 201 then moves the trough upwardly a slight distance, to the position in which it is shown in Fig. 12, by reason of the abutment 223 striking the pin 225 on the bifurcated short downwardly extending arm 226 of the trough. Further upward movement of the trough is prevented by the latching arrangement although the transfer arm operating means moves further. This further movement of the latter, however, does not effect movement of the transfer arm, the cam arm 203 and the shaft 204 moving independently by reason of the abutting contact between the segment gear operating arm 205 and the adjusting screw 218 in the segment gear.

The transfer mechanism thus moves a twelve inch record substantially into the position shown in Fig. 12 in solid lines from whence it is clamped and centered by means to be described hereinafter. When thus clamped and centered, it occupies the position shown in phantom in Fig. 12 wherein the record is shown lifted clear of both the trough and transfer arm. It may be well to note at this point that a ten inch record is similarly lifted clear of the record transfer arm and trough by the clamping and centering means.

When a twelve inch record is returned to the magazine, the record is first released and permitted to contact the trough and the transfer arm. Thereafter the transfer arm is moved downwardly with the result that the record rolls down the trough. As it rolls down the trough, the latch member is first rotated in a counterclockwise direction about its pivot to release the end of the latch finger 238 from the associated latch member 241, and as the record continues to roll downwardly, the trough rises until it reaches its uppermost position as determined by the adjusting screw 232. Thereafter the continued movement of the transfer arm permits the record to roll down into the record magazine.

It should be noted that a ten inch record is similarly returned to the magazine but that in the case of the transfer of a ten inch record from the magazine to the turntable, the latch does not come into play, it being preferred that the trough bias spring 228 be of a strength sufficient to prevent the trough from moving downwardly far enough to engage the latching mechanism. However, this strength of spring need not be used since a ten inch record is not rolled up along the trough far enough to permit any clockwise rotation of the latch 233 into latching position at the time the trough is in a position at which the latch might be effective.

The record is clamped and centered in a playing position after it has been moved by the record transfer mechanism in the manner described above, by mechanism now to be described. This mechanism is operated by the cam 191 and it consists primarily of a record clamping member indicated generally by reference character 242 (see particularly Figs. 5, 5A, 17, and 18) movably mounted at the upper end of a clamping arm 243 movable toward and away from the previously mentioned clamping member 83 by a cam follower arm indicated generally by reference character 244, as best indicated in Figs. 1 to 3, 5, and 5A, particularly Fig. 5.

The cam follower arm 244 has at one end a roller 245 engaging the cam 191 and it is pivotally mounted intermediate its ends on a shaft 246 secured to casting 35. The follower arm is apertured centrally to provide a space for mounting the clamping arm 243 on the shaft 246. The clamping arm is loosely mounted on this shaft but is operatively connected to the upper end of the follower arm by a connection including a pin 247 fitted loosely in the two arms and a spring 248 surrounding the pin and also located between the two arms. The construction is such that pressure that can be exerted on the clamping arm by means of the cam and cam follower is limited by the compression of spring 248. The spring 248 is so designed that a record is securely and firmly held in place between the record clamping members 83 and 242 yet without injury to the record. The pin 247 is held in place with the spring under compression by means of spaced apart C-washers at its outer ends.

The clamping arm 243 is normally biased away from clamping position and the cam follower arm 244 is biased to hold the roller 245 in engagement with the cam 191 by a spring 249 secured at one end to the pin 247 and at its opposite end to the casting portion 38.

The record clamping member 242 is so constructed and arranged that as the clamping member is moved toward the other clamping member 83, it not only clamps the record, but it also moves the record upwardly and toward the front of the machine, thereby moving the record away from the record trough 224 and from the end of the record transfer arm 201. These results are obtained by mounting the clamping member 242 for pivotal movement in an upward and forward direction and providing it with a centering pin having a pointed end cooperatively associated with the flared opening 84 at the end of the record rotating shaft 68.

Referring now more particularly to Figs. 3, 5, 5A, 17, and 18, it may be noted that the clamping member 242 comprises a generally annular disc 251 loosely mounted at the end of a supporting pin 252 mounted for universal movement at the upper end of clamping arm 243 by a ball and socket joint constituted by a ball 253 formed integrally with the pin and rotatably mounted in a socket formed in a cap 254 adjustably secured to the upper end of the arm 243. The pin is constrained for movement at an angle approximately 30° from the vertical by the bifurcated end portions 255 of the clamping arm 243, as best shown in Figs. 17 and 18. The free end of the supporting pin 252 is generally conical in shape and surrounded by the centering pin proper 256 which is provided with a pointed end. The opposite end of the centering pin is provided with an annular flange 257 whereby it is fixedly secured to the disc 251 in any suitable manner, for instance as by peening, as illustrated. The centering pin and disc are loosely mounted on the supporting pin 252 by reason of the conical end of the pin 252 being somewhat smaller than the central opening in the centering pin. In order to permit the disc and centering pin freely to rotate relative to the supporting pin 252, a thrust ball bearing 258 is located between the end of the supporting arm and the centering pin. The relative radial movement of the disc and centering pin assembly about the supporting pin 252 is limited by an apertured, generally cup-shaped, member 259 secured to the disc 251. This cup-shaped member also prevents the disc and centering pin assembly from being inadvertently removed from the supporting pin as it surrounds a C-washer 261 secured to the central portion of the supporting pin.

The centering pin and clamping disc assembly is so located by an adjusting screw 262 that when the clamping arm is moved toward the rotatable clamping member 83, the pointed end of the centering pin 256 is adapted to pass through the not yet centered center opening of the record disc and to strike against the flared opening 84 of the bore 85 at the end of the record rotating shaft. Continued movement of the clamping arm effects movement of the centering pin into an intermediate position in which the assembly is in Fig. 5A and finally to the fully centered and clamped position as shown in Fig. 5. In this position, the record (indicated by reference character 263) is securely held between the discs 83 and 251 and is properly centered by reason of the centering pin 256 being in the bore 85 formed at the end of the shaft 68. Consequently, when the shaft 68 is rotated with a record clamped thereto, as shown in Fig. 5, the record rotates in what may be termed a playing position. In this position the pin 256 is accurately centered with the bore 85 without requiring exact alignment of the arm 243 and cap 254. This result is attained by the double universal joint action of the ball 253 and the ball 258.

The records are reproduced when clamped in the playing position by a transducer or pickup 264 mounted at the end of a generally vertically extending player arm 265, preferably made of solid wood. The pickup includes needle means having two points 264' extending diagonally beyond the pickup casing. The needle points are angularly so disposed as to follow the grooves when in contact with opposite sides of records, the player arm and pickup being located on one side of the playing position when the carriage moves in one direction to play one side of a record and on the other side of the playing position to play the other side of a record when the carriage moves in the opposite direction.

The player arm is shifted from one side of the playing position to the other at the limits of movement of the carriage at substantially the same time that the motor reversing switch is operated, as heretofore described. To effect this shift, the player arm is mounted for pivotal movement about an axis generally parallel to the plane of rotation of the record on a subcarriage mounted for pivotal movement about an axis substantially parallel to and in the plane of rotation of the record in playing position. When the subcarriage is pivotally moved about its axis from one of its two positions to the other, the first-mentioned axis is moved from one side of the playing plane to the other. The shifting of the player arm is effected by an abutment on the subcarriage which cooperates with fixed abutments at the limits of travel of the carriage.

Referring now more particularly to Figs. 1, 3, 13, 15, and 16, it may be noted that the player arm is mounted on a subcarriage or cradle, indicated generally by reference character 266, for pivotal movement about an axis generally parallel to but spaced to one side of the plane of record rotation defined by a pair of spaced apart pivot pins 267 secured to the generally triangular ends 268 of the cradle. These pins support for pivotal movement a pin 269 upon which the player arm is resiliently mounted by a pair of spaced apart rubber bushings 271 (see Fig. 15). The cradle and members 268 are connected by a pair of crosspieces 272 located at opposite sides of the player arm.

The cradle 266 is mounted for movement about an axis parallel to and in the plane of rotation of the record in playing position by a pair of pins 273 mounted in a main carriage or cradle indicated generally by reference character 274 mounted for pivotal movement about an axis perpendicular to the plane of rotation of the record (that is, parallel to the axis of rotation of the record) in order to permit the player arm and pickup to follow the record grooves for reproduction and to enable the player arm and pickup to be returned to initial position after having played a record. The construction and operation of the main cradle 274 will be described shortly.

Returning now to a further consideration of the cradle 266, it may be noted that the pins 273 are threaded through bosses 275 formed in the main cradle 274 and pass through apertures provided at the apices of the generally triangular end plates 268 of the cradle.

The player arm and pickup are biased toward the playing position when on either side of the playing position by a pair of springs 276 and 277, the inner ends of which are connected to the player arm and the outer ends of which are connected to the end frame members 278 of the main carriage 274. From an inspection of Fig. 13 it may be noted that the spring 276 is effective to bias the player arm 265 toward the record 263 by reason of it being extended further and located at a greater angle to the player arm than spring 277. When the player arm is shifted to the opposite side of the playing position, the spring 277 is effected to bias the player arm toward the record.

When the subcradle 266 is shifted from one side of the playing position to the other, it moves between limits defined by the engagement of angularly disposed flanges 281 formed on the front end frame 268 of the cradle with angularly disposed ends 282 of the front boss 275 formed on the main cradle 274.

The player arm carrying cradle 266 is shifted from one side of the playing position to the other at the limits of movement of the carriage by a stud or pin 283 formed integrally with the cradle and which is adapted to abut against abutments 284 and 285 formed by bent down flanges in the previously referred to brackets 182 and 184 at the right and left limits of movement of the carriage and which brackets also provide fixed abutments for operating the motor reversing switch. Assuming, for instance, that the player arm occupies the position in which it is shown in Fig. 13, then when the carriage moves to the right, the stud 283 strikes the abutment 284. As the carriage continues to move, the stud 283 is held stationary with the result that the cradle 266 is rotated counterclockwise about the pivot pins 273 and as the stud passes from one side to the other of the axis defined by the pins, the cradle quickly moves to its other limiting position, under the influence of gravity and the downward component of the pull of the springs 276 and 277, with the player arm and pickup on the other side of the playing position, that is, the left side as viewed in Fig. 13. Assuming, now, that the player arm and pickup have been shifted to the left side of the playing position, then, when the carriage moves to the left and approaches the limit of its movement, the stud 283 strikes abutment 285 and with continued movement the player arm is shifted to the right side of the playing position, that is, the position in which it is indicated in Fig. 13.

The player arm is counterbalanced about the axis defined by pins 267 by a weight 286 secured in suitable manner to the lower end thereof as by the bolts 287 (see Fig. 15).

When the record trough 224 is in its uppermost position, the player arm is positioned to be brought into engagement with the outer peripheral ungrooved edges of ten inch records, but, when a twelve inch record is transferred into playing position and the trough 224 is in its lowermost position, the player arm is then moved into a position where it can be brought into contact with ungrooved outer peripheral edge of the larger record. As already indicated, the player arm is mounted upon an assembly including the two cradles 266 and 274. The positioning of the player arm for playing either ten or twelve inch records is effected by movement of the cradle 274 about an axis parallel to the axis of rotation of the record defined by the spaced apart hardened steel pins 288 (see Fig. 13) engaging the end frames 278 of the cradle, which pins are mounted in casting portions 34 and 38. The player arm is biased into position to contact the peripheral edges of ten inch records by the record trough biasing spring 228 which, it may be remembered, is connected to the downwardly extending arm 231 movable with the record trough. The lower extremity of this arm has associated with it a slidable rod 289 (see particularly Figs. 9 and 10) mounted for movement in the previously mentioned lug 215 and a similar lug 291 located near the rear end of the rod. When the trough is in its uppermost position, as indicated in Fig. 9, either when no record is being played or after the transfer of a ten inch record into playing position, the rod 289 is moved to its most forward position and has moved the cradle 274 counterclockwise about the pivot pins 288, the movement being resiliently effected through a leaf spring 292 secured to the rear of cradle 274 and against which the rod abuts. This spring 292 may be adjusted by means of an adjusting screw 293 threaded in cradle 274 to secure the exact position suited for the pickup to contact the smooth outer edge of ten inch records (see Fig. 9).

When a twelve inch record is transferred into playing position, the record trough is moved downwardly and latched by the larger record so that the lower extremity of the arm 231 does not contact the rod 289 (as indicated in Fig. 12 and also in Fig. 10, which illustrates an intermediate position during the transfer of a ten inch record when the rod 289 has not yet been moved to its forward position by the end 231 of the transfer trough). Consequently the position of the player arm and cradle 274 is not affected by the position of the record trough, and the player arm is moved into a limiting position farthest away from the axis of rotation of a record in playing position (see Fig. 13) by the end of a player arm control lever, indicated generally by reference character 295, the purpose and operation of which will be described in greater detail hereinafter. At this time the right hand front end of the control lever 295, strikes the front cross member of the main cradle 274 to move the cradle about the pivot pins 288. A pin 294 mounted on the control lever 295 near the right hand front end is adapted to contact the lower leaf spring 296 of a pair of leaf springs 296 and 297 angularly disposed relative to each other and secured to the main player arm cradle 274 adjacent end frame member 278, as best illustrated in Fig. 9, by a pair of screws 298. The spring 296 cooperates with the pin 294 to prevent oscillation of the player arm when the latter is moved to its ten inch position. The limit position for playing twelve inch records is adjustably determined by an adjusting screw 301 secured near the front edge of the cradle 274 and adapted to abut against a projection 302 formed integrally with casting 38, as best illustrated in Fig. 10. It might be noted here that while Fig. 10 illustrates an intermediate position during the transfer of ten inch records, the player arm is shown in solid lines in its twelve inch limiting position. This results from the depression of the record trough by the weight of the record to move the trough arm 231 away from the end of the player arm positioning rod 289.

The player arm assembly, including the player arm and the two cradles, are completely counterbalanced about the axis defined by the pins 288 (the axis parallel to the axis of rotation of the records), by a counterweight 303 secured to the lower ends of the end frame members 278 of the frame 274, as illustrated in Figs. 9 and 13.

The player arm is moved into engagement with the outer peripheral edge of a record in the playing position and moved out of engagement with the record after it has been played by the player arm control lever 295 mentioned briefly above. This lever is rotatably mounted on the shaft 204 and actuated by the transfer cam follower arm 203 in a manner now to be described. The lever comprises a pair of spaced apart curved arms 304, the rear ends of which are provided with hub defining portions 305 whereby the control arm is mounted on the shaft 204. The arms are connected by a bridging portion 306 cast integrally therewith. One of the arms 304, the one located to the right as the phonograph is viewed from the front, is provided with a projection 307 extending toward the other arm adapted to be engaged by the transfer cam follower arm 203 near the end of the record transfer operation and substantially simultaneously with the operation of the record clamping means by its associated cam. At this time, the player arm control is moved upwardly by a stud 308 secured to the transfer cam follower arm below the projection 307 on the former. The lever 295 is biased downwardly toward the stud 308 by a spring 309 secured at its lower end to the cam follower arm 203 and at its upper end to a projection 311 formed integrally with the right player arm control lever arm 304, as illustrated in Fig. 9.

When the player arm control lever 295 is moved upwardly in the manner indicated above, it is operative to release the player arm so that the latter is moved into contact with the peripheral edge of a record in playing position by one or the other of the biasing springs 276 or 277. This release is effected by the upward movement of downwardly projecting fingers 312 (see Fig. 16) formed at the front ends of the arms 304 and terminating in opposed curved surfaces 313 cooperatively associated with small rollers 314 secured to the player arm substantially in alignment with the axis defined by the pins 288.

Referring now more particularly to Fig. 16, it may be noted that as the player arm control lever 295 is raised from its indicated position wherein the right finger 312 is in engagement with the right roller 314 and holds the player arm away from the record, right finger 312 is lifted thus permitting the spring 276 to swing the player arm in a counterclockwise direction about the pivot pins 267 until the pickup needle engages the peripheral edge of a record. The operation is substantially the same in the event the player arm 265 has been shifted to the opposite side of the playing position to play the other side of a record, at which time the raising of the control lever permits the spring 277 to shift the player arm in a clockwise direction about the pivot pins 267. After the player arm has thus been brought into contact with the record, the player arm control lever 295 is moved further in an upward direction resiliently to force the needle into the outermost record groove.

The pickup is moved into engagement with the outermost end of a record groove after having been brought into contact with the outer peripheral edge of a record by the continued upward movement of the control lever 295, this continued movement causing the pin 294 mounted in the outermost extremity of the right control lever arm 304 to engage the upper leaf spring 297 secured to the main player arm cradle 274. The engagement of the pin with the leaf spring, which takes place after the needle has engaged the outer edge of the record, resiliently biases the cradle as well as the pickup and its needle toward the center of the record so that the needle is effectively brought into the record groove. The pin and spring 297 are so constructed and arranged that this biasing action takes place in substantially the same manner for either ten or twelve inch records, that is, the spring is so located relative to the pin and movement of the pin is sufficient to impart this biasing movement to the player arm when the latter is positioned to play either size of record.

After a record has been played, the player arm control lever 295 is moved downwardly to effect movement of the player arm out of contact with the record. As the control lever moves downwardly, the curved surface 313 strikes a roller 314 and thereby effects movement of the player arm out of contact with the record, the particular surface and roller that are engaged depending upon the side of the record being played.

In order to adjust the movement of the player arm toward and away from the record by the player arm control lever 295, the rollers are preferably so mounted as to be movable relative to the projecting fingers with which they are associated. If reference be had to Fig. 16, it may be noted that the rollers 314 are mounted upon generally rightangled brackets 315, the horizontal portions of which project inwardly toward each other. The ends are spaced apart a short distance so that they may be forced apart by screwing an adjusting screw 316 mounted on the counterbalance weight 286 secured to the lower end of the player arm. It may be observed, therefore, that it is a simple matter to adjust the player arm positioning means by adjustment of the screw 316.

Consideration will next be given to the various controls embodied in the apparatus and particularly the record selector trip mechanism, the player arm trip mechanism, and two control switches utilized to control the operation of the motor 43, the cycling clutch solenoid 92, and a muting circuit that shortcircuits the pickup except when a record is actually being played.

It has heretofore been brought out that the phonograph may or may not be, as desired, controlled from a remote point. When a record or records are selected to be played, the first thing that takes place is the energization of a motor circuit control relay, indicated generally by reference character 321 (see Figs. 1, 4, and 35), hereinafter termed a motor starting relay. The winding 322 of this relay is energized in a manner hereinafter to be described in conjunction with the selector mechanism and it remains energized as long as any record selector buttons are in displaced position. When energized, it simultaneously effects closure of a circuit to the motor and to the winding 94 of the cycling clutch solenoid 92 with the result that the motor is placed into operation to drive the record rotating shaft and the carriage moving mechanism in a manner hereinbefore described, it being remembered that the double clutch member of the carriage drive is in its lowermost position after the return of the last record to be played to the record magazine. The circuit to the motor is completed in a manner to be described in detail hereinafter through a pair of leaf switch blades 323 and 324 (see Fig. 1 where they are shown in circuit closing position to correspond to the positions occupied by them prior to the time that the double clutch member has been returned to its lowermost position) and the previously mentioned motor reversing switch 158. The circuit to the cycling clutch solenoid winding is completed through the switch blades 323 and 324 and through a combined cycling clutch and mute control switch indicated generally by reference character 325 which is in circuit closing position except when a record is actually being played and which is operable to a circuit opening position even though the motor starting switch 323, 324 is closed. It may be well briefly to mention at this point that the starting switch is controlled not only by the starting relay 321, but also by a lever arm 326 forming an integral part of the clutch operating lever 197 and that the cycling clutch and mute controlling switch 325 is controlled by a lever 327 controlled by cam 194 and the player arm trip mechanism.

The motor starting relay 321 and its associated switch 323, 324 and the switch 325 are all mounted on the previously referred to base plate 159 and are ordinarily enclosed within the control cover 161. The motor starting relay 321 includes an armature 328 (see Fig. 1) normally biased into retracted position by a spring 329. The armature is provided with a latching projection 331 adapted under certain conditions to latch a leaf spring 332 adjacent to but insulated from leaf switch 324. The three leaf springs 323, 324, and 332 are mounted upon and insulated from each other by a support 333 made of blocks of insulating material secured to the base plate 159 by any suitable means. The switch blades 323 and 324 are controlled conjointly by the motor starting relay 321 and the lever 326 of the double clutch operating lever 197, the latter having a slot 334 at its lower end (see Figs. 19 to 21, inclusive), adapted to operate switch actuating member 335 mounted for pivotal movement on base plate 159 underneath the switch blades about a pivot pin 336. The switch actuating member 335 is operable into two different positions by the lever arm 326, one of these positions being the position in which it is shown in Fig. 1, and the other being a position wherein the member is displaced a slight distance angularly counterclockwise about the pivot pin 336 from its indicated position. In the indicated position, the switch blades 323 and 324 are shown in circuit closing relation, the leaf spring 332 being latched by the projection 331 on the starting relay armature 328. Now, if the switch operating member 335 is moved a short distance in a counterclockwise direction (which, it may be noted corresponds to the movement of the double clutch member to its lowermost position), then the switch blade 323 is separated from switch blade 324 by the outermost one of a pair of insulating projections 337 extending upwardly from the operating member 335 and between which the end of the switch blade projects. Under certain conditions, however, the motor starting relay is energized (when any record selector button is in displaced position) and at this time the movement of the operating member 335 in a counterclockwise direction will not open the circuit between switches 323 and 324 since the leaf spring 332 is free to move and hold the switch blades in engagement. When this occurs, the motor circuit and cycling clutch remain energized to move the carriage to a position corresponding to other selected records.

The combined cycling clutch solenoid and muting switch 325 operated by the lever 327 is best illustrated in Figs. 1 and 36, particularly the latter. It comprises the cycling clutch circuit controlling switch blades 338, 339 that are normally in circuit closing position, and the latter of which has an insulating button 341 at its end. The switch also comprises a pair of normally closed muting switch blades 342 and 343, the latter of which also has an insulated button 344 at its end. The switch blades are mounted in spaced apart relation on a supporting block 345 with the insulated buttons 341 and 344 disposed beneath the lever 327 so that as the latter is moved from its indicated position to a lower position, the two circuits controlled by the switches are simultaneously opened. Likewise, when the lever moves upward from circuit opening position to the position in which it is indicated, the two switches are simultaneously closed.

Returning now to a consideration of the mechanical control mechanism, illustrated more particularly in Figs. 19 to 21, inclusive, it may be noted first of all that in Fig. 19 these mechanisms are illustrated in the positions occupied thereby at the time that the moving carriage is either stopped or being moved to align the transfer mechanism with a selected record—at this time the record selector trip relay 196 is deenergized; in Fig. 20 the mechanisms are illustrated in the positions occupied thereby immediately after the record selector trip relay has been energized but before the cam shaft has started to rotate (the view illustrating the same positions as shown in Fig. 6); and in Fig. 21, the mechanisms are indicated in the positions occupied thereby during the playing of a record, after the cam shaft has rotated about 180°.

Returning now to a consideration of Fig. 19, it may be noted that the record trip selector relay 196 is provided with a winding 348 and an armature 349 normally biased into retracted position by a spring 351. A latching block 352 is secured to the underside of the armature and it normally restrains against movement the upper arm 353 of a double ended selector trip lever, indicated generally by reference character 354, the lower arm 355 of which has secured thereto intermediate its ends a spring 356 biasing the lever for movement in a clockwise direction about a pivot pin 357 secured to a mounting bracket 358 secured to casting 34. The lever 354 is held on the pivot pin 357 by a C-washer 359. The lower end of the biasing spring 356 is connected to a pin 361 also secured to the mounting bracket 358.

When the selected record position has been reached by the moving carriage, the record selector trip relay winding 348 is energized briefly in a manner to be described more fully hereinafter with the result that the armature 349 is attracted thereby to release the lever 353. The latter is thereupon moved in a clockwise direction by the spring 356 to effect movement of the double clutch member from its lower carriage driving position to its upper cam shaft driving position, where it is illustrated in Fig. 22. When the selector trip lever 354 rotates, it effects upward or clockwise movement of the double clutch shifting lever 197 through a link member 362 interconnecting the two and mounted for pivotal movement about a pin 363, about which the double clutch shifting lever 197 also pivots. The lever 197 and link 362 are secured to the pin by suitable means such as the washer 364 and C-washer 365 and the pin is secured to bracket 358. The lower end of the connecting link is mechanically connected to the trip lever by means of a pin and slot connection, a pin 366 being secured to the lever intermediate its ends and below the pivot point, and the link being provided with a slot 367 near its lower end. The connecting link is mechanically connected to the clutch shifting lever by a flanged projection 368 intermediate its ends and abutting against the underside of a generally triangular projection 369 formed integrally with the lever. The lever and link are resiliently biased toward each other by a spring 371 connected at its lower end to the flange 368 in the link and at its upper end to a flange 372 formed at the upper edge of the lever. This spring, it may be noted, is utilized also to shift the double clutch member to its lowermost position in a manner to be described shortly.

When the double clutch shifting lever 197 is moved, as described above, the clutch shifting rod 124 is lifted to shift the clutch into its uppermost position. At the same time, a tooth 373 formed near the end of the lever it withdrawn from an opening 374 formed in cam 193, which is of circular configuration.

When the clutch shifting lever is lifted, the switch controlling arm 326 is rotated in a clockwise direction thereby to move the switch operating member 335 in a clockwise direction about its pivot pin 336 as previously described. Movement of the switch operating member 335 in this direction, however, does not have any effect upon the circuit controlling position of the switch blades 323 and 324, these remaining in contact even though moved. In the event the selector relay was tripped in response to the position of the last selected record, then the motor starting relay 321 would be deenergized with the result that its armature 328 would move into the latching position illustrated in Fig. 1, whereby the spring blade 332 would be attached by the projection 331 on the armature.

The release of the lever 354 by the energization of the record trip selector relay also performs a number of other functions which will now be considered. From a comparison of Figs. 19 and 20, it may be noted that when the link 362 is moved from the position shown in Fig. 19 to the position shown in Fig. 20, its free end 375 is moved toward the cam shaft 130 and into cooperative relationship with its associated cam 194 which is generally segment shaped.

When the lever 362 is moved into the position shown in Fig. 20, it also cocks the player arm trip mechanism, to be mentioned hereinafter, by rotation of a player arm trip shaft 376 through a lever indicated generally by reference character 377 fixedly secured to the shaft by a bushing 378. The shaft 376 extends longitudinally of the carriage beyond the casting section 38, it being mounted for rotation in this casting section and in the mounting bracket 358. The lever 377 is biased in a counterclockwise direction by a spring 379 secured at one end to a pin 381 mounted in the supporting bracket and at its other end to its lower extremity 382 of the lever. The movement of the trip lever 354 in a clockwise direction moves the lever 377 and shaft 376 in a clockwise direction by means of a pin 383 secured to the outer extremity of lower arm 355 of the trip lever and a flange 384 extending toward the pin from the downwardly extending portion of the lever 377.

The movement of the trip lever 354 in a clockwise direction after energization of the selector trip relay also effects movement of the cycling clutch and mute switch control lever 327 into engagement with cam 193. This results from the clockwise movement of the lever 377 just described which is connected to the lever through a spring 385. The lower end of the spring is connected to a flange 386 formed at one side and intermediate the ends of lever 377, and the upper end is connected to a flange 387 formed integrally with the lever 327 and slightly to the front (or to the right as viewed in Figs. 19, 20, and 21) of the player arm trip shaft and immediately above a projection 388 formed on the lever 377, which projection is adapted to strike the flange and effect counterclockwise movement of the lever 327 upon the completion of the playing of a record and the release of the player arm trip mechanism as will be described hereinafter. When the lever 377 is moved in a clockwise direction upon release of the selector trip relay, the lever 327 is rotated in a clockwise direction about the shaft 376 upon which it is closely mounted, whereby its pointed end 389 is brought into contact with the surface of cam 193, as shown in Fig. 20.

When the selector trip relay 196 is energized to release the trip lever 354, the various levers described above are operated in the specified manner and the double clutch member is shifted to its uppermost position to drive the cam shaft. The cam shaft rotates about 180° from the position in which it is indicated in Fig. 20 (and also in Fig. 6) to the position in which it is indicated in Fig. 21 (in either direction, depending upon the direction of rotation of the motor), at which time the cycling clutch operating solenoid 92 is deenergized by operation of the control lever 327. When the cam shaft starts to rotate, the clutch operating lever 197 first occupies the position in which it is shown in Fig. 20. However, as soon as the cam shaft rotates a sufficient distance, the cam 194 engages the end 375 of the connecting link 362 and moves the latter in a counterclockwise direction about the pivot pin 363. This movement of the connecting link tensions spring 371 to bias the double clutch shifting lever 197 in a counterclockwise direction. The movement of the lever in this direction, however, is prevented by the projection 373 thereon which rides on the surface of cam 193 (as shown in Fig. 21). As the cam shaft rotates, record transfer, record clamping and player arm positioning mechanisms are operated in the manner previously described to transfer a record and clamp it in playing position, and the player arm is brought into contact and moved into the record groove. When this has been accomplished, the cam has rotated about 180° or into the position shown in Fig. 21, and the cam shaft is prevented fom being driven further by the deenergization of the cycling clutch operating solenoid which is deenergized when the pointed end 389 of lever 327 falls into the opening 374 in cam 193. When this occurs, the cycling solenoid and muting switch control lever 327 moves in a clockwise direction about the player arm trip shaft 376, it being remembered that the lever 327 is biased for movement in this direction by the spring 385 connected to it and to the lever 377 secured to the player arm trip shaft. The player arm trip shaft is prevented from rotating at this time by the player arm trip mechanism to be described hereinafter. As the switch controlling lever 327 rotates in a clockwise direction, the switch operating end of the arm moves downwardly to open the circuit between switch blades 338 and 339 and between the switch blades 342 and 343. The opening of the circuit between the two first-mentioned switch blades results in the deenergization of the cycling clutch operating solenoid with the result that spring 113 effects movement of the cycling clutch into the position in which it is indicated in Fig. 5, and in which position only the record rotating shaft 68 is rotated. The opening of the circiut between switch blades 342 and 343 opens the short-circuit across the pickup so that the phonograph is able audibly to reproduce a record.

When the connecting link 362 is moved from the position in which it is indicated in Fig. 20 to the position in which it is indicated in Fig. 21 by the 180° rotation of the cam shaft, the selector trip lever 354 is returned to its initial position and again latched by the now deenergized relay 196. This return movement of the lever 354 is effected by the pin and slot connection between the link and lever. When the trip lever is returned to its latched position, the spring 356 connected to the lever is tensioned for the purpose of operating the double clutch member to its upper position during the next cycle of operation. At the same time, the pin 383 at the end of arm 355 of the trip lever is moved away from the flange 384 of lever 377 of the player arm trip mechanism, as best illustrated in Fig. 21.

When the player arm reaches the end of the record, it operates the player arm trip mechanism in either of two ways depending upon the nature of the record. If the record does not have an eccentric groove, then the player arm trip mechanism is operated when the player arm moves to a predetermined point located near the center of a record, or, if the record has an eccentric groove, then the trip mechanism is operated when the player arm moves in a reverse direction. When the player arm trip mechanism is operated, the trip shaft 376 is released and spring 379 effects movement of the lever 377 and trip shaft in a counterclockwise direction so that projection 388 on the lever strikes flange 387 on the cycling clutch control lever 327 and moves the latter in a counterclockwise direction. As a result, the pointed projection 389 at one end of the lever 327 is moved out of the opening 374 in cam 193 and the opposite end is moved upwardly to permit the switch blades 338—339 and 342—343 to reclose. The pickup is thus shortcircuited and the cycling clutch energized. The cam shaft is, therefore, again rotated by the motor to complete rotation thereof back to its initial position wherein it is illustrated in Fig. 19. As it comes into its initial position, the finger 373 on the clutch shifting lever 197 falls into the opening 374 in cam 193, it being forced into the opening by spring 371 which, it may be remembered, was tensioned by movement of the connecting link 362 from the position in which it is shown in Fig. 20 to the position in which it is shown in Fig. 21. The lever 362 is prevented from following the lesser diameter portion of cam 194 as the latter completes its movement from the 180° to 360° position by the selector trip lever 354 which was latched during movement of the cam shaft through its first 180° of rotation as described above.

When the double clutch shifting lever 197 moves downwardly, it shifts the double clutch to its lowermost or driving position. At this time, either of two things may take place depending on whether all the selected records have been played or whether other selected records remain to be played. In the event other records are to be played, the motor starting relay 321 remains energized so that, as the operating member 335 is moved in a counterclockwise direction by the lever arm 326 and lever 197, the motor starting switch remains closed by reason of the spring 332 moving with the operating member 335 to maintain the switch blades 323 and 324 in engagement. The spring is free to move by reason of the armature 328 being in attracted position so that the latch projection 331 thereon is out of the path of movement of the leaf spring 332.

The player arm trip mechanism to which reference will now be had is operated at the end of the playing of a record either by reason of the player arm reaching a predetermined position or by the reverse movement of the latter by an eccentric groove in the record. The trip mechanism is thus operated at the end of the playing of a record by an operating member 391 (see Figs. 3 and 10) secured directly to one of the end frame members 278 of the main player arm cradle 274. This member is suitably secured to the cradle so as to project through an aperture 392 in casting 38 by a pair of screws 393. The trip mechanism is actuated when the player arm reaches a predetermined position at the end of the playing grooves by an adjustably mounted screw 394 secured to the right end (as viewed in Figs. 3 and 10) of the operating member and movable downwardly as the player arm 265 moves toward the center of a record. The trip mechanism is operated upon reverse movement of the player arm by a small plate 395 secured to the operating member and provided with ratchet teeth that are effective to operate the trip mechanism when moved upwardly, but which have no effect upon the trip mechanism when moved downwardly.

The trip mechanism includes a trip lever 396 pivotally mounted on casting 38 by a pin 397 and which is biased in a counterclockwise direction about the pin by a spring 398 secured at its lower end to the casting and at its upper end to a lever 399 pivotally mounted on the left end of the trip lever 396 by means of a pin 401. The trip lever has formed at its right end a flange 402 located underneath and adapted to be engaged by the screw 394 when the player arm moves a predetermined distance toward the center of the record, whereby the trip lever 396 is moved in a clockwise direction to operate the player arm trip mechanism. The pivoted lever 399 has a flange 403 formed integrally therewith that has a relatively sharp forward edge engageable with the ratchet teeth on the plate 395. When the latter moves in a counterclockwise direction during the playing of a record, the ratchet teeth thereon engage the flange 403 but do not move the lever 399, the latter simply riding over the ratchet teeth. However, when the player arm moves in the reverse direction as a result of riding in an eccentric groove, a ratchet tooth on the plate 395 moves in an upward or clockwise direction, thereby moving the trip lever 396 in a clockwise direction to effect operation of the trip mechanism in the same manner as if the latter had been moved in a clockwise direction by the movement of the player arm to a predetermined point.

The player arm trip shaft 376, to which reference has previously been made, extends outwardly beyond the casting 38 and has secured to it a two-part unitary detent lever 404, which, it may be mentioned, is made in two parts simply for convenience in manufacture. The lower end of the detent lever is provided with a detent shoulder 405 cooperating with a flange 406 formed at the upper end of the trip lever 396. In the position of the mechanism illustrated in Fig. 3, the player arm trip mechanism is shown after it has been tripped by movement of the player arm at the end of the playing grooves and before it has been cocked by the rotation of the trip shaft 376 in a clockwise direction by the trip lever 354 when the latter is released to operate the double clutch mechanism into its upper or cam shaft driving position. At this time the trip lever 396 is in its indicated position with the flange 403 on the lever 399 spaced a short distance away from the ratchet-tooth plate 395, wherein the lever 399 is held by engagement of the upper portion of this arm with a pin 407 mounted at the lower end of the detent lever 404. When the double clutch operating lever 197 is shifted upwardly upon energization of the record trip relay 196, the trip shaft 376, it may be remembered, is rotated in a clockwise direction. When the trip shaft is rotated in a clockwise direction upon the shifting of the double clutch member to its uppermost position, the detent lever 404 is also rotated in a clockwise direction. When this occurs, the flange 406 on the trip lever 396 rotates counterclockwise a short distance to be engaged by the detent shoulder 405 under the influence of spring 398. At the same time, the flange 403 on the lever 399 is moved a slight distance so as to bring the sharp end thereof into a position to engage the ratchet teeth on the ratchet plate 395. When the player arm moves inwardly during the playing of a record, the lever 396 is moved in a clockwise direction either by the screw 288 movable with the cradle 274 or by the reverse movement of the cradle, as described heretofore. When the lever 396 is moved in a clockwise direction in either of the two ways just mentioned, the flange 406 is lifted above the shoulder 405 to permit the detent lever 404 to move back to the position in which it is shown in Fig. 3. This movement of the detent lever also results in counterclockwise movement of the shaft 376 which is urged in this direction by the spring 379. When the shaft moves, the lever 377 is also moved and the projection 389 at the upper end thereof strikes the flange 387 on the cycling clutch control lever 327 to effect upward movement of the latter to again energize the cycling clutch, as has been described in some detail heretofore.

One of the important features of the present invention resides in the provision of means for preventing downward movement of the double clutch member into carriage moving position in the event a record has not been properly returned to the magazine. In such event, it is extremely undesirable to have the carriage move as this would undoubtedly result in the breakage of the records. The means of the present invention, in addition, so controls the apparatus that successive attempts will be made to return the record to the magazine. The machine continues through this partial cycle of operation until the record is returned automatically or the record is moved manually. The means referred to includes a latching roller 407 cooperatively associated with a cam surface 408 formed at the rear end of the clutch shifting lever 197 (see Figs. 2, 19, 20 and 21) above the point where this lever is connected to the double clutch shifting rod 124. The latching roller is movable out of the path of movement of the lever by an operating arm 409, the position of which is controlled by the record transfer mechanism.

When the double clutch member is in its uppermost position (see Figs. 20 and 21, particularly the latter which illustrates the positions of the various control mechanisms during the playing of a record), the latching roller 407 is in position to prevent downward movement of the double clutch shifting rod and its operating lever 197. In the event a record is properly returned to the magazine, then the transfer mechanism moves the latch operating arm 409 to remove the latching roller out of the path of movement of the lever 197, so that the latter is shiftable downwardly to move the double clutch into carriage driving position, as previously described. When the lever is in its down position, the latching roller is kept out of the path of movement of the lever by the upper end of the cam defining portion 408 of the lever so that the lever can be moved upward to shift the clutch to its uppermost position (see Fig. 19).

In the event the record has not been returned to the magazine, then the latch operating arm 409 (which is made with a resilient portion to prevent damage to the records) strikes the record and will not move the latch roller from the path of movement of the clutch operating lever, so that the latter cannot be moved downwardly. As a result, the cam shaft continues to be rotated continuously as the cycling clutch solenoid 92 remains energized because the lever 327, which controls the cycling clutch switch, is prevented from being moved downwardly by the upper end 388 of the lever 377 connected to the player arm trip shaft 376. Thus, when the cam shaft reaches the position illustrated in Fig. 21 with the clutch shifting rod in its uppermost position, wherein the pointed end 389 of the lever 327 would normally enter the groove 374, it is prevented from so doing by the trip shaft and lever 377. The reason that the lever is in position to prevent normal operation of the lever 327 is that the former has not been shifted to cock the player arm trip mechanism (that is, to the position shown in Fig. 20) after once having been tripped.

In order for the player arm trip mechanism to be cocked or reset, after once having been tripped, it is necessary that the clutch be first shifted to its down or carriage driving position and the record selector trip relay 196 be energized to allow it to move again to the up position. Neither of these operations takes place when the record has not been properly returned to the magazine, with the result that as long as the record is not properly returned, the cycling clutch remains energized and the cam operates continuously to perform repeated record transfer operations. It might be noted that at the same time the cams, of course, perform their other functions as in the course of the normal transfer and playing of the record. The record, however, is not reproduced because the cams are not stopped at their 180° position.

Returning now to a detailed consideration of the safety mechanism, reference will be had particularly to Figs. 2, 3 and 19 to 21, inclusive. From these it may be noted that the roller 407 is normally biased toward the path of movement of the clutch shifting lever 197 by a relatively light spring 411 encircling a shaft 412, at one end of which the roller is carried. The shaft 412 is slidably mounted in a spaced apart boss 413 and a downwardly extending rib-like formation 414 formed integrally with casting 35. The spring 411 bears against the boss 413 and a collar 415 secured to the shaft.

The clutch latching roller 407 is moved out of the path of the clutch shifting lever 197 by the roller operating arm 409 when the record transfer mechanism approaches the limit of its movement in record returning direction. In Fig. 2 the arm is shown in contact with the shaft 412, but the latter has not yet been moved to shift the roller out of the path of the clutch operating lever. When the transfer mechanism has moved a slight distance further in record returning direction, the arm 409 shifts the roller out of the path of the lever.

The latch operating arm 409 is preferably provided with a conical endpiece 416 adapted readily to contact and move the roller carrying shaft 412. This shaft contacting endpiece 416 is preferably mounted at the end of a fairly strong leaf spring supporting member 417 secured to a hub 418 pivotally mounted upon a pin 419 secured to casting portion 35. The supporting arm 417 is made resilient in order to prevent damage to records which have not properly been returned to the magazine.

The arm 409 is operated by a portion of the sector gear 206 by means of which the record transfer arm 201 is moved. This portion is preferably the transverse cross arm 221 which is adapted to strike an adjustably mounted screw 421 secured to the hub 418. The operating arm 409 is so constructed that when a record is transferred into playing position, the record moves the arm a slight distance in a clockwise direction (as viewed in Fig. 2), and thereafter the arm itself swings away from the record by gravity so that it will not contact a record that is being played.

The record clamping mechanism has associated therewith a record stripper, indicated generally by reference character 422, which prevents the records from following the record clamping arm 243 as the latter is moved to its unclamped position and also acts as a guide for records during transfer. The record stripper comprises a generally annular plate 423 fixedly supported by a pair of supporting rods 424 secured to casting portion 35. The record stripper is located to the left (as viewed from the front of the machine) of the playing position, and a portion of it is cut away to provide a space for the movement of the player arm 265.

The electrical circuits embodied in the phonograph of the present invention are illustrated diagrammatically in Fig. 35, to which reference will now be had and in which the various elements heretofore described are indicated by identical reference characters.

In this drawing the circuits are illustrated under conditions obtaining when the phonograph is at rest after having played the last selected record and no other records are to be played. The record selector 12 has been illustrated only quite diagrammatically but will be described in greater detail hereinafter in conjunction with Figs. 32 to 34, inclusive. It includes a number of record selector buttons 431 and 432 equal in number to twice the number of records, so that there is one button for each side of each of the records. These buttons, as will be described later, are arranged circularly in two groups, the buttons indicated by reference character 431 corresponding to the left-hand side of the record and those numbered 432 corresponding to the right-hand side of the record.

The selector buttons are biased into a normal position by springs 433, against which they may be operated into displaced positions. The lower ends of the buttons project through a conducting plate 434 and the lower ends are pushed radially inward by an annular spring 435 against which the buttons may be forced radially outwardly when depressed. When a button is depressed, it closes a circuit to the winding 322 of the motor starting relay 321, and the switch controlled by the latter is permitted to close to establish a circuit to the motor 43 and to the winding 94 of the cycling clutch soleoid 92.

The motor starting solenoid circuit is closed by the button which has a projection 436 adapted to ride over a downwardly extending flange 437 of an annular latching and conducting ring 438. When the projection 436 goes below the flange 437, the push button is latched in circuit closing position. The circuit to the motor starting solenoid winding 322 is completed through a low-voltage secondary winding 439 of a transformer 441, the primary 442 of which is connected to a suitable source of power, such as 110 volts A. C., through conductors 443 and 444. The circuit thus closed includes a conductor 445 connected to one terminal of the secondary winding and to the conducting plate 434, the selector button 431, the annular conducting member 438, conductor 446, the winding 322 of the motor starting solenoid, conductor 447, and a conductor 448 leading to the other terminal of the secondary winding of the transformer.

When the motor starting solenoid winding is energized, it attracts its armature 331 and, as heretofore described, this unlatches the leaf spring 332 to effect engagement of switch blades 323 and 324, which simultaneously energize the motor 43 and the cycling clutch controlling solenoid. The motor is, as already indicated, of the synchronous-capacitor type and includes a pair of windings 451 and 452, the latter of which has a condenser 453 in series therewith. The winding 452 is always connected in the same manner to the power lines, while the connection of the winding 451 is reversed by the reversing switch 158 to reverse the direction of rotation of the motor. In the indicated position of the reversing switch, the winding 451 is connected to the source of power through the previously mentioned conductor 443, a conductor 454, switch blades 323 and 324, conductor 455, conductor 456 connected to switch blade 167 of the reversing switch, switch blade 164, and conductor 457 connected to one terminal of the winding 451, the other terminal of which is connected to the other power supply terminal through conductor 458, switch blades 165 and 168 of the reversing switch, and conductors 459 and 460.

The other motor winding 452 is connected to the power supply through a circuit also extending through the motor starting switch blades 323 and 324, and conductor 455 which is connected to a conductor 461 connected to condenser 453. The other terminal of winding 452 is connected by a conductor 462 to the conductor 460 leading to the other power supply terminal. When the reversing switch is in its other position, the connection of windings 451 to the power supply are reversed, thereby to reverse the direction of rotation of the motor.

The closure of switch 323, 324 also closes a circuit energizing the winding 94 of the cycling clutch operating solenoid, this circuit extending through the normally closed cycling clutch control switch 342, 343. The circuit includes conductors 443 and 454, switch blades 323, 324, conductor 463, switch blades 342, 343, conductor 464 connected to one terminal of solenoid winding 94, and conductor 460 which is connected to the power supply and to the other terminal of the solenoid winding.

The pick-up, as heretofore indicated, is short circuited except when a record is being actually played, the short circuit extending through switch blades 338 and 339 and a pair of conductors 465 leading to the pick-up terminals. The switch 338, 339 thus cuts off the input to the sound amplifying apparatus of the phonograph (not illustrated), but which may be of any suitable type to avoid needle noise before and after playing. After the motor starting solenoid 321 and the cycling clutch control solenoid 92 have been energized, as described above, by the operation of any one or more of the selector buttons 431, 432, the motor 43 drives the carriage to a position to play the selected side of a selected record, the carriage being driven in one direction to play one side of a record or records and in the opposite direction to play the opposite side of a record or records.

The selector mechanism includes a rotatable arm 467, the position of which is correlated to the carriage position and adapted, when the carriage is moving in the proper direction for the playing of a selected side of a record, to stop the carriage in position to play the record. When the carriage is so positioned, a circuit is closed through the rotating member 467 to energize the record selector trip relay winding 348, the circuit for which is completed through the secondary winding 439 by a circuit including the conductor 445, the conducting plate 434, a displaced selector button 431, the rotating selector arm 467, and a conductor 468 connected to one terminal of the winding 348, the other terminal of which is connected to the other terminal of the transformer winding through conductor 448.

When the record selector relay is energized, the trip lever 354 controlled thereby is unlatched to perform its numerous functions which have been described heretofore. The relay winding 348 is supplied with energy for just a short period, as the selector mechanism is constructed in such manner as to return the displaced selector button to its normal position after the selector relay circuit has been closed for a short interval. The manner in which this is accomplished will be described hereinafter.

The succeeding operation of the control has already been described at some length, and it is not deemed necessary to go further into it at this time particularly in view of the fact that it will be described again in consideration of the operation of the machine as a whole.

The record selector mechanism 12 is preferably secured to the rear of the base 10 (see Fig. 1) and to the right of the record magazine, as viewed from the front of the machine, but it may be mounted wherever desired. As already indicated, the selector mechanism includes two groups of selector buttons 431 and 432, the former corresponding to the left sides of the records and the latter to the right sides of the records.

The record selector mechanism includes a rotatable double ended arm 467 (briefly mentioned heretofore) movable in opposite directions through a pulley 471 (see Fig. 32) operatively connected to the moving carriage through a cable 472 (see Fig. 1), one end of which is fastened directly to a downwardly extending pin 473 secured to the moving carriage, preferable to the underside of the double clutch casting 37, as best illustrated in Figs. 2, 4 and 22. The other end of the cable is secured to the bracket through a spring 474 for a reason to be specified hereinafter. The cable is preferably passed over three pulleys 475, two of which are located at the selector mechanism side of the machine, and the other at the opposite side as illustrated in Fig. 1.

The carriage moves to the left when the left sides of records are to be played and to the right when right sides of records are to be played, as heretofore indicated. When the carriage is moving to the left to play the left sides of records, the rotating double ended arm 467 of the selector mechanism is rotated in a clockwise direction when looking down at it from the top or in a counterclockwise direction when looking up at it from the bottom. Inasmuch as Figs. 33 and 34 are views looking up at the rotatable arm, it may be noted that the arm is moved counterclockwise for playing the left sides of records and clockwise for playing right sides of records.

The rotatable arm is so constructed and arranged that when it is moved in a counterclockwise direction, it is operatively associated with displaced selector buttons 431, and when moved in the opposite direction, it is operatively associated with displaced selector buttons 432. That is, in one direction of rotation, displaced selector buttons 431 are effective to stop the carriage, and in the other direction of rotation, displaced selector buttons 432 are effective to stop the carriage.

Referring now more particularly to Figs. 32 to 34, inclusive, it may be noted that the selector mechanism includes three horizontally disposed, spaced-apart plates—a lower plate 476, a middle plate indicated generally by reference character 434 which has heretofore been referred to, and an upper plate indicated generally by reference character 477. The two lower plates are spaced apart by four supporting spacers 478, and the upper plate is spaced from the middle plate by four spacers 479.

The record selector buttons are mounted for vertical movement in the two upper plates. The upper plate is provided with a series of equally spaced apart slots 481 to receive the upper ends of the selector buttons. It is preferably made of two relatively thin metallic plates, the peripheral edges of which are bent in opposite directions to provide a generally V-shaped groove for receiving an annular spring 482 for holding the upper ends of the buttons in assembled relation relative to the plate.

The selector buttons normally occupy what may be termed "normal positions" from which they are displaceable downwardly into what may be termed "displaced positions." The buttons are biased into their normal positions by the springs 433 encircling reduced width portions of the buttons and bearing against the top side of the central plate 434 and against shoulders formed by the junction of the narrow and wide portions of the pins. The upward movement of the selector buttons is limited by projections 483 formed integrally therewith and adapted to abut against the lower side of the upper plate.

The lower ends of the selector buttons are slidably mounted in a series of equally spaced apart apertures 484 formed in the central plate 434. These apertures are of a length somewhat greater than the width of the reduced portions of the selector buttons in order that when the buttons are displaced downwardly, the lower ends may move radially outward against the annular biasing spring 435 heretofore referred to, and which is secured to the underside of plate 434 by means of a radially slotted retaining ring 485. This ring is secured in assembled relation to the central plate by the four screws 486, whereby the upper plate member is secured to the central plate member.

The two groups of selector buttons are separated from each other a distance somewhat greater than the distance separating the individual selector buttons of each group, as may be noted by the relatively greater space taken up by the portions 487 (see Fig. 33) of the spring retaining ring 485.

When any of the selector buttons are pressed downwardly, they are depressed and latched below and in contact with the flange 437 of annular conducting ring 438, to which reference was had briefly in the description of the electrical circuits. When thus displaced, the selector buttons complete circuits between the plate 434 and the conducting and latching ring 438, which may be connected to the conductors 445 and 446, respectively, in any suitable manner. The conducting plate and ring are insulated from each other in any suitable manner, as by the annular insulating ring 488 illustrated in Fig. 32.

The rotatable double ended arm 467 has associated with it mechanism for effecting energization of the record selector trip relay when the moving carriage and rotating arm are in position to effect transfer of the selected record to playing position and moving in the proper direction to play the selected side of the record. At the time that the relay is energized, the displaced selector button corresponding to the side of the selected record is also returned to its normal position. The mechanism referred to includes a fixed ratchet disc, indicated generally by reference character 490, having two groups of equally spaced apart, generally triangular ratchet teeth 491 and 492, equal in number to and associated with the selector buttons 431 and 432. The ratchet disc is secured to and spaced from the underside of the central plate 434 by four spacing blocks 493. It is also insulated from the spacing blocks and from the conducting plate 434 but connected to conductor 468 leading to the record selector trip relay 196.

The double ended rotating arm is preferably made of insulating material such as Bakelite, but may be of metal insulated by a Bakelite section. It carries conducting detent mechanisms adapted to complete circuits between displaced selector buttons and the ratchet disc when the arm is in a position to contact a displaced selector button thereby to complete an energizing circuit for the selector trip relay. The arm is loosely mounted on a vertical shaft 494 secured to and extending downwardly from the center of the metal plate 434, and it is rotated in opposite directions depending upon the direction of movement of the carriage by the pulley wheel 471. The latter is loosely mounted on a shaft 495 secured to and extending upwardly from the base plate 476. The two shafts are in axial alignment. The upper shaft 494 loosely supports a driving arm 496 operatively connected to both the pulley and the double selector arm 467. It is connected to the pulley by a stud 497 secured thereto and extending downwardly into an aperture (not shown) in the pulley. The driving arm is operatively connected to the double arm 467 by an upwardly extending lug 498 adapted to engage one of the oppositely extending portions of the double arm whereby the double arm is positively rotated in one direction. The driving arm is operatively connected to the double arm also through a spring 499 connected at one end to a lug 501 formed integrally with the driving arm intermediate its ends and at its other end to a pin 502 secured to and extending downwardly from the double arm whereby, when the driving arm is rotated in one direction, the double arm 467 is rotated through the spring.

The double arm 467 is rotatable between limits determined by the stop pins 503 and 504 secured to the ratchet disc 490. These are engaged at opposite limits of movement by stops 505 and 506 secured to the double arm.

The construction and arrangement of the stops and the connection between the driving arm 496 and the double selector arm 467 is such that the moving carriage can be driven short distances beyond the end record positions in order to operate the motor reversing switch and to shift the player arm from one of its playing positions to the other without moving the selector double arm beyond its limiting positions, which correspond to carriage positions about one record space beyond the end records so that the selector mechanism is effective to select the end record going in the opposite direction. When the carriage moves slightly beyond the end record positions, the double arm is prevented from moving further by either stop 503 or 504, the movement in a clockwise direction (looking at Fig. 33) being determined by the engagement of stops 503 and 505 and in the opposite direction by stops 504 and 506. When stops 503 and 505 engage, the double arm is being positively driven by the flange 498 thereon, but at this time the spring 474, connecting the belt 472 to the moving carriage, is expanded, thereby to prevent further driving of the double arm. When the double arm is moved in the opposite direction, the driving arm 496 is connected to it by the spring 499 which expands at the other limit of movement of the double arm.

The double arm, as already indicated, carries upon it detent mechanisms for contacting and returning displaced selector buttons to their normal positions. Each end of the arm carries one of the detent mechanisms. Since these are identical, only one will be described but identical elements of both are indicated by the same reference characters. Each detent mechanism includes a detent 507 having a triangular end 508 engageable with the ratchet teeth 491 (or 492, by the detent 507 on the other end of the double arm). This detent is pivotally secured as by a pin 509 to a selector button contacting and returning member 510 pivotally secured as by a pin 511 to the outer extremity of the arm 467. The detent 507 is provided with a downwardly extending lug 512 abutting against the member 510 between the two pivot pins 509 and 511 and normally urged inwardly by a spring 513. The selector button contacting and returning member 510 is provided with an upwardly extending flange 514, the outer surface of which is adapted to engage a displaced button first to close a circuit to the selector trip relay, and, second, to unlatch the selector button and permit the biasing spring associated with the latter to return it to its normal position.

The detent mechanisms are so constructed and arranged that when the arm rotates in one direction, only one detent mechanism is effective to engage and return displaced selector buttons, the other being ineffective at this time. Looking now at Fig. 34, it is assumed that the double arm is being rotated in a clockwise direction corresponding to the playing of right sides of records. At this time the lower detent mechanism is ineffective because the detent member 507 simply rides over the teeth 491 without effecting displacement of the selector button contacting member 510. When the detent member 507 rides upon a tooth, as indicated, it is forced radially outward against the tension of spring 513, while the button contacting member 510 remains with its innermost end 515 abutting against the stop 506. At this time the selector button contacting flange 514 is out of the path of movement of the lower ends of the selector buttons.

The other detent mechanism, however, is effective to move the flange 514 on its selector button contacting member 510 into engagement with the displaced selector buttons to effect energization of the selector trip relay and return of the displaced selector button. Looking now at the upper portion of Fig. 34, it may be noted that the triangular end 508 of the detent 507 is acted upon in such a manner as to turn the detent in a clockwise direction about its pivot pin 509. This movement is limited by the engagement of flange 512 with the selector button contacting member 510. As a result, both the detent and member are rotated in a clockwise direction about pin 511 each time the detent passes over a tooth 492, and the flange 514 of the contacting member is brought into engagement with a displaced selector button to close the previously referred to relay circuit and to unlatch the displaced selector button. When this occurs, the carriage drive is terminated, as is the rotation of the selector double arm 467.

In the following description of the operation of the machine during the selection and playing of different sized records, it will be assumed first that the moving carriage is at rest after having played and returned to the magazine the last previously selected record and that it is desired to play, first, the left side of a ten inch record located to the right of the position in which the moving carriage is shown in Fig. 1 and in the record space indicated by reference character A and, second, to play the right side of a twelve inch record located to the left of the position in which the carriage is shown in Fig. 1 and in the record space indicated by the reference character B. For convenience, the records to be played will be termed A and B and the corresponding record selector buttons for the left and right sides of the records will be denoted by reference characters 431A and 432B (see Figs. 1 and 33).

When the machine is at rest, the driving motor 43, cycling clutch solenoid 92 and the motor starting relay 321 are deenergized and the various circuits and controls occupy the positions in which they are indicated in the wiring diagram Fig. 35. The double clutch member 115 is in its lowermost position, the clutch shifting rod 124 and its operating lever 197 being in the positions indicated in Fig. 19. The other mechanical controls heretofore described in detail are also in the positions in which they are indicated in Fig. 19. The cam shaft is in the position in which it is indicated in Fig. 19 and also in Fig. 6.

Assuming now that the record selector buttons 431—A and 432—B are both depressed either simultaneously or in sequence, either manually or by some suitable remotely controlled mechanism (not shown), then the motor starting relay winding 322 is energized through two parallel circuits, one including one of the selector buttons and the other including the other selector button. This circuit, it may be remembered, extends from the secondary winding 439 of transformer 441 to the conducting plate 434 through both displaced selector buttons 431—A and 432—B, the conducting button latching ring 438 and thence through conductor 446, the starting relay winding 322 and conductors 447 and 448 back to the secondary winding. When energized, the starting relay attracts its armature 328 and the latter unlatches the leaf spring 332 which is then free to move switch blades 323 and 324 into contact. When this occurs, the motor 43 and the cycling clutch solenoid winding 94 are immediately energized, the former through the reversing switch 158 and the latter through the combined cycling clutch control and muting switch 325. When the carriage is in the position in which it is illustrated in Fig. 1, the motor reversing switch occupies the position in which it is shown in Figs. 1, 13, and 35 at which time the motor is conditioned to drive the carriage to the right to play the right sides of selected records. The cycling clutch solenoid upon energization operates the cycling clutch 92 from its normal position in which it is shown in Fig. 1 to drive the power shaft 86 and its extension 116 by movement of the clutch member 91 to engage one or the other of its clutch projections 97 with the tapered pin 98 on the gear 69 mounted on the record rotation shaft 68, which is rotated whenever the motor is energized. Consequently, the carriage is driven through the double clutch member 115 which, at this time, is in its lower carriage driving position, the gear 133 and the rack 134 fixed to the base structure.

The carriage is thus driven to the right as viewed in Figs. 1 and 13. Since the record A, the left side of which was selected to be played, is located to the right of the indicated carriage position, the carriage moves to its right limit where the player arm 265 is shifted from the position in which it is indicated in Figs. 1 and 13 to the left side of the playing position and the motor reversing switch is operated to reverse the direction of rotation of the motor. The player arm is shifted at the limit of movement by engagement of the pin 283 forming part of the subcradle 266, upon which the player arm is pivotally mounted, with the flange 284 forming part of fixed bracket 182. Upon this engagement and the continued movement of the carriage, the cradle 266 is moved about the axis defined by pins 273 to its other position on the left side of the playing position. The reversing switch is operated by restraint of movement of the switch operating arm 170, the pin 179 mounted at the free end of which engages abutment 181 also formed on the bracket 182. After restrained and continued movement of the carriage, the over-center toggle mechanism is operated in the manner heretofore described to operate the reversing switch into the position in which it is shown in Fig. 14, thereby reversing the direction of rotation of the motor.

When the carriage moves to the right, as described above, the record selector arm 467, see Figs. 33 and 34, moves in a clockwise direction as viewed in these figures. When the carriage reaches a position about one space beyond the record at the extreme right of the magazine, the stop 505 on the arm engages stop 503 but the carriage continues to move some distance further to effect shifting of the player arm and operation of the reversing switch as described above, the spring 474 in the driving connection between the carriage and selector permitting this overtravel. During this movement of the selector arm, the detent mechanism on the left (as viewed in Figs. 33 and 34) moved beyond displaced record selector button 431—A. However, when doing so, the button contacting flange 514 of the mechanism did not contact this button since the detent member 507 was moving in a direction wherein it simply ratcheted over the teeth 491 on the ratchet disc.

After the reversal of the motor, the carriage moves to the left until the record transfer arm 201 is in alignment with the record in record space A. At this point, the movement of the carriage is terminated by energization of the record selector trip relay 196 by the selector mechanism. The energizing circuit is closed by the engagement of the displaced selector button 431—A with the contacting flange 514 on the left portion of the moving selector arm 467 moving in a counterclockwise direction, as viewed in Figs. 33 and 34. When the arm is moving in this direction, the detent mechanism on the left portion of the arm is operated as previously described to displace the button contacting flange 514 into the path of the displaced selector button to contact the latter, whereby the record selector trip relay circuit is closed and the displaced selector button released to permit its biasing spring 433 to return it to displaced position. When the selector button is returned to displaced position, the circuits to the trip relay and the motor starting relay winding 322 extending through the button are opened, but in the present case, the starting relay winding remains energized through the other displaced selector button 432—B. The energizing circuit for the selector trip relay winding 348 is completed through conductor 445, conducting plate 434, the then displaced selector button 431—A, the detent mechanism in contact with the button, the ratchet disc 490, conductor 468, the relay winding, and conductor 448. This circuit is completed for but a short interval as the selector button through which the circuit extends is returned to its normal position by the detent mechanism.

The brief energization of the record selector trip relay results in the unlatching of the trip lever 354 (see Fig. 19) and the latter is moved in a clockwise direction by spring 356 to the position in which it is shown in Fig. 20. The trip lever 354 moves the connecting lever 362 in a clockwise direction to effect clockwise or upward movement of the double clutch shifting lever 197 to shift the clutch from its lower carriage driving position to its upper cam shaft driving position. The lever 197 and rod 124, however, cannot be moved upwardly to shift the double clutch unless the carriage is properly positioned with the record transfer arm 201 underneath record A because the finger 157 moving with the rod must be aligned with an intertooth space on the carriage positioning detent wheel 146 forming part of the carriage driving gear 133. When the carriage is properly positioned, the double clutch member is shifted upwardly and the carriage is further more definitely positioned by the positioning roller 147 mounted upon the spring biased arm 148 and which is forced into an intertooth space. It might be mentioned that the double clutch member is not shifted completely to its uppermost position until one of the slots 143 at the upper end thereof is in alignment with the projecting tapered driving pin 142 at the lower end of the cam shaft driving worm 141.

When the double clutch member 115 is shifted upwardly from the position in which it is shown in Fig. 19 to the position in which it is shown in Figs. 20 and 6, a number of different control operations are effected as heretofore described in some detail. In brief, this upward movement results in the clockwise movement of the arm 326 of the clutch operating lever 197 to move the switch operating member 335 a short distance in a clockwise direction about its pivot 336. This movement of the switch operating member effects movement of the switch blades 323 and 324 and spring 332 in a clockwise direction to bring the end of the spring 332 beyond the latch 331 on the armature of the motor starting relay. At this time, the spring is not latched as the relay remains energized through displaced selector button 432—B. The switch blades 323 and 324 also remain in contact.

When the record selector trip lever 354 is unlatched, it also cocks the player arm trip mechanism by rotating the player arm trip shaft 376 in a clockwise direction as viewed in Figs. 3 and 20, the clockwise rotation being effected through lever 377 and particularly by engagement of the pin 383 on the record selector trip lever 354 and the flange 384 on lever 377. The player arm trip mechanism is cocked by the clockwise movement of the shaft 376 which rotates the detent lever 404 to permit the flanged end 406 of the player arm trip lever 396 to engage the shoulder 405 on the detent lever, the player arm trip lever being moved in a counterclockwise direction about its pivot 397 by the spring 398 and lever 399 pivotally secured thereto. This cocking of the trip mechanism, it may be remembered, conditions the trip mechanism for tripping by movement of the player arm 265 inwardly to a predetermined point or by the movement of the player arm in a reverse direction. The release of the record selector trip lever 354 and cocking of the player arm trip mechanism also results in the biasing of the combined cycling clutch and mute switch operating lever 327 into contact with cam 193, this biasing being effected by spring 385.

After the operation of the record selector trip relay to perform the operations reviewed above, the cam shaft 130 is rotated by the motor through about 180° whereupon it is stopped by the de-energization of the cycling clutch solenoid by clockwise movement of the solenoid switch controlling lever 327 occurring when its pointed end 389 moves into the notch 374 in cam 193, as indicated in Fig. 21. During the rotation of the cam shaft, the record selector trip lever 354 is moved counterclockwise back into latched position by cam 194 which engages and moves the connecting link 362 in a counterclockwise direction. The aforesaid rotation also displaces pin 383 on arm 355 of the selector trip lever 354 away from the flange 384 on the trip shaft controlled lever 377 thereby to permit the player arm trip mechanism to be operated at the end of its movement. The rotation of the selector trip lever also tensions spring 356 for the purpose of again shifting the double clutch into its uppermost position during the next cycle of operations corresponding to those described. The counterclockwise movement of the connecting link into the position wherein it is shown in Fig. 21 also tensions spring 371 which functions to return the double clutch member into its lower position after the playing of the record and return of the record to the magazine.

The rotation of the cam shaft from the position wherein it is illustrated in Fig. 20 to the position wherein it is illustrated in Fig. 21 effects transfer of the selected record A from the magazine to playing position, operation of the record clamping and centering arm 243, and operation of the player arm to contact the outer peripheral edge of the record and movement of the player arm into the outer end of the record groove.

The record is transferred from the magazine by the transfer arm 201 which is operated by cam 192, cam follower arm 203, shaft 204, operating arm 205, and the gear segment 206, the latter being biased by springs 219 to move in a direction to effect the transfer of a record from the magazine toward playing position at a rate determined by the shape of the cam. The sector gear is provided, it may be remembered, with an adjustable screw 218 that engages the sector gear operating arm 205 whereby the transfer cam and its follower arm are enabled to move after the record transfer arm has been stopped to position the player arm.

When the record transfer arm is moved upwardly, its outer end engages the under edge of a record to roll the record from the magazine over the magazine bar 18 and onto the record transfer trough 224. When the record is rolled onto the trough, its depresses the trough and the player arm is swung to the twelve inch record playing position by the player arm control lever 295 which pushes the player arm into this position by contact with the front of player arm cradle 274. The depression of the trough is not sufficient to bring the trough latch 233 below the catch 241 but, in any event, the trough would not be latched during the transfer of a ten inch record because the record does not roll far enough up the trough to enable the leaf spring 239 to move the trough latch 233 in a clockwise direction about its pivot 237 when the trough is in its lowermost position as in the case of twelve inch records. After the record has been moved some distance beyond the position illustrated in Fig. 10, the transfer arm abutment 223 strikes pin 225 on the trough to raise the latter to a position corresponding to that in which it is shown in Fig. 9, at which time further movement of the trough is prevented by the stop screw 232 engaging one of the bifurcated ends 226 of the trough. When the movement of the transfer arm has been terminated, the record is located a short distance below and to the rear of the record playing position from which it is moved into and clamped in playing position by the record clamping arm 243. When the record is fully clamped and centered, it is clear of both the trough and transfer arm and is rotated in an unimpeded fashion.

The player arm is clamped and centered by the cam 191 which operates the clamping arm 243 through cam follower 244 and the spring 248 located between the follower arm and clamping arm. This spring, it may be remembered, determines the clamping pressure on the record.

The record is centered by the movably mounted clamping member 242, the centering pin 256 of which is pointed and is adapted to pass through the center hole of the record to engage the flared opening 84 of the adjacent end of the record rotating shaft 68. When the clamping arm is in fully clamped position as illustrated in Fig. 5, it extends into the axial bore 85 in the shaft 68 thereby centering the record in its playing position.

The player arm, it should be noted, is located on the left side of the playing position (as viewed in Fig. 1) when the carriage moves to play the left side of a record. It is brought into contact with the outer peripheral ungrooved edge of the record by the player arm control lever 295 which is operated by the transfer cam follower arm 203, the latter having a pin 308 formed at the underside of the control arm engageable with a flange 307 on the lever. The player arm is kept out of contact with the record during the transfer of the record by the left downwardly projecting cam surface 313 at the end of the lever engaging the left roller 314 on the player arm (as viewed in Fig. 16). As the transfer cam and cam shaft approach the record playing position (Fig. 21), the player arm control lever 295 is moved upwardly with the result that the cam surface is lifted above the roller thereby enabling the player arm biasing spring 277 to move the player arm in a clockwise direction about the pivot pin 267. At this time, the player arm is located at a position substantially as illustrated in Fig. 9, that is, in position to engage the outer peripheral ungrooved edge of a ten inch record. It is moved to this position during the transfer of the ten inch record by the upward movement of the record trough, the downwardly extending arm 231 of which is adapted to engage and move forward the player arm positioning rod 289. This rod resiliently engages the main player arm cradle 274 and effects movement of the latter in a counterclockwise direction (see Fig. 9) to position the player arm. The player arm is biased into the outer end of a record groove by the continued upward movement of the player arm control lever 295 when the pin 294 secured to the outer end of the right arm 304 of the lever engages the upper leaf spring 297 on the main player arm cradle 274. When this engagement takes place, the player arm is moved a short distance further by the transfer cam and as a result the player arm is resiliently moved into the outer end of the playing groove.

After the record has been transferred and the player arm moved into contact with a record and into the outer end of the playing groove, the cam shaft occupies the position in which it is shown in Fig. 21 at which time the cycling clutch is deenergized and the record played. The cycling clutch is deenergized as heretofore indicated by the operating lever 327 when the pointed end 389 of the latter is forced into notch 374 in cam 193 by spring 385. When the lever 327 is moved by the spring, its forward end opens the combined cycling clutch solenoid and mute switch 325 with the result that the cycling clutch solenoid is deenergized and the pickup and reproduction apparatus (not shown) are rendered operative audibly to reproduce the record. During the playing of the record, the player arm follows the record groove inwardly toward the center of the record, it being free to do so. When the left side of a record is played, the motor rotates the record in a clockwise direction, as viewed from the left of the machine.

When the player arm reaches a predetermined position at the end of the playing groove or is moved in a reverse direction as by an eccentric groove at the center of the record, the player arm trip mechanism is operated to effect energization of the cycling clutch solenoid and further operation of the cam shaft. The player arm trip mechanism is operated, as heretofore described, either by the screw 394 secured to the player arm cradle 274 and engageable with the flange 402 of the trip lever 396 or by the reverse movement of the player arm at which time the ratchet plate 395 effects operation of the trip lever. In either event, the player arm trip shaft 376 is freed by the lifting of the trip lever flange 406 above the shoulder 405 on the detent lever 404. When the shaft is thus released, spring 379 pulls the shaft and also the lever 377 in a counterclockwise direction from the position in which it is shown in Fig. 21 back to the position in which it is shown in Fig. 19. This movement of the lever effects counterclockwise movement of the cycling clutch and muting switch control lever 327 and the consequent reclosure of the switch.

Upon operation of the player arm trip mechanism, the motor again rotates the cam shaft in the same direction in which it was previously rotated, i. e., from the position in which it is indicated in Fig. 21 to the positions in which it is indicated in Figs. 19 and 6. During this rotation of the cam shaft, the player arm is moved out of contact with the record and out toward and beyond the outer periphery of the record to its twelve inch record position. It is moved out of contact with the record by the downward movement of the player arm control lever 295 which is constrained to follow the transfer cam follower arm 203 by the spring 309 interconnecting the two. The downward movement of the player arm control lever 295 brings the cam surface 313 again into contact with the roller 314 on the player arm and thus moves the latter out of contact with the record. During the time that this is taking place, the record is also unclamped by the rotation of the cam 191, the cam follower arm 244 being constrained to follow the cam by the clamping arm biasing spring 249. When the record has been unclamped, it moves downwardly and toward the rear so as to rest upon the trough and the end of the record transfer arm 201. It is guided positively into the grooved end of the transfer arm by the record stripper ring 422, which is adjusted to be as close to the record playing position as possible and still permit warped records to be moved into playing position. Thereafter, as the transfer arm moves downwardly toward and beyond the position in which it is indicated in Fig. 10, the record rolls down the trough and back into the magazine. The record transfer arm 201 is positively moved in record returning direction by the cam follower arm, which moves toward the high side of the cam (see Fig. 6) to rotate the shaft 204, and gear segment operating arm 205 in a clockwise direction. When rotated in this direction, the operating arm engages the gear segment adjusting screw 218 with the result that the gear segment is positively rotated in a clockwise direction against the force of the springs 219 which are thus tensioned. During the transfer of the record from playing position to the magazine, the record supporting trough again is depressed by the weight of the record, but is not latched, and as a result the player arm is moved into the solid line position shown in Fig. 10 for an interval, after which it is positioned in initial playing position for ten inch records by the upward movement of the trough. When the trough is back in its uppermost position, the player arm is positioned at its initial ten inch record playing position.

If the record has been properly returned to the record magazine, the double clutch shifting lever latching roller 497 is moved sidewise into a position to permit the lever to be shifted downwardly by the latching roller operating arm 409, which, it may be remembered, is operated during the final movement of the transfer arm during which the transfer arm 221 on the sector gear engages the screw 421 through which the latching roller operating arm 409 is operated. Assuming for the time being that the record has been properly returned, then when the cam shaft reaches the position in which it is illustrated in Fig. 19, the double clutch shifting lever 197 is moved downwardly (or in a counterclockwise direction) by the spring 371, which was tensioned during the first half rotation of the cam shaft by movement of the connecting link 362 by cam 194. The connecting link is prevented from following cam 194 during the second period of cam shaft rotation by the record selector trip lever 354 which is latched by the record selector trip relay. The connecting link is prevented from being moved by the pin and slot connection 366, 367 which has heretofore been described in detail. When the lever 197 shifts downwardly, the projection 373 thereon falls into the notch 374 in cam 193. It may perhaps be noted that the final shifting of the double clutch member into its lowermost position does not occur until one of the slots 145 thereon is opposite the tapered driving pin 144 secured to the carriage driving gear 133.

When the double clutch is shifted to carriage driving position by counterclockwise movement of the shifting lever 197, the switch operating arm portion 326 of the latter moves the switch operating member 335 in a counterclockwise direction about its pivot 336. If the motor starting relay winding 322 was not energized at this time by the displaced selector button 432—A, the motor and cycling clutch solenoid circuits would be opened, but since as the solenoid is energized, the motor and cycling clutch solenoid circuits remain closed. They remain closed because the leaf spring 332 is unlatched and moves with the operating member 335 to maintain switch blades 323 and 324 in contact.

The motor is thus conditioned to move the carriage through the cycling clutch and double clutch in the same direction in which it was last moved, that is, to the left. It will be remembered that the next record to be played is in record space B and that it was the right side of this record that was to be played. Therefore, the carriage now moving to the left is not conditioned to play the right side of a record and must be moved to its left limiting position and then back toward the right to align the record transfer arm with record space B, wherein the twelve inch record is located. As the carriage moves to the left, the record selector arm 467 is rotated in a counterclockwise direction as viewed from the bottom (Fig. 33). During the travel of the carriage to its left limit, the right arm of the rotating arm 467 moves past selector button 432—B, but, in so moving, the record selector trip relay is not energized as the button contacting and returning flange 514 does not move outward into contact with the displaced button, the detent portion 507 merely riding over the ratchet teeth 492.

When the carriage reaches a position wherein the record transfer arm is slightly beyond the end record, the selector arm 467 is prevented from moving further by engagement of stops 504 and 506. The carriage, however, continues to move some distance as heretofore described to effect operation of the motor reversing switch and shifting of the player arm. The overtravel of the carriage relative to the selector arm is provided by the spring 499 through which the selector arm is rotated in a counterclockwise direction (again as viewed in Fig. 33).

When the carriage reaches its left limit of movement, the motor reversing switch is operated by the movement of the switch operating arm 170 from the position in which it is shown in Fig. 14 back to the position in which it is shown in Fig. 13. It is so moved by engagement of the pin 179 on the arm with abutment 183 on the fixed bracket 184 located at the left side of the base. The player arm is shifted from the left side of the playing position back to the right side of the playing position wherein it is shown in Fig. 13 by engagement of the subcradle pin 283 with flange 285 on the bracket 184. The direction of rotation of the motor is thus reversed by the motor reversing switch and the carriage moves to the right and the record selector arm 467 is rotated in a clockwise direction. When the carriage has been moved to bring the transfer arm underneath record space B, the record selector trip relay 196 is energized by contact between displaced selector button 432—B with the button contacting flange 514 on the right end of arm 467 (as viewed in Fig. 33), just as when the record selector trip relay was energized to stop the carriage to play record A. At the same time, the displaced selector button is returned to its normal position. Inasmuch as only two selector buttons were displaced and both are now in their normal positions, both the selector trip relay and the motor starting relay are deenergized. The motor and cycling clutch control switch blades 323 and 324, however, remain in circuit closing position because the deenergization of the motor starting relay 321 simply permits its armature 328 to go to the retracted position in which it is shown in Fig. 1. When the double clutch is shifted to its uppermost position upon energization of the selector trip relay, the switch operating member 335 is operated to the position in which it is shown in Fig. 1 by the arm 326 of the clutch shifting lever 197. In this position, the motor circuit remains closed and the leaf spring 332 is latched by the relay armature. It should be noted these results obtain irrespective of whether the double clutch is shifted immediately to its uppermost position or delayed slightly until registry of pin 142 with one of slots 143.

The operation of the mechanism for playing of a twelve inch record is the same as for the playing of a ten inch record, except for the latching of the record trough and for the positioning of the player arm. Consequently, it is not believed necessary to repeat the description of this operation, but rather to consider the differences in operation.

When a twelve inch record is rolled onto the record transfer trough by the transfer mechanism, the trough is depressed to a limit determined by the catch 241. When the record is rolled onto the trough latch 233, the latch is rotated in a counterclockwise direction relative to its pivot 237 to bring the outer end 238 of the trough latch beyond the end of catch 241. Further movement of the record outwardly along the trough brings the record into the vicinity of the pivot pin 237 whereupon the leaf spring 239 is effective to rotate the latch in a clockwise direction to bring the latching blade 238 underneath the catch 241. The trough is thereby latched in the position in which it is indicated in Fig. 12 and the record transfer arm 201 is movable only to the position in which it is indicated in this figure, its further movement being prevented by engagement of the abutment 223 on the arm with the pin 225 on the bifurcated end of the now latched transfer trough. When the transfer arm reaches its limit of movement as described, the twelve inch record is located with its central opening slightly below and to the left of playing position, as indicated by the solid line position of the record (Fig. 12), and from which it is moved into playing position by the record clamping and centering means just as in the case of a ten inch record. When so moved, the record is clear of both the transfer arm and the latching portion of the trough.

The player arm 265 is properly positioned to contact the outer peripheral ungrooved edge of the twelve inch record, which position is determined by the engagement of the adjustably mounted screw 301 on the main player arm cradle 274 and the fixed projection 302 (as viewed in Fig. 10), the player arm being moved into this limiting position by the front end of the player arm control lever 295 which engages the front crosspieces of the player arm cradle 274. It may be noted that the engagement of the pin 294 with the lower leaf spring 296 provides an arrangement preventing undesired oscillation of the player arm when it is moved inward from twelve inch position to the ten inch position.

The player arm is brought into contact and resiliently biased into the outer end of a playing groove by the upward movement of the player arm control lever 295 just as in the case of the ten inch record. At this time, the record is rotated in the opposite direction, since the direction of rotation of the motor was reversed. The needle end now engaging the record slants to follow the record as it is rotated, just as when the opposite side of the record was being played.

When the larger record has been played, the player arm trip mechanism is actuated to effect movement of the player arm out of contact with the record and back to initial ten inch playing position in the manner heretofore described. The record is also unclamped in the same way and after being unclamped, it is released so as to bear against the record transfer arm and trough. The return movement of the transfer arm permits the record to roll down the trough and as it rolls down, it effects counterclockwise movement of the trough latch 233 thereby to release the trough. Thereafter, the record is returned to the magazine in the same manner as in the case of a ten inch record.

When the cam shaft is rotated to its starting position, the double clutch shifting lever 197 is moved in a counterclockwise direction by the spring 371, the projection 373 on the lever falling in notch 374 on cam 194, to shift the clutch into carriage driving position. The switch operating member 335 is also thus moved in a counterclockwise direction, thereby to deenergize both the motor and the cycling clutch solenoid. These are deenergized by opening of switch blades 323 and 324 upon movement of the switch operating member 335 in a counterclockwise direction when the leaf spring 332 is latched by the armature 328 of the motor starting relay, it being remembered that none of the record selector buttons are now displaced. When the leaf spring is thus latched and the switch operating member moved, the latter moves the switch blade 323 out of contact with the switch blade 324, this movement being accomplished through the projections 337 embracing switch blade 323 and forming part of the switch operating member. The machine is thus brought back into a condition wherein other records may be played upon operation of the desired record selector push buttons, as described above.

In the foregoing description of the operation, it has been assumed that a played record was properly returned to the magazine after having been played. In the event the record is not properly returned, then the machine performs successive attempts to return the record by reason of the continuous rotation of the cam shaft occurring when the improperly returned record prevents the safety latch roller operating arm 409 from moving the roller out of the path of movement of the clutch shifting lever 197. It may be remembered that the clutch shifting lever latching roller 407 is biased by its associated spring into the path of movement of the lever when the lever is in its uppermost position as indicated in Figs. 2, 20, and 21. Consequently, if a record prevents the roller operating arm 409 from moving the latching roller out of the path of the lever, then the lever cannot move downwardly to shift the clutch or to move the switch actuating member 335 to deenergize the cycling clutch solenoid and motor. The cam shaft thus continues to rotate to cause the transfer mechanism, the clamping mechanism, and the player arm positioning mechanism to function as heretofore described. However, the selector trip relay lever 354 remains in the position in which it is indicated in Fig. 19 so that the player arm trip mechanism cannot be cocked or the cycling clutch controlling the switch 325 operated by the player arm trip mechanism after the cam has rotated to the position in which it is indicated in Fig. 21. After the cam shaft rotates beyond the position shown in Fig. 21, the player arm positioning mechanism, the record clamping means, and the transfer means are again operated to effect unclamping and a return of the record toward the magazine. In the event the record is properly returned on this second attempt, then the mechanism completes its record returning cycle just as though it was being returned properly the first time. In the event the record is again not properly returned to the magazine, the apparatus makes a further attempt to do do so in the manner just described. Of course if the apparatus makes a number of unsuccessful attempts to return the record, then the record may be returned manually to permit the machine to operate properly for the playing of other records. Although the invention has been described in conjunction with the specific details of a preferred embodiment thereof, it should be understood that such details are not intended to be limitative of the invention except in so far as set forth in the following claims.

Having thus described my invention, what I claim and desire to secure by Letters Patent of the United States is:

1. In a phonograph of the type including, a pair of record clamping and rotating members for supporting a record for rotation about an axis in playing position, one of said members being movably mounted relative to the other and movable toward and away from said position, means including record engaging pickup and a player arm pivotally mounted to one side of said position and movable toward the axis for reproducing a record, a generally arcuate record stripping member positioned at that side of the playing position at which said one member is located and spaced a short distance from said position, said arcuate member defining a central opening through which said one clamping member is movable and having its ends spaced apart at the side nearest the pickup to enable said pickup to move toward the axis of rotation of the record.

2. In a phonograph, of the type including, a pair of small diameter record clamping and rotating members for supporting a record in a substantially vertical playing position, one of said members being movably mounted relative to the other and movable toward and away from said position, means including a record supporting trough located below and in the plane of said position for rolling a record edgewise into and out of said position, record guiding and stripping structure positioned at that side of the playing position at which said one clamping member is located and above said trough, said stripping structure having one side of considerable extent spaced a short distance from the playing position whereby it acts as a guide for a record during its movement into and out of playing position and prevents a record from following said one clamping member beyond said trough when the latter is moved away from the playing position.

3. In an automatic phonograph of the type wherein a record to be played is releasably clamped in playing position by turntable means comprising a movable record engaging clamping element of a diameter sufficiently small to leave the playing grooves uncovered, a generally annular record guiding and locating structure located in close proximity to the playing position of a record having a side adjacent the playing position that is generally parallel to the face of a record in said playing position, said structure being centrally apertured for the passage of said movable clamping element and having a considerably smaller diameter than the records whereby it is located in the vicinity of the innermost record grooves and clears warped records rotating in playing position.

4. In an automatic phonograph of the type wherein a record to be played is releasably clamped in playing position by turntable means comprising a movable record engaging clamping element of a diameter sufficiently small to leave the playing grooves uncovered, a record guiding and locating structure having one side located in close proximity to the playing position of a record, said side being generally parallel to the face of a record in said playing position, said structure being centrally apertured for the passage of said movable clamping element and having a considerably smaller radius than the records whereby it is located in the vicinity of the innermost record grooves and clears warped records rotating in playing position, said structure extending around a considerable portion of the movable clamping element and having a slotted portion at one side extending from the outside of said structure to the central aperture to enable a pickup to move toward the center of a record in playing position past the outer limit of said structure.

5. In an automatic phonograph of the type wherein a record to be played is releasably clamped in playing position by turntable means comprising a movable clamping element of a diameter sufficiently small to leave the playing grooves uncovered, a record guiding and locating structure having one side located in close proximity to the playing position of a record, said side being generally parallel to the face of a record in said playing position, said structure being centrally apertured for the passage of said movable clamping element and having a considerably smaller radius than the records whereby it is located in the vicinity of the innermost record grooves and clears warped records rotating in playing position, and structure supporting means located a substantial distance from the playing position, whereby said supporting means also amply clears warped records rotating in playing position.

6. In an automatic phonograph of the type wherein a record to be played is releasably clamped in a vertical playing position with the record grooves on both sides exposed by turntable means comprising a pair of clamping elements of a diameter sufficiently small to leave the playing grooves uncovered and one of which is movable, a record guiding and locating structure located in close proximity to the playing position of a record at that side of the playing position whereat the movable clamping element is located, said structure having a flat side adjacent and generally parallel to the face of a record in the playing position being centrally apertured for the passage of said movable clamping element, said structure also having a considerably smaller radius than the records whereby it is located in the vicinity of the innermost record grooves and clears warped records rotating in playing position, and structure supporting means located a substantial distance from the playing position, whereby said supporting means also readily clears both warped and unwarped records rotating in playing position.

7. A phonograph, including in combination, a record magazine, a unit mounted adjacent the magazine, said unit including a record rotating shaft, record transfer and reproducing means associated with said magazine and unit for effecting the transfer and reproduction of records, a cam assembly on the unit associated with said record transfer and reproducing means and controlling their operation to effect the transfer and reproduction of records, driving means associated with one of said magazine and unit for effecting relative movement between them, means including a motor and speed reducing means connecting the motor to said record rotating shaft for continuously driving said record rotating shaft during operation of the phonograph, a drive shaft operably connected to and adapted to be driven by said record rotating shaft, and selective clutch means on said drive shaft connected to the shaft and connectable with said relative movement effecting driving means or said cam assembly for selectively driving them.

8. A phonograph, including in combination, a stationary base including a stationary record magazine, a movably mounted unit on said base adjacent said magazine movable alongside said magazine, a rack carried by said base, a vertical shaft carried by said unit, a pinion on the lower end of said vertical shaft engaging said rack, a record rotating shaft and turntable means rotatable thereby mounted near the upper end of said unit, a high speed electric motor carried by said unit, speed reducing means connecting said motor to said record rotating shaft, vertical shaft driving means drivingly connecting said vertical shaft to said record rotating shaft, record transfer means associated with said magazine and turntable means for transferring a record between said magazine and said turntable means mounted on said unit and movable into alignment with any record position in said magazine by rotation of said pinion, driving gear means for said record transfer means positioned on said vertical shaft between said pinion and said vertical shaft drive means for operating said transfer means, clutch drive means axially movable on said vertical shaft and angularly fixed thereto, and means operatively associated with said clutch drive means for moving said means downward to drive said pinion and move said unit and stop the drive of said transfer means, and for moving said clutch drive means upward to drive said driving gear means for said record transfer means and stop the drive of said unit.

9. A phonograph including record supporting and rotating means for supporting a record in playing position, a record storage or receiving means positioned adjacent said record supporting and rotating means for supporting a plurality of records, means operatively associated with one of said first mentioned means for effecting relative movement between said two first mentioned means for the selection of a record to be played, record transfer means operatively associated with the record supporting and rotating means and record storage means for transferring records from said playing position along a path of movement to said record storage means, and record position responsive means cooperatively associated with a record moving along said path controlling the relative movement effecting means for preventing relative movement in the event the record is not properly transferred to said record storage or receiving means.

10. A phonograph including record supporting and rotating means for supporting a record in playing position, a record storage or receiving means positioned adjacent said record supporting and rotating means for supporting a plurality of records, means operatively associated with one of said first mentioned means for effecting relative movement between said two first mentioned means for the selection of a record to be played, record transfer means operatively associated with the record supporting and rotating means and record storage means for transferring records from said playing position along a path of movement to said record storage means, and record position responsive means in the path of movement of the record controlling the relative movement effecting means for preventing relative movement in the event the record is not properly transferred to said record storage or receiving means.

11. A phonograph including record supporting and rotating means for supporting a record in playing position, a record storage or receiving means positioned adjacent said record supporting and rotating means for supporting a plurality of records, means operatively associated with one of said first mentioned means for effecting relative movement between said two first mentioned means for the selection of a record to be played, record transfer means operatively associated with the record supporting and rotating means and record storage means for transferring records from said playing position along a path of movement to said record storage means, and record position responsive means including a member movably mounted near the path of record movement for movement into the path controlling the relative movement effecting means for preventing relative movement in the event the record is not properly transferred to said record storage or receiving means.

12. A phonograph including record supporting and rotating means for supporting a record in playing position, record transfer means operatively associated with the record supporting and rotating means for moving a record into the playing position for reproduction and out of the playing position after reproduction, and record position responsive means cooperatively associated with the movement of a record out of said playing position controlling the record transfer means for effecting operation of the latter to make a further attempt to move the record out of playing position in response to the incomplete movement of a record from said position.

13. A phonograph including record supporting and rotating means for supporting a record in playing position, record transfer means operatively associated with the record supporting and rotating means for moving a record into the playing position for reproduction and out of the playing position after reproduction, and record position responsive means cooperatively associated with the movement of a record out of playing position controlling the record transfer means for effecting operation of said transfer means to move said record into and out of said playing position in response to the incomplete movement of a record from said position.

14. A phonograph including record supporting and rotating means for supporting a record in playing position, record transfer means operatively associated with said record supporting and rotating means for moving a record into said playing position for reproduction and out of said position after reproduction, record reproducing means positioned near said playing position for reproducing a record while in said position, reproducing and record transfer means controlling means associated with said means for effecting the operation of the record transfer means to move a record out of playing position, and record position responsive means cooperatively associated with the movement of a record out of playing position controlling the record transfer means and reproducing means for effecting the operation of said transfer means to move a record into and out of playing position in the event of incomplete movement of the record out of said position and for preventing operation of the record reproducing means.

15. A phonograph including a record magazine, record supporting and rotating means adjacent said magazine for supporting a record in playing position, record transfer means operatively associated with said magazine and record supporting and rotating means for moving a record into said playing position for reproduction and back to the magazine after reproduction, record reproducing means positioned near said playing position for reproducing a record while in said position, record transfer means controlling means associated with said transfer means for effecting the operation of the latter to return the record from playing position toward the magazine, record position responsive means controlling the record transfer means controlling means including a record engaging control member engageable with an incompletely returned record for effecting the operation of said transfer means again to move a record into playing position and back toward the magazine.

16. A phonograph including record supporting and rotating means for supporting a record in playing position, a record magazine positioned adjacent said record supporting and rotating means for supporting a plurality of records, record transfer means operatively associated with the record rotating means and magazine for transferring records between said magazine and playing position along a path of movement, an element adjacent said magazine supporting said record supporting and rotating means and said record transfer means, means operatively associated with one of said magazine and element for effecting relative movement between them to align said transfer means with a record to be played, and record position responsive means movable into the path of movement of the record controlling the relative movement effecting means for placing the relative movement effecting means into operation when the record is properly transferred from said playing position to said magazine.

17. A phonograph including record supporting and rotating means for supporting a record in playing position, a record magazine positioned adjacent said record supporting and rotating means for supporting a plurality of records, record transfer means operatively associated with the record rotating means and magazine for transferring records between said magazine and playing position along a path of movement, record reproducing means located near said playing position for reproducing records in said position, an element adjacent said magazine supporting said record supporting and rotating means, record transfer means and reproducing means, means operatively associated with one of said magazine and element for effecting relative movement between them to align said transfer means with a record to be played, record transfer and reproducing means controlling means associated with said transfer and reproducing means to effect the transfer to and reproduction of a record in said playing position and transfer to said magazine, and record position responsive means cooperatively associated with a record moving along said path controlling the relative movement effecting means for conditioning the relative movement effecting means for operation when the record is properly transferred from said playing position to said magazine.

18. A phonograph including a record magazine, an element mounted adjacent said magazine including record supporting and rotating means, record transfer means for transferring records from said magazine to said element and record reproducing means, means operatively associated with one of said magazine and element for effecting relative movement between them for the selection of a record to be played, said last mentioned means including driving means comprising a multi-position movable clutch drivingly connected in one position to said one of said magazine or element to effect relative movement, clutch operating means associated with said clutch for moving it into another position to terminate relative movement between the magazine and element with a record in alignment with the record transfer means, a cam assembly associated with the transfer and reproducing means for controlling the transferring and playing of selected records and the return thereof to the magazine, cam assembly driving means engageable by said clutch in its other position, and record position responsive means cooperatively associated with the return of a record controlling said clutch operating means to effect movement of said clutch to said one position to condition the element and magazine for relative movement upon the return of a record to the magazine.

19. A phonograph including a record magazine, an element mounted adjacent said magazine including record supporting and rotating means, record transfer means for transferring records from said magazine to said element and record reproducing means, means operatively associated with one of said magazine and element for effecting relative movement between them for the selection of a record to be played, said last mentioned means including driving means comprising a multi-position movable clutch drivingly connected in one position to said one of said record or element to effect relative movement, clutch operating means associated with said clutch for moving it into another position to terminate relative movement between the magazine and element with a record in alignment with the record transfer means, a cam assembly associated with the transfer and reproducing means for controlling the transferring and playing of selected records and the return thereof to the magazine, cam assembly driving means engageable by said clutch in its other position, clutch movement preventing means for preventing movement of said clutch from its other to its said one position, and record position responsive means cooperatively associated with the return of a record controlling said clutch movement preventing and said clutch operating means for rendering the former ineffective and the latter effective to move said clutch to said one position to condition the element and magazine for relative movement.

20. A phonograph including a record magazine, a playing unit mounted adjacent said magazine including record supporting and rotating means, record transfer means for transferring records between said magazine and unit and record reproducing means, means operatively associated with one of said magazine and unit for effecting relative movement between them for the selection of a record to be played, said last mentioned means including driving means comprising a multi-position movable clutch and a clutch-operating lever occupying one position in which the clutch is drivingly connected to said one of said magazine or unit to effect relative movement, lever operating means associated with said lever for moving it and said clutch to another position to terminate relative movement between the magazine and unit with the record in alignment with the record transfer means, a cam assembly associated with the transfer and reproducing means for controlling the transferring and playing of selected records and the return thereof to the magazine, cam assembly driving means engageable by said clutch in its other position, clutch movement preventing means for preventing movement of said clutch operating lever and clutch from its said other position to its said one position, said movement preventing means including a member biased into the path of movement of said lever when the latter is in its said other position and movable out of the path of said lever to enable it to move to its one position, member operating means movable by the transfer means into the path of record return movement upon return of a record to the magazine for moving said member out of the path of said lever, and means for thereafter returning the lever and clutch to said one position to condition the element and magazine for relative movement.

21. A phonograph comprising a first structure including record supporting and rotating means for supporting a record in playing position, a second structure including record supporting means for supporting a plurality of records alongside each other, driving means operatively associated with one of said structures for effecting relative movement between them for record selection, record transfer means associated with said structures for moving records from said second structure to the playing position and returning them to said second structure, and record return responsive driving means controlling means for rendering said driving means operative to effect relative movement in the event the record is properly returned to the magazine.

22. A phonograph including record supporting and rotating means for supporting a record in playing position, record transfer means associated with said supporting and rotating means for moving records into and out of playing position, and record position responsive transfer means controlling means responsive to the incomplete movement of a record from said playing position for effecting operation of said transfer means to make a further attempt to move the record out of the playing position.

23. A phonograph including a turntable, a record magazine, means operatively associated with one of said turntable and magazine for effecting relative movement between them, record transfer means associated with the turntable and magazine for transferring records from said turntable to said magazine, driving means operatively associated with said relative movement effecting means and record transferring means for selectively driving them, and record transfer responsive means cooperatively associated with the transfer of a record from said turntable to said magazine and controlling said driving means for preventing relative movement when a record is not returned from the turntable to the magazine, whereby record breakage or jamming due to relative movement between the magazine and turntable with a record in intermediate position is prevented.

24. An automatic phonograph including record supporting and rotating means defining a playing position, structure defining another record position, record transfer means associated with said first mentioned means and structure movable between predetermined positions for effecting the transfer of a record from the playing position to said other position, means including driving means operatively connected to said record transfer means and record transfer means position responsive driving means controlling means for effecting operation of the record transfer means to return a record back to playing position and then to make a further effort to transfer the record to said other position when the record and transfer means do not reach certain points in the transfer movement toward said other position.

25. An automatic phonograph including record supporting and rotating means defining a playing position, structure defining another record position, record transfer means associated with said first mentioned means and structure movable between predetermined positions for effecting the transfer of a record from the playing position to said other position along a path of movement, means including driving means operatively connected to said record transfer means and record transfer means position responsive driving means controlling means for effecting operation of the record transfer means to return a record back to playing position and then to make a further effort to transfer the record to said other position when the record and transfer means do not reach certain points in the transfer movement toward said other position, said record position responsive driving means controlling means including a record engaging member movably mounted near said other position for movement into the path of record movement and engageable with a record in said path unless the record is substantially completely returned to said other position.

26. An automatic phonograph including record supporting and rotating means defining a playing position, structure defining another record position, record transfer means associated with said first mentioned means and structure movable between predetermined positions for effecting the transfer of a record from the playing position to said other position along a path of movement, means including driving means operatively connected to said record transfer means and record transfer means position responsive driving means controlling means for effecting operation of the record transfer means to return a record back to playing position and then to make a further effort to transfer the record to said other position when the record and transfer means do not reach certain points in the transfer movement toward said other position, said record position responsive driving means controlling means including a record engaging member movably mounted near said other position for movement into the path of record movement and member driving means having a resilient connection for moving it into said path, whereby a record engaged by said member will not be broken.

27. A phonograph including a record magazine, a record playing unit mounted adjacent said magazine comprising a record rotating shaft, driving means associated with one of said unit and magazine to effect relative movement between them, a continuously operating motor operatively connected to said record rotating shaft for rotating it continuously during operation of the phonograph, record transfer and reproducing means associated with the magazine and unit for effecting the transfer of a record from said magazine to said playing unit and reproducing it, a cam assembly operatively connected to said record transfer and reproducing means controlling their operation, a drive shaft, selectively operable driving means between said record rotating and drive shafts for selectively rotating the drive shaft from the record rotating shaft, and selectively operable clutch means on said drive shaft associated with said cam assembly and relative movement effecting driving means for selectively driving either said cam assembly or said relative movement effecting driving means.

28. A phonograph including a record magazine, a record playing unit mounted adjacent said magazine comprising a record rotating shaft and record supporting and rotating means, driving means associated with one of said unit and magazine to effect relative movement between them, a continuously operating motor operatively connected to said record rotating shaft for rotating it continuously during operation of the phonograph, record transfer and reproducing means associated with the magazine and unit for effecting the transfer of a record from said magazine to said record supporting and rotating means reproducing it, a cam assembly operatively connected to said record transfer and reproducing means controlling their operation, a drive shaft, selectively operable driving means including clutch means between said record rotating and drive shafts for selectively rotating the drive shaft from the record rotating shaft, and selectively operable clutch means associated with said drive shaft, cam assembly and relative movement effecting driving means for selectively connecting said drive shaft to drive said cam assembly or said relative movement effecting driving means.

EDWARD F. ANDREWS.

REFERENCES CITED

The following references are of record in the file of this patent:

UNITED STATES PATENTS

| Number | Name | Date |
|---|---|---|
| 1,555,150 | Oswald | Sept. 29, 1925 |
| 1,998,137 | Jones et al. | Apr. 16, 1935 |
| 2,159,836 | Alm | May 23, 1939 |
| 2,205,268 | Mitchell | June 18, 1940 |
| 2,216,029 | Wright | Sept. 24, 1940 |
| 2,244,157 | Hokanson | June 3, 1941 |
| 2,247,648 | Blessing | July 1, 1941 |
| 2,247,651 | Carson | July 1, 1941 |
| 2,323,365 | Andrews | July 6, 1943 |
| 2,340,418 | Gabel | Feb. 1, 1944 |

FOREIGN PATENTS

| Number | Country | Date |
|---|---|---|
| 498,442 | Great Britain | Jan. 9, 1939 |